US012514922B2

(12) United States Patent
Cook et al.

(10) Patent No.: US 12,514,922 B2
(45) Date of Patent: Jan. 6, 2026

(54) RECOMBINANT NON-PATHOGENIC MAREK'S DISEASE VIRUS CONSTRUCTS ENCODING INFECTIOUS LARYNGOTRACHEITIS VIRUS AND INFECTIOUS BURSAL DISEASE VIRUS ANTIGENS

(71) Applicant: Intervet Inc., Madison, NJ (US)

(72) Inventors: Stephanie Cook, Omaha, NE (US); Mohamad Morsey, Omaha, NE (US); Ian Tarpey, St. Ives (GB); Iwan Verstegen, Boxmeer (NL); Paulus Jacobus Antonius Sondermeijer, Boxmeer (NL); Paul Vermeij, St. Anthonis (NL)

(73) Assignee: Intervet Inc., Rahway, NJ (US)

( * ) Notice: Subject to any disclaimer, the term of this patent is extended or adjusted under 35 U.S.C. 154(b) by 0 days.

(21) Appl. No.: 18/163,038

(22) Filed: Feb. 1, 2023

(65) Prior Publication Data

US 2024/0123057 A1    Apr. 18, 2024

Related U.S. Application Data

(63) Continuation of application No. 16/309,297, filed as application No. PCT/EP2017/064662 on Jun. 15, 2017, now Pat. No. 11,596,687.

(60) Provisional application No. 62/351,471, filed on Jun. 17, 2016.

(51) Int. Cl.
| | |
|---|---|
| *A61K 39/245* | (2006.01) |
| *A61P 31/22* | (2006.01) |
| *C12N 7/00* | (2006.01) |
| *A61K 39/00* | (2006.01) |

(52) U.S. Cl.
CPC ........... *A61K 39/245* (2013.01); *A61P 31/22* (2018.01); *C12N 7/00* (2013.01); *A61K 2039/5256* (2013.01); *A61K 2039/552* (2013.01); *A61K 2039/70* (2013.01)

(58) Field of Classification Search
CPC .......... A61K 2039/552; A61K 2039/70; A61K 39/12; A61K 2039/5256; A61K 39/245; A61P 31/22; A61P 43/00; C12N 15/86; C12N 2710/16343; C12N 2720/10034; C12N 2710/16034; C12N 2710/16334
See application file for complete search history.

(56) References Cited

U.S. PATENT DOCUMENTS

| | | | |
|---|---|---|---|
| 5,187,087 A | 2/1993 | Sondermeijer et al. | |
| 5,733,554 A | 3/1998 | Audonnet et al. | |
| 5,830,745 A | 11/1998 | Hock et al. | |
| 5,834,305 A | 11/1998 | Cochran et al. | |
| 5,853,733 A | 12/1998 | Cochran et al. | |
| 5,928,648 A | 7/1999 | Cochran | |
| 5,961,982 A | 10/1999 | Cochran | |
| 5,965,138 A | 10/1999 | Cochran et al. | |
| 5,980,906 A | 11/1999 | Audonnet et al. | |
| 6,121,043 A | 9/2000 | Cochran et al. | |
| 6,183,753 B1 | 2/2001 | Cochran et al. | |
| 6,299,882 B1 | 10/2001 | Junker | |
| 6,875,856 B2 | 4/2005 | Wild et al. | |
| 6,913,751 B2 | 7/2005 | Cochran et al. | |
| 8,932,604 B2 | 1/2015 | Cook et al. | |
| 9,114,108 B2 | 8/2015 | Bublot et al. | |
| 9,409,954 B2 | 8/2016 | Cook et al. | |
| 9,555,016 B2 | 1/2017 | Makridakis | |
| 9,555,096 B2 | 1/2017 | Bublot et al. | |
| 9,770,502 B2 | 9/2017 | Bublot et al. | |
| 10,188,720 B2 | 1/2019 | Esaki et al. | |
| 10,308,956 B2 | 6/2019 | Verstegen et al. | |
| 10,323,257 B2 | 6/2019 | Bublot et al. | |
| 10,655,146 B2 | 5/2020 | Esaki et al. | |
| 10,813,991 B2 | 10/2020 | Reddy et al. | |
| 10,822,620 B2 | 11/2020 | Bublot et al. | |
| 11,058,761 B2 | 7/2021 | Mebatsion et al. | |
| 11,123,425 B2 | 9/2021 | Fujisawa et al. | |
| 11,229,698 B2 * | 1/2022 | Cook .................... | C12N 15/869 |
| 11,596,687 B2 * | 3/2023 | Cook ...................... | A61P 31/22 |
| 2008/0233146 A1 | 9/2008 | Sato | |
| 2018/0163230 A1 | 6/2018 | Bublot et al. | |
| 2021/0010033 A1 | 1/2021 | Bublot et al. | |
| 2021/0386854 A1 | 12/2021 | Ameiss et al. | |

FOREIGN PATENT DOCUMENTS

| | | |
|---|---|---|
| CN | 1472315 A | 2/2004 |
| CN | 103589693 A | 2/2014 |
| CN | 103874508 A | 6/2014 |
| CN | 103890183 A | 6/2014 |
| EP | 728842 A2 | 8/1996 |
| EP | 1026246 A1 | 8/2000 |

(Continued)

OTHER PUBLICATIONS

Afonso, et al., The Genome of Turkey Herpesvirus, Journal of Virology, 2001, 971-978, 75-2.

Bobrovskaya, Irina Vladimirovna, Antigenic Properties of Infectious and Thermoinactivated Vaccine Preparations of Marek's Disease Virus Strains, Shchyolkovo, Jan. 28, 2000 (Machine Translation), N/A.

Bobrovskaya, Irina Vladimirovna, Antigenic Properties of Infectious and Thermoinactivated Vaccine Preparations of Marek's Disease Virus Strains, Shchyolkovo, Jan. 31, 2000, N/A.

(Continued)

*Primary Examiner* — Bao Q Li

(74) *Attorney, Agent, or Firm* — Susanna C. Benn

(57) ABSTRACT

The present invention discloses novel recombinant multivalent non-pathogenic Marek's Disease virus constructs that encode and express both Infectious Laryngotracheitis Virus protein antigens and an Infectious Bursal Disease virus protein antigen, and methods of their use in poultry vaccines.

20 Claims, 2 Drawing Sheets

Specification includes a Sequence Listing.

(56) References Cited

FOREIGN PATENT DOCUMENTS

| | | | |
|---|---|---|---|
| EP | 1298139 B1 | 5/2007 | |
| EP | 1801204 B1 | 2/2011 | |
| EP | 2644702 A1 | 10/2013 | |
| EP | 3041939 B1 | 3/2019 | |
| EP | 3708670 A1 | 9/2020 | |
| JP | 2015500631 A | 1/2015 | |
| RU | 2593950 C2 | 8/2016 | |
| RU | 2624037 C2 | 6/2017 | |
| WO | 198704463 A1 | 7/1987 | |
| WO | 199203554 A1 | 3/1992 | |
| WO | 1996005291 A1 | 2/1996 | |
| WO | 1998037216 A1 | 8/1998 | |
| WO | 2000061736 A2 | 10/2000 | |
| WO | WO 2012052384 A1 | 4/2012 | |
| WO | 2013057235 A1 | 4/2013 | |
| WO | 2013057236 A1 | 4/2013 | |
| WO | 2013082327 A1 | 6/2013 | |
| WO | 2016102647 A1 | 6/2016 | |
| WO | 2017216287 A1 | 12/2017 | |
| WO | 2018112051 A1 | 6/2018 | |
| WO | 2020127964 A1 | 6/2020 | |
| WO | 2021257706 A1 | 12/2021 | |

OTHER PUBLICATIONS

Dartiel, et al., Herpesvirus of Turkey Recombinant Viruses Expressing Infectious Bursal Disease Virus (IBDV) VP2 Immunogen Induce Protection Against an IBDV Virulent Challenge in Chickens, Virology, 1995, 481-490, 211.

Fuchs, et al., Molecular Biology of Avian Infectious Laryngotracheitis Virus, Veterinary Research, 2007, 261-279, 38.

Hao, X. et al., Research Progress in Herpesvirus of Turkey Vectored Avian Influenza Vaccines, China Poultry, 2015, 48-52, 37(21).

Hao, Xiaoli et al., Research Progress in Herpesvirus of Turkey Vectored Avian influenza Vaccines, China Poultry, 2015, 48-52 (Machine Translation), 37(21).

Johnson, et al., Protection Against Infectious Laryngotracheitis by i Ovo Vaccination with Commercially Available Viral Vector Recombinant Vaccines, Avian Diseases, 2010, 1251-1259, 54.

Kingham, et al., The Genome of Herpesvirus of Turkeys: Comparative Analysis with Marek's Disease Viruses, Journal of General Virology, 2001, 1123-1135, 82.

Murthy, et al., Pathogenesis of Marek's Disease: Effect of Immunization with Inactivated Viral and Tumor-Associated Antigens, Infection and Immunity, 1979, pp. 547-533, 26-2.

Petherbridge, et al., Cloning of Gallid Herpesvirus 3 (Marek's Disease Virus Serotype-2), Journal of Virological Methods, Nov. 17, 2009, 158.

Sondermeijer, et al., Avian Herpesvirus as a Live Viral Vector for the Expression of Heterologous Antigens, Vaccine, 1993, 349-358, 11.

Sun, et al., Protection of Chickens from Newcastle Disease and Infectious Laryngotracheitis with a Recombinant Fowlpox Virus Co-Expressing the F, HN Genes of Newcastle Disease Virus and GB Gene of Infectious Laryngotracheitis Virus, Avian Diseases, 2008, 111-117, 52.

Tsukamoto, et al., Complete, Long-Lasting Protection Against Lethal Infectious Bursal Disease Virus Challenge by a Single Vaccination with an Avian Herepesvirus Vector Expressing VP2 Antigens, Journal of Virology, 2002, 5637-5645, 76-11.

Van Zijl, et al., Regeneration of Herpesviruses from Molecularly Cloned Subgenomic Fragments, Journal of Virology, 1988, 2191-2195, 62-6.

Wild, et al., A Genomic map of Infectious Laryngotracheitis Virus and the Sequence and Organization of Genes Present in the Unique Short and Flanking Regions, Virus Genes, 1996, 107-116, 12-2.

Wu, et al., Molecular Detection and Differentiation of Infectious Bursal Disease Virus, Avian Diseases, 2007, 515-526, 51.

U.S. Appl. No. 16/309,297, filed Dec. 12, 2018.

United States Department of Agriculture, U.S. Veterinary Biological Product License No. 165A, issued Jan. 31, 2024 cited in Opposition Proceeding of European Patent No. 3471766 B1 (1 page).

United States Department of Agriculture, Summary of Studies Supporting USDA Product Licensure completed on Jan. 23, 2024 for U.S. Veterinary Biological Product License No. 165A cited in Opposition Proceeding of European Patent No. 3471766 B1 (22 pages).

Merck& Co., Inc., 2024, "Merck U.S. Patent Rights for Products" [retrieved on Aug. 14, 2024]. Retrieved from the Internet:<URL: https://www.merck.com/products/patent/> cited in Opposition Proceeding of European Patent No. 3471766 B1 (7 pages).

Genbank Accession No. AF291866.1, "Meleagrid herpesvirus 1 strain FC126, complete genome," Jan. 25, 2001 (51 pages).

Gimeno et al., 2011, "Replication of recombinant herpesvirus of turkey expressing genes of infectious laryngotracheitis virus in specific pathogen free and broiler chickens following in ovo and subcutaneous vaccination," Avian Pathol., 40(4):395-403.

European Patent Office, Preliminary Opinion of the Board of Appeal dated May 13, 2022 issued in the Opposition-Appeal of European Patent Patent No. 3185899 B1 (10 pages).

Cook et al., 2024, "Innovax®-ILT-IBD: A Double Recombinant HVT-Based Vaccine for Protection Against IBDV and ILTV Plus Marek's Disease Virus," Annual Meeting of the American Association of Avian Pathologists (AAAP), St. Louis, MI, Jul. 9-11, 2024 (1 page).

Summary of Product Characteristics, from the European Marketing Authorization for Innovax® ILT-IBD filed by the proprietor, Intervet International B.V. on Jan. 26, 2024 in Opposition Proceeding of European Patent No. 3471766 B1 (19 pages).

European Pharmacopoeia 9.0, "Marek's Disease Vaccine (Live), " Apr. 2013:0589, pp. 1073-1075, filed by the proprietor, Intervet International B.V. on Jan. 26, 2024 in Opposition Proceeding of European Patent No. 3471766 B1 (3 pages).

European Pharmacopoeia 11.1, "Avian Infectious Laryngotracheitis Vaccine (Live)," Apr. 2023:1068, pp. 4601-4602, filed by the proprietor, Intervet International B.V. on Jan. 26, 2024 in Opposition Proceeding against European Patent No. 3471766 B1 (2 pages).

European Pharmacopoeia 11.1, "Avian Infectious Bursal Disease Vaccine (Live)," Apr. 2023:0587, pp. 4598-4600, filed by the proprietor, Intervet International B. V. on Jan. 26, 2024 in Opposition Proceeding against European Patent No. 3471766 B1 (3 pages).

European Medicines Agency, Summary of Opinion (initial authorisation) on Innovax® ILT-IBD dated Feb. 17, 2023 (2 pages).

Phenotypic and Genotypic Stability of HVT-IBD-ILT 134 Master Seed Virus following Successive Passage in Chicken Embryo Fibroblast Cells (APHIS Product Code No. 1J81.R0) abstract on stability test-results filed by the proprietor, Intervet International B.V. on Jan. 26, 2024 in Opposition Proceeding of European Patent No. 3471766 B1 (1 page).

* cited by examiner

SEQUENCE LISTING

```
Sequence total quantity: 19
SEQ ID NO: 1           moltype = DNA  length = 1134
FEATURE                Location/Qualifiers
source                 1..1134
                       mol_type = genomic DNA
                       organism = Infectious laryngotracheitis virus
SEQUENCE: 1
atggaccgcc atttattttt gaggaatgct ttttggacta tcgtactgct tcttccttc  60
gctagccaga gcaccgccgc cgtcacgtac gactacattt taggccgtcg cgcgctcgac  120
gcgctaacca taccggcggt tggcccgtat aacagatacc tcactagggt atcaagaggc  180
tgcgacgttg tcgagctcaa cccgatttct aacgtggacg acatgatatc ggcggccaaa  240
gaaaagagag aggggggccc tttcgaggcc tccgtcgtct ggttctacgt gattaagggc  300
gacgacggcg aggacaagta ctgtccaatc tatagaaaag agtacaggga atgtggcgac  360
gtacaactgc tatctgaatg cgccgttcaa tctgcacaga tgtgggcagt ggactatgtt  420
cctagcaccc ttgtatcgcg aaatggcgcg ggactgacta tattctcccc cactgctgcg  480
ctctctggcc aatacttgct gaccctgaaa atcgggagat ttgcgcaaac agctctcgta  540
actctagaag ttaacgatcg ctgtttaaag atcgggtcgc agcttaactt tttaccgtcg  600
aaatgctgga caacagaaca gtatcagact ggatttcaag gcgaacacct ttatccgatc  660
gcagacacca atacacgaca cgcggacgac gtatatcggg gatacgaaga tattctgcag  720
cgctggaata atttgctgag gaaaaagaat cctagcgcgc cagaccctcg tccagatagc  780
gtcccgcaag aaattcccgc tgtaaccaag aaagcggaag ggcgcacccc ggacgcagaa  840
agcagcgaaa agaaggcccc tccagaagac tcggaggacg acatgcaggc agaggcttct  900
ggagaaaatc ctgccgccct ccccgaagac gacgaagtcc ccgaggacac cgagcacgat  960
gatccaaact cggatcctga ctattacaat gacatgcccg ccgtgatccc ggtggaggag  1020
actactaaaa gttctaatgc cgtctccatg cccatattcg cggcgttcgt agcctgcgcg  1080
gtcgcgctcg tggggctact ggtttggagc atcgtaaaat gcgcgcgtag ctaa         1134

SEQ ID NO: 2           moltype = AA  length = 377
FEATURE                Location/Qualifiers
source                 1..377
                       mol_type = protein
                       organism = Infectious laryngotracheitis virus
SEQUENCE: 2
MDRHLFLRNA FWTIVLLSSF ASQSTAAVTY DYILGRRALD ALTIPAVGPY NRYLTRVSRG  60
CDVVELNPIS NVDDMISAAK EKEKGGPFEA SVVWFYVIKG DDGEDKYCPI YRKEYRECGD  120
VQLLSECAVQ SAQMWAVDYV PSTLVSRNGA GLTIFSPTAA LSGQYLLTLK IGRFAQTALV  180
TLEVNDRCLK IGSQLNFLPS KCWTTEQYQT GFQGEHLYPI ADTNTRHADD VYRGYEDILQ  240
RWNNLLRKKN PSAPDPRPDS VPQEIPAVTK KAEGRTPDAE SSEKKAPPED SEDDMQAEAS  300
GENPAALPED DEVPEDTEHD DPNSDPDYYN DMPAVIPVEE TTKSSNAVSM PIFAAFVACA  360
VALVGLLVWS IVKCARS                                                  377

SEQ ID NO: 3           moltype = DNA  length = 1089
FEATURE                Location/Qualifiers
source                 1..1089
                       mol_type = genomic DNA
                       organism = Infectious laryngotracheitis virus
SEQUENCE: 3
atggcatcgc tacttggaac tctggctctc cttgccgcga cgctcgcacc cttcggcgcg  60
atgggaatcg tgatcactgg aaatcacgtc tccgccagga ttgacgacga tcacatcgtg  120
atcgtcgcgc ctcgccccga agctacaatt caactgcagc tatttttcat gcctggccag  180
```

-continued

```
agaccccaca aaccctactc aggaaccgtc cgcgtcgcgt ttcggtctga tataacaaac   240
cagtgctacc aggaacttag cgaggagcgc tttgaaaatt gcactcatcg atcgtcttct   300
gttttttgtcg gctgtaaagt gaccgagtac acgttctccg cctcgaacag actaaccgga   360
cctccacacc cgtttaagct cactatacga aatcctcgtc cgaacgacag cgggatgttc   420
tacgtaattg ttcggctaga cgacaccaaa gaacccattg acgtcttcgc gatccaacta   480
tcggtgtatc aattcgcgaa caccgccgcg actcgcggac tctattccaa ggcttcgtgt   540
cgcaccttcg gattacctac cgtccaactt gaggcctatc tcaggaccga ggaaagttgg   600
cgcaactggc aagcgtacgt tgccacggag gccacgacga ccagcgccga ggcgacaacc   660
ccgacgcccg tcactgcaac cagcgcctcc gaacttgaag cggaacactt tacctttccc   720
tggctagaaa atggcgtgga tcattacgaa ccgacaccg caaacgaaaa ttcaaacgtt   780
actgtccgtc tcgggacaat gagccctacg ctaattgggg taaccgtggc tgccgtcgtg   840
agcgcaacga tcgcctcgt cattgtaatt tccatcgtca ccagaaacat gtgcaccccg   900
caccgaaaat tagacacggt ctcgcaagac gacgaagaac gttcccaaac tagaagggaa   960
tcgcgaaaat ttggacccat ggttgcgtgc gaaataaaca aggggctga ccaggatagt  1020
gaacttgtgg aactggttgc gattgttaac ccgtctgcgc taagctcgcc cgactcaata  1080
aaaatgtga                                                          1089

SEQ ID NO: 4              moltype = AA   length = 362
FEATURE                   Location/Qualifiers
source                    1..362
                          mol_type = protein
                          organism = Infectious laryngotracheitis virus
SEQUENCE: 4
MASLLGTLAL LAATLAPFGA MGIVITGNHV SARIDDDHIV IVAPRPEATI QLQLFFMPGQ    60
RPHKPYSGTV RVAFRSDITN QCYQELSEER FENCTHRSSS VFVGCKVTEY TFSASNRLTG   120
PPHPFKLTIR NPRPNDSGMF YVIVRLDDTK EPIDVFAIQL SVYQFANTAA TRGLYSKASC   180
RTFGLPTVQL EAYLRTEESW RNWQAYVATE ATTTSAEATT PTPVTATSAS ELEAEHFTFP   240
WLENGVDHYE PTPANENSNV TVRLGTMSPT LIGVTVAAVV SATIGLVIVI SIVTRNMCTP   300
HRKLDTVSQD DEERSQTRRE SRKFGPMVAC EINKGADQDS ELVELVAIVN PSALSSPDSI   360
KM                                                                 362

SEQ ID NO: 5              moltype = DNA   length = 1362
FEATURE                   Location/Qualifiers
source                    1..1362
                          mol_type = genomic DNA
                          organism = Infectious bursal disease virus
SEQUENCE: 5
atgacaaacc tgcaagatca aacccaacag attgttccgt tcatacggag ccttctgatg    60
ccaacaaccg gaccggcgtc cattccggac gacaccctgg agaagcacac tctcaggtca   120
gagacctcga cctacaattt gactgtgggg gacacagggt cagggctaat tgtcttttc   180
cctggattcc ctggctcaat tgtgggtgct cactacacac tgcagagcaa tgggaactac   240
aagttcgatc agatgctcct gactgcccag aacctaccgg ccagctacaa ctactgcaga   300
ctagtgagtc ggagtctcac agtgaggtca agcacactcc ctggtggtgt ttatgcacta   360
aacggcacca taaacgccgt gaccttccaa ggaagcctga gtgaactgac agatgttagc   420
tacaatgggt tgatgtctgc aacagccaac atcaacgaca aaattgggaa tgtcctggta   480
ggggaagggg tcactgtcct cagcctaccc acatcatatg atcttgggta tgtgaggctt   540
ggtgacccca ttcccgctat agggcttgac ccaaaaatgg tagctacatg cgacagcagt   600
gacaggccca gagtctacac cataactgca gccgatgatt accaattctc atcacagtac   660
caaccaggtg gggtaacaat cacactgttc tcagccaaca ttgatgctat cacaagcctc   720
agcattgggg gagagctcgt gtttcaaaca gcgtccaag gccttgtact gggcgccacc   780
atctaccta taggctttga tgggactgcg taatcacca gagctgtgcc agcagataat   840
gggctgacgg ccggcaccga caatcttatg ccattcaatc ttgtcattcc aaccaatgag   900
ataacccagc caatcacatc catcaaactg gagatagtga cctccaaaag tggtggtcag   960
gcaggggatc agatgtcatg gtcggcaagt gggagcctag cagtgacgat ccatggtggc  1020
aactatccag gggccctccg tcccgtcaca ctagtacgaa ggcaaacagga              1080
tccgtcgtta cggtcgctgg ggtgagtaac ttcgagctga ttccaaatcc tgaactagca  1140
aagaacctgg ttacagaata cggccgattt gacccaggag ccatgaacta cacaaaattg  1200
atactgagtg agagggaccg tcttggcatc aagaccgtct ggccaacaag ggagtacact  1260
gatttttcgtg agtacttcat ggaggtggcc gacctcaact ctccctgaa gattgcagga  1320
gcatttggct tcaaagacat aatccgggct ataaggaggt aa                     1362

SEQ ID NO: 6              moltype = AA   length = 453
FEATURE                   Location/Qualifiers
source                    1..453
                          mol_type = protein
                          organism = Infectious bursal disease virus
SEQUENCE: 6
MTNLQDQTQQ IVPFIRSLLM PTTGPASIPD DTLEKHTLRS ETSTYNLTVG DTGSGLIVFF    60
PGFPGSIVGA HYTLQSNGNY KFDQMLLTAQ NLPASYNYCR LVSRSLTVRS STLPGGVYAL   120
NGTINAVTFQ GSLSELTDVS YNGLMSATAN INDKIGNVLV GEGVTVLSLP TSYDLGYVRL   180
GDPIPAIGLD PKMVATCDSS DRPRVYTITA ADDYQFSSQY QPGGVTITLF SANIDAITSL   240
SIGGELVFQT SVQGLVLGAT IYLIGFDGTA VITRAVAADN GLTAGTDNLM PFNLVIPTNE   300
ITQPITSIKL EIVTSKSGGQ AGDQMSWSAS GSLAVTIHGG NYPGALRPVT LVAYERVATG   360
SVVTVAGVSN FELIPNPELA KNLVTEYGRF DPGAMNYTKL ILSERDRLGI KTVWPTREYT   420
DFREYFMEVA DLNSPLKIAG AFGFKDIIRA IRR                                453

SEQ ID NO: 7              moltype = DNA   length = 527
FEATURE                   Location/Qualifiers
source                    1..527
```

|  | mol_type = genomic DNA |
|  | organism = Infectious laryngotracheitis virus |

SEQUENCE: 7

```
aaacagctgt actacagagt aaccgatgga agaacatcgg tccagctaat gtgcctgtcg    60
tgcacgagcc attctccgga accttactgt cttttcgaca cgtctcttat agcgagggaa   120
aaagatatcg cgccagagtt atactttacc tctgatccgc aaacggcata ctgcacaata   180
actctgccgt ccggcgttgt tccgagattc gaatggagcc ttaataatgt ttcactgccg   240
gaatatttga cggccacgac cgttgtttcg cataccgctg gccaaagtac agtgtggaag   300
agcagcgcga gagcaggcga ggcgtggatt tctgccgggg gaggcaatat atacgaatgc   360
accgtcctca tctcagacgg cactcgcgtt actacgcgaa aggagaggtg cttaacaaac   420
acatggattg cggtggaaaa cggtgctgct caggcgcagc tgtattcact cttttctgga   480
cttgtgtcag gattatgcgg gagcatatct gctttgtacg caacgct                 527
```

| SEQ ID NO: 8 | moltype = DNA length = 264 |
| FEATURE | Location/Qualifiers |
| source | 1..264 |
|  | mol_type = genomic DNA |
|  | organism = Infectious laryngotracheitis virus |

SEQUENCE: 8

```
tgactattac aatgacatgc ccgccgtgat cccggtggag gagactacta aaagttctaa    60
tgccgtctcc atgcccatat tcgcggcgtt cgtagcctgc gcggtcgcgc tcgtgggggct  120
actggtttgg agcatcgtaa aatgcgcgcg tagctaatcg agcctagaat aggtggtttc   180
ttcctacatg ccacgcctca cgctcataat ataaatcaca tggaatagca taccaatgcc   240
tattcattgg gacgttcgaa aagc                                          264
```

| SEQ ID NO: 9 | moltype = DNA length = 3563 |
| FEATURE | Location/Qualifiers |
| source | 1..3563 |
|  | mol_type = genomic DNA |
|  | organism = Infectious laryngotracheitis virus |

SEQUENCE: 9

```
tcgacggcag agtcgcagac gcccctattg gacgtcaaaa ttgtagaggt gaagttttca    60
aacgatggcg aagtaacggc gacttgcgtt tccaccgtca aatctcccta tagggtagaa   120
actaattgga aagtagacct cgtagatgta atggatgaaa tttctgggaa cagtcccgcc   180
gggggtttta acagtaatga gaaatggcag aaacagctgt actacagagt aaccgatgga   240
agaacatcgg tccagctaat gtgcctgtcg tgcacgagcc attctccgga accttactgt   300
cttttcgaca cgtctcttat agcgagggaa aaagatatcg cgccagagtt atactttacc   360
tctgatccgc aaacggcata ctgcacaata actctgccgt ccggcgttgt tccgagattc   420
gaatggagcc ttaataatgt ttcactgccg gaatatttga cggccacgac cgttgtttcg   480
cataccgctg gccaaagtac agtgtggaag agcagcgcga gagcaggcga ggcgtggatt   540
tctgccgggg gaggcaatat atacgaatgc accgtcctca tctcagacgg cactcgcgtt   600
actacgcgaa aggagaggtg cttaacaaac acatggattg cggtggaaaa cggtgctgct   660
caggcgcagc tgtattcact cttttctgga gattatgcgg gagcatatct gctttgtacg   720
gctttgtacg caacgctatg gaccgccatt tattttgag gaatgctttt tggactatcg   780
tactgctttc ttccttcgct agccagagca ccgccgccgt cacgtacgac tacatttttag   840
gccgtcgcgc gctcgacgcg ctaaccatac cggcggttgg cccgtataac agatacctca   900
ctagggtcat aagaggctgc gacgttgtcg agctcaaccc gatttctaac gtggacgaca   960
tgatatcggc ggccaaagaa aaagagaagg ggggcccttt cgaggcctcc gtcgtctggt  1020
tctacgtgat taagggcgac gacggcgagg acaagtactg tccaatctat agaaaagagt  1080
acagggaatg tggcgacgta caactgctat ctgaatgcgc cgttcaatct gcacagatgt  1140
gggcagtgga ctatgttcct agcacccttg tatcgcgaga tggcgcggga ctgactatat  1200
tctcccccac tgctgcgctc tctgccaat acttgctgac cctgaaaatc gggagattta   1260
cgcaaacagc tctcgtaact ctagaagtta acgatcgctg tttaaagatc gggtcgcagc  1320
ttaacttttt accgtcgaaa tgctggacaa cagaacagta tcagactgga tttcaaggcg  1380
aacacctttta tccgatcgca gacaccaata cacgacacgg gacgacgta tatcggggat  1440
acgaagatat tctgcagcgc tggaataatt tgctgaggaa aaagaatcct agcgcgccaa  1500
accctcgtcc agatagcgtc ccgcaagaaa ttcccgctgt aaccaagaaa gcggaagggc  1560
gcaccccgga cgcagaaagc agcgaaaaga aggcccctcc agaagactcg gaggacgaca  1620
tgcaggcaga ggcttctgga gaaaatcctg ccgccctccc cgaagacgac gaagtccccg  1680
aggacaccga gcacgatgat ccaaactcgg atcctgacta ttacaatgac atgcccgccg  1740
tgatcccggt ggaggagact actaaaagtt ctaatgccgt ctccatgccc atattcgcgg  1800
cgttcgtagc ctgcgcggtc gcgctcgtgg ggctactggt ttggagcatc gtaaaatgcg  1860
cgcgtagcta atcgagccta gaataggtgg tttcttccta catgccacgc ctcacgctca  1920
taataaat cacatggaat agcataccaa tgcctattca ttgggacgtt cgaaaagcat   1980
ggcatcgcta cttggaactc tggctctcct tgccgcgacg ctcgcaccct tcggcgcgat  2040
gggaatcgtg atcactggaa atcacgtctc cgccaggatt gacgacgatc acatcgtgat  2100
cgtcgcgcct cgcccgaag ctacaattca actgcagcta ttttttcatgc ctggccagag  2160
acccacaaa ccctactcag gaaccgtccg cgtcgcgttt cggtctgata taacaaacca   2220
gtgctaccag gaacttagcg aggagcgctt tgaaaattgc actcatcgat cgtcttctgt  2280
tttttgtcggc tgtaaagtga ccagtacgac gttctccgcc tcgaacgac taaccggacc   2340
tccacacccg tttaagctca ctatacgaaa tcctcgtccg aacgcagcg gatgttcta   2400
cgtaattgtt cggctagacg acaccaaaga acccattgac gtcttcgcga tccaactatc  2460
ggtgtatcaa ttcgcgaaca ccgccgcgac tcgcggactc tattccaagg cttcgtgtcg  2520
caccttcgga ttacctaccg tccaacttga gcctatctc aggaccgagg aaaagttggcg  2580
caactggcaa gcgtacgttg ccacggagcc cacgacgacc agccgcgagg cgacaacccc  2640
gacgcccgtc actgcaacca gcgcctccga acttgaagcg gaacactta ccttttccctg  2700
gctagaaaat ggcgtggatc attacgaacc gacaccgca acgaaaatt caacgttac   2760
tgtccgtctc gggacaatga gccctacgct aattgggta accgtggctg ccgtcgtgag  2820
cgcaacgatc ggcctcgtca ttgtaatttc catcgtcacc agaaacatgt gcaccccgca  2880
```

```
ccgaaaatta gacacggtct cgcaagacga cgaagaacgt tcccaaacta gaagggaatc    2940
gcgaaaattt ggacccatgg ttgcgtgcga aataaacaag ggggctgacc aggatagtga    3000
acttgtggaa ctggttgcga ttgttaaccc gtctgcgcta agctcgcccg actcaataaa    3060
aatgtgatta agtctgaatg tggctctcca atcatttcga ttctctaatc tcccaatcct    3120
ctcaaaaggg gcagtatcgg acacggactg ggaggggcgt acacgatagt tatatggtac    3180
agcagaggcc tctgaacact taggaggaga attcagccgg ggagagcccc tgttgagtag    3240
gcttgggagc atattgcagg atgaacatgt tagtgatagt tctcgcctct tgtcttgcgc    3300
gcctaacttt tgcgacgcga cacgtcctct ttttggaagg cactcaggct gtcctcgggg    3360
aagatgatcc cagaaacgtt ccggaaggga ctgtaatcaa atggacaaaa gtcctgcgga    3420
acgcgtgcaa gatgaaggcg gccgatgtct gctcttcgcc taactattgc tttcatgatt    3480
taatttacga cggaggaaag aaagactgcc cgcccgcggg acccctgtct gcaaacctgg    3540
taattttact aaagcgcggc gaa                                             3563

SEQ ID NO: 10          moltype = DNA  length = 1391
FEATURE                Location/Qualifiers
source                 1..1391
                       mol_type = genomic DNA
                       organism = Murine cytomegalovirus
SEQUENCE: 10
aactccgccc gttttatgac tagaaccaat agtttttaat gccaaatgca ctgaaatccc      60
ctaatttgca aagccaaacg ccccctatgt gagtaatacg gggactttt acccaatttc     120
ccacgcggaa agccccctaa tacactcata tggcatatga atcagcacgg tcatgcactc     180
taatggcggc ccatagggac tttcacata ggggcgttc accatttccc agcataggg      240
tggtgactca atggccttta cccaagtaca ttgggtcaat gggaggtaag ccaatgggtt     300
tttcccatta ctggcaagca cactgagtca aatgggactt tccactgggt tttgcccaag     360
tacattgggt caatgggagg tgagccaatg ggaaaaaccc attgctgcca agtacactga     420
ctcaataggg actttccaat gggttttttcc attgttggca agcatataag gtcaatgtgg     480
gtgagtcaat agggactttc cattgtattc tgcccagtac ataaggtcaa taggggtga      540
atcaacagga aagtcccatt ggagccaagt acactgcgtc aatagggact ttccattggg     600
ttttgcccag tacataaggt caataggga tgagtcaatg ggaaaaaccc attggagcca     660
agtacactga ctcaataggg actttccatt gggttttgcc cagtacataa ggtcaatagg     720
gggtgagtca acaggaaagt tccattggag ccaagtacat tgagtcaata gggactttcc     780
aatgggtttt gcccagtaca taaggtcaat gggaggtaag ccaatgggtt tttcccatta     840
ctggcacgta tactgagtca ttagggactt tccaatgggt tttgcccagt acataaggtc     900
aataggggtg aatcaacagg aaagtcccat tggagccaag tacactgagt caatagggac     960
tttccattgg gttttgccca gtacaaaagg tcaataggg gtgagtcaat gggttttcc    1020
cattattggc acgtacataa ggtcaatagg ggtgagtcat gggtttttc cagccaattt    1080
aattgaaaacg ccatgtactt tcccaccatt gacgtcaatg ggctattgaa actaatgcaa    1140
cgtgcccttt aaacggtact ttcccatagc tgattaatgg gaaagtaccg ttctcgagcc    1200
aatacacgtc aatgggaagt gaaagggcag ccaaaacgta acaccgcccc ggttttccc    1260
tggaaattcc atattggcac gcattctatt ggctgagctg cgttctacgt gggtataaga    1320
ggcgcgacca gcgtcggtac cgtcgcagtc ttcggtctga ccaccgtaga acgcagagct    1380
cctcgctgca g                                                        1391

SEQ ID NO: 11          moltype = DNA  length = 692
FEATURE                Location/Qualifiers
misc_difference        141..143
                       note = n is a, c, g, or t
source                 1..692
                       mol_type = genomic DNA
                       organism = Gallus gallus
SEQUENCE: 11
cgcgccggat cagatctcca tggtcgaggt gagcccacg ttctgcttca ctctcccat       60
ctcccccccc tcccaccccc caattttgta tttatttat ttttaattat tttgtgcagc     120
gatggggggg gggggggggg nnncgcgcgc caggcgggc ggggcggggc gaggggcggg     180
gcggagaggt gcggcggcag ccaatcagag cggcgcgctc cgaaagtttc                240
cttttatggc gaggcggcgg cggcggcggc cctataaaaa gcgaagcgcg cggcgggcgg     300
gagtcgctgc gcgctgcctt cgccccgtgc ccgctccgc cgccgcctcg cgccgccgc      360
cccggctctg actgaccgcg ttactcccac aggtgagcgg cgggacggc cccttctcctc    420
cgggctgtaa ttagcggcag gaagggaaatg ggcggggagg gccttcgtgc gtcgccgcgc    480
cgccgtcccc ttctccctct ccagcctcgg ggctgtccgc gggggacgg ctgccttcgg    540
gggggacggg gcagggcggg gttcggcttc tggcgtgtga ccggcggctc tagagcctct    600
gctaaccatg ttcatgcctt cttctttttc ctacagctcc tgggcaacgt gctggttatt     660
gtgctgtctc atcatttttgg caaagaattg ca                                  692

SEQ ID NO: 12          moltype = DNA  length = 301
FEATURE                Location/Qualifiers
source                 1..301
                       mol_type = genomic DNA
                       organism = Human cytomegalovirus
SEQUENCE: 12
ggcagtacat ctacgtatta gtcatcgcta ttaccatggt gatgcggttt tggcagtaca      60
tcaatgggcg tggatagcgg tttgactcac ggggattcc aagtctccac cccattgacg     120
tcaatgggag tttgttttgg caccaaaatc aacgggactt tccaaaatgt cgtaacaact     180
ccgccccatt gacgcaaatg gccgtaggc gtgtacggtg gaggtctat ataagcagag      240
ctcgtttagt gaaccgtcag atcgcctgga gacgccatcc acgctgtttt gacctccata     300
g                                                                     301

SEQ ID NO: 13          moltype = DNA  length = 55
```

```
FEATURE                Location/Qualifiers
source                 1..55
                       mol_type = genomic DNA
                       organism = Feline herpesvirus
SEQUENCE: 13
caataaacat agcatacgtt atgacatggt ctaccgcgtc ttatatgggg acgac       55

SEQ ID NO: 14          moltype = DNA  length = 370
FEATURE                Location/Qualifiers
source                 1..370
                       mol_type = genomic DNA
                       organism = Herpes simplex virus
SEQUENCE: 14
gatccataat tgattgacgg gagatggggg aggctaactg aaacacggaa ggagacaata  60
ccggaaggaa cccgcgctat gacggcaata aaaagacaga ataaaacgca cgggtgttgg  120
gtcgtttgtt cataaacgcg gggttcggtc ccagggctgg cactctgtcg ataccccacc  180
gagaccccat tggggccaat acgcccgcgt ttcttccttt tccccacccc accccccaag  240
ttcgggtgaa ggcccagggc tcgcagccaa cgtcggggcg gcaggccctg ccatagccac  300
tggccccgtg ggttagggac ggggtccccc atggggaatg gtttatggtt cgtgggggtt  360
attattttga                                                         370

SEQ ID NO: 15          moltype = DNA  length = 14113
FEATURE                Location/Qualifiers
misc_feature           1..14113
                       note = Herpesvirus of turkeys, Murine cytomegalovirus,
                        Infectious bursal disease virus, Simian vacuolating virus
                        40, and Infectious laryngotracheitis virus
source                 1..14113
                       mol_type = other DNA
                       organism = synthetic construct
SEQUENCE: 15
gaattccaga ctaaatgccc cggcccaatt tgtcaagtgt gcagtcacgg aggcgtcgac  60
cgtgtccccg gcattaaaca ggaaagcgtt aaagtttttg aatgttaggt cacaggtaca  120
aacataaatg tttgtacaaa caggtaacag gtacaaacat aaatgccccg gcataaatgt  180
cccttacggc ggatcgaaac gacattaggc atactcgggt accattttgc attccgatca  240
gcacggatga aattaggcag gaatgcggtt tatattatgc ggcattggac aaacgatatg  300
gcattgattg gcagtttatg aatgtcttca tgttgggcgt aaacggattc ctattggttc  360
agaagacaac gacgatatat ttagagagaa aaagctaccc agcataggat aaacacacat  420
tgagcattga gagacatagg tatcggtatg gatgggaaaa ctacacacgt gaacaccaaa  480
cgacttatat actcgagcgg tgatactact gagcaagaat gcactgcatc tgagccactg  540
aatgaagact gtgatgaaaa tgtgaccatc gatggaattg gagaagaata tgcgcagttc  600
ttcatgtccc cgcaatgggt cccaaatcta catcgcttga gcgaggatac caaaaaggta  660
taccgatgta tggtttccaa cagactcaat tattttccct attatgaggc gttcaggcgg  720
tctttgtttg atatgtatat gctaggtcgg ttggggcgtc gacttaagcg atctgactgg  780
gagactatta tgcatctgtc accaacgcaa agtcggcgtc tacatagaac tttaagattt  840
gtggagcgta gaattatccc atctaacagt tatatacgca catcgggcca cgttccgcct  900
tcgagggcac ttccgacaga tacgaattta aagatggatg aataattaaa ttggaaagag  960
taactacatt aatcgagcgt catgacggcg tcccgtgaaa atgggaattt tctactcgaa  1020
acaccgtgac atttgacaga cctggaattg ttattctgat atatagtggg tgtgtctggc  1080
cggcaacata cataatgtgc atgcgaaacc actttttcag tgtacgctga cattgtgcaa  1140
cacggagggg tagcatctac atacaatata tgttgattaa tgattggaga aaaaactatg  1200
cagctcgccg atcatatggc taactcgcct tcgtctatat ggcggacccc gcgggaaaaa  1260
tcgacgtacc atctgattta caacaccagt aatgaacatg tcgcatccct gcccagatct  1320
gtgcgcccat tggcgcggat cgttgtgaat gccgccgaaa cacttcaggt cggtatgaga  1380
gccgggaggc cgccatcagc aggagtttgg cgagaggtgt ttgatagaat gatgacagcc  1440
ttccgtgacc acgagcctac tgcgacattt aatgctgcaa atcccattag aaaaatggtc  1500
gagacagttc tacagaataa tgaagagccc ccgcggacgc atgctgaaat gggtaatcgc  1560
cttatgaaca ttatgtactg gtgttgcttg ggacacgcag gacaatgctc gatatggcag  1620
ttgtacgaga cgaatcaggc cattttaagt ttattagatg aagtggttat cggcacaaca  1680
aatccctttt gcaccctcga gcaatactgg aagccattat gcaccgcaat cgccaacaag  1740
gggacctcat cgcttgttga ggatgccaaa gtggccgagt acctggttag catgcgcaaa  1800
ttgatataac ataggcacgc tctgatgtta cagaccacaa taccgcatac atttattgta  1860
aggttgttaa taaaggttta ttctatgtaa gactacaata ctttcgacat tgcttgtata  1920
catattaaat actttctcaa gttcctatta cataaaatgg gatctatcat tacattcgtt  1980
aagagtctgg ataattttac tgtttgccag cttcgatctt ggaacgtact gtggatagtg  2040
ccttacttgg aatcgtgaaa atttgaaacg tccattattt ggatatcttc cggttgtccc  2100
atatcccgcc ctggtaccgc tcggatacct tgcccgtatg gattcgtatt gacagtcgcg  2160
caatcgggga ccaacaacgc gtgggtccac actcattcgg aaattttccg atgattctga  2220
atatttattg ccgctcgtta cgagtcgttg gacatatctg taatacattt cttcttctga  2280
aggatcgctg cacatttgat ctatacattg gccaggatgt tcaagtctca gatgttgcat  2340
tctggcacag cacaacttta tggcatttcc gatgtaatcg tccggcagcc ctgggggagt  2400
tctatattcg catattggga tggtaaggac aatagcagat ctcgcaacct ccagggaggc  2460
tataataacg tttttaaagg atggatttct cataaaaatc tgtcgcaaat tacactgaga  2520
atatccttta ctagcgccga ttgagagcat cgtcgtccaa ttttctaaat ggaaagaaaa  2580
caaggcgggc aagagtgttc caaacatttt cattttcggc gaatctctca aatcccatgg  2640
cgtgcaattg attgcaaaat tggcacttcc gttcacgttt gtatctccaa actctaagac  2700
acttttaatt gaaaaactac gttctagtgt ggaaagaaac ctataggcag accatagaac  2760
tatttgacac cacatatctt tttgtatgtc aaactgacca tgatcgtatg ttgctgaatg  2820
cactagggca attcgctcgc gcgactccat acattgaata attccacacg tcagctcatc  2880
```

```
ggttagcaag gtccagtagt tgaagtcatt tattttttccc cgcggctggc caaatctacc    2940
tctgggaata tccaagttgt cgaatatgat cgcaccggct ctggtcatgg tgaaggaact    3000
gtagcataaa gacgcaggta tcatagggt aatattttt tattcactca catactaaaa    3060
gtaacgcata ttagcaccat gtatgggcta tcaattgaca tttgcgtagc actacatcac    3120
gattatgtac aacataatgg gacaacatat ggcaagtaga tgcaatttcc tcacactagt    3180
tgggtttatc tactattgaa ttttccccta tctgtgatac acttgggagc ctctacaagc    3240
atattgccat catgtacgtt tttatctact gtcttaacgc ccatgggaac ggaggcgtcg    3300
tcgtcatgta ttggacggca acataggcag caacacaaat tgcgtttagg tggggtgcat    3360
gtggactcga taccaagccc ctgcagctgg ggaacgtctg gtggagagcc gataatttga    3420
tatacgcacg ccatattact gtcgttgaag tacgccttat cttctatgtt ttcaaattta    3480
ggttcccaag tggacgtgag aagtgtttgt atctccacatg gaatgggccca aggcattcca    3540
gcccaggtgc ctggtacttt aatggcaaac aaacgttttg gtagaggtat tgattctatt    3600
gcagttctgc agatatctgc agccccgagt atccacaggc tatacgatac gttatggag    3660
gcaagctgcg gccgctctag aactagtgga tcccccgggc tgcagcccaa tgtggaattc    3720
gcccttgcac attgttactc ctgcatctta aaaatatatc ctgtagtaat tttcacagca    3780
atgtcataac atcatctcgc taaagaatga cctgggattg gagaagtaat gaatatttgc    3840
aaccaatgca ttgaataaac taacattaaa cgaattcact agtggatccc ccaactccgg    3900
ccgttttatg actagaacca atagtttttta atgccaaatg cactgaaatc ccctaatttg    3960
caaagccaaa cgcccccctat gtgagtaata cggggacttt ttacccaatt tcccacgcgg    4020
aaagcccct aatacactca tatgcatat gaatcagcac ggtcatgcac tctaatggcg    4080
gcccataggg actttccaca taggggggcgt tcacctattc ccagcatagg ggtggtgact    4140
caatggcctt tacccaagta cattgggtca atgggaggta agccaatggg ttttcccat    4200
tactggcaag cacactgagt caaatgggac tttccactgg gttttgccca agtacattgg    4260
gtcaatggga ggtgagccaa tgggaaaaac ccattgctgc caagtacact gactcaatag    4320
ggactttcca atgggttttt ccattgttgg caagcatata aggtcaatgt gggtgagtca    4380
atagggactt tccattgtat tctgcccagt acataaggtc aataggggt gaatcaacag    4440
gaaagtccca ttggagccaa gtacactgcg tcaataggga cttccattg ggttttgccc    4500
agtacataag gtcaataggg gatgagtcaa tgggaaaaac ccattggagc caagtacact    4560
gactcaatag ggactttcca ttgggttttg cccagtacat aaggtcaata ggggtgagt    4620
caacaggaaa gttccattgg agccaagtac attgagtcaa tagggactttt ccaatgggtt    4680
ttgcccagta cataaggtca atgggaggta agccaatggg ttttttcccat tactggcacg    4740
tatactgagt cattagggac tttccaatgg ttttgccca gtacataagg tcaataggg    4800
tgaatcaaca ggaaagtccc attggagcca gtacactga gtcaatagg acttccatt    4860
gggttttgcc cagtacaaaa ggtcaatagg gggtgagtca atgggttttt cccattattg    4920
gcacgtacat aaggtcaata ggggtgagtc attgggtttt tccagccaat ttaattaaaa    4980
cgccatgtac tttcccacca ttgacgtcaa tgggctattg aaactaatgc aacgtgacct    5040
ttaaacggta ctttcccata gctgattaat gggaaagtac cgttctcgag ccaatacacg    5100
tcaatggaaa gtgaaagggc agccaaaacg taacaccgcc ccggttttcc cctggaaatt    5160
ccatattggc acgcattcta ttggctgagc tgcgttctac tggtggtataa gaggcgcgac    5220
cagcgtcggt accgtcgcag tcttcggtct gaccaccgta gaacgcagag ctcctcgctg    5280
caggcggccg ctctagaact cgtcgatcgc agcgatgaca aacctgcaag atcaaaccca    5340
acagattgtt ccgttcatac ggagccttct gatgccaaca accggaccgg cgtccattcc    5400
ggacgcacc ctggagaagc acactctcag gtcagagacc tcgacctaca atttgactgt    5460
ggggacaca gggtcagggc taattgtctt tttccctgga ttccctggct caattgtggg    5520
tgctcactac acactgcaga gcaatgggaa ctacaagttc gatcagatgc tcctgactgc    5580
ccagaaccta ccggccagct acaactactg cagactagta gtcggagtc tcacagtgag    5640
gtcaagcaca ctccctggtg gcgtttatgc actaaacggc accataaacg ccgtgacctt    5700
ccaaggaagc ctgagtgaac tgacagatgt tagctacaat gggttgatgt ctgcaacagc    5760
caacatcaac gacaaaattg ggaatgtcct ggtaggggaa ggggtcactg tcctcagcct    5820
acccacatca tatgatcttg ggtatgtgag gcttggtgac cccattcccg ctataggct    5880
tgacccaaaa atggtagcta catgcgacag cagtgacagg cccagagtct acaccataac    5940
tgcagccgat gattaccaat tctcatcaca gtaccaacca ggtgggtaaa caatcacact    6000
gttctcagcc aacattgatg ctatcacaag cctcagcatt ggggagagc tcgtgtttca    6060
aacaagcgtc caaggccttg tactgggcgc caccatctac cttataggct tgatggac    6120
tgcgtaatc accagagctg tggccgcaga taatgggctg acggccggca ccgacaatc    6180
tatgccattc aatcttgtca ttccaaccaa tgagataacc cagccaatca catccatcaa    6240
actgagata gtgacctcca aaagtggtgg tcaggcaggg gatcagatgt catggtcggc    6300
aagtgggagc ctagcagtga cgatccatgg tggcaactat ccaggggccc tccgtcccgt    6360
cacactagta gcctacgaaa gagtggcaac aggatccgtc gttacggtcg ctggggtgag    6420
taacttcgag ctgattccaa atcctgaact agcaaagaac ctggttacag aatacgccg    6480
atttgaccca ggagccatga actacacaaa attgatactg agtgagaggg accgtcttgg    6540
catcaagacc gtctggccaa caagggagta cactgatttt cgtgagtact tcatggaggt    6600
ggccgacctc aactctcccc tgaagattgc aggagcattt ggcttcaaag acataaatcg    6660
ggctataagg aggtaagctt cagacatgat aagatacatt gatgagttg gacaaaccac    6720
aactagaatg cagtgaaaaa aatgcttat ttgtgaaatt tgtgatgcta ttgctttatt    6780
tgtaaccatt ataagctgca ataaacaagt taacaacaac aattgcattc attttatgtt    6840
tcaggttcag ggggaggtgt ggggaggttt ttcggatcct ctagagtcga cggcagagtc    6900
gcagacgccc ctattggacg tcaaaattgt agaggtgaag ttttcaaacg atggcgaagt    6960
aacggcgact tgcgtttcca ccgtcaaatc tccctatgg gtagaaacta attggaaagt    7020
agacctcgta gatgtaatgg atgaaatttc tgggaacagt cccgccgggg ttttaacag    7080
taatgagaaa tggcagaaac agctgtacta cagagtaacc gatggaagaa catcggtcca    7140
gctaatgtgc ctgtcgtgca cgagccattc tccggaacct tactgtcttt tcgacacgtc    7200
tcttatagcg agggaaaaag atatcgcgcc agagttatac tttacctctg atccgcaaac    7260
ggcatactgc acaataactc tgccgtccgg ccgttgttccg agattcgaat ggagccttaa    7320
taatgtttca ctgccggaat atttgacggc cacgaccgtt gtttcgcata ccgctgccga    7380
aagtacagtg tggaagagca gcgcgagagc aggcgaggcg tggatttctg gccggggagg    7440
caatatatac gaatgcaccg tcctcatctc agacggcact cgcgttacta cgcgaaagga    7500
gaggtgctta acaaacacat ggattgcggt ggaaaacggt gctgctcagg cgcagctgta    7560
ttcactcttt tctggacttg tgtcaggatt atgcgggagc atatctgctt tgtacgcaac    7620
```

```
gctatggacc gccatttatt tttgaggaat gcttttttgga ctatcgtact gctttcttcc   7680
ttcgctagcc agagcaccgc cgccgtcacg tacgactaca ttttaggccg tcgcgcgctc   7740
gacgcgctaa ccataccggc ggttggcccg tataacagat acctcactag ggtatcaaga   7800
ggctgcgacg ttgtcgagct caacccgatt tctaacgtgg acgacatgat atcggcggcc   7860
aaagaaaaag agaaggggg ccctttcgag gcctccgtcg tctggttcta cgtgattaag    7920
ggcgacgacg gcgaggacaa gtactgtcca atctataga aagagtacag ggaatgtggc    7980
gacgtacaac tgctatctga atgcgccgtt caatctgcac agatgtgggc agtggactat   8040
gttcctagca cccttgtatc gcgaaatggc gcgggactga ctatattctc ccccactgct   8100
gcgctctctg gccaatactt gctgaccctg aaaatcggga gatttgcgca aacagctctc   8160
gtaactctag aagttaacga tcgctgttta aagatcgggt cgcagcttaa cttttttaccg   8220
tcgaaatgct ggacaacaga acagtatcag actggatttc aaggcgaaca cctttatccg   8280
atcgcagaca ccaatacacg acacgcggac gacgtatatc ggggatacga agatattctg   8340
cagcgctgga ataatttgct gaggaaaaag aatcctagcg cgccagaccc tcgtccagat   8400
agcgtcccgc aagaaattcc cgctgtaacc aagaaagcgg aagggcgcac cccggacgca   8460
gaaagcagcg aaaagaaggc ccctccagaa gactcggagg acgacatgca cggcagaggct   8520
tctgagaaa atcctgccgc cctccccgaa gacgacgaag tccccgagga caccgagcac   8580
gatgatccaa actcggatcc tgactattac aatgacatgc ccgccgtgat cccggtggag   8640
gagactacta aaagttctaa tgccgtctcc atgcccatat tcgccggcgt cgtagcctgc   8700
gcggtcgcgc tcgtggggct actggtttgg agcatcgtaa aatgcgcgcg tagctaatcg   8760
agcctagaat aggtggtttc ttcctacatg ccacgcctca cgctcataat ataaatcaca   8820
tggaatagca taccaatgcc tattcattgg gacgttcgaa aagcatggca tcgctacttg   8880
gaactctggc tctccttgcc gcgacgctcg cacccttcgg cgcgatggga atcgtgatca   8940
ctggaaatca cgtctccgcc aggattgacg acgatcacat cgtgatcgtc gcgcctcgcc   9000
ccgaagctac aattcaactg cagctatttt tcatgcctgg ccagagaccc cacaaaccct   9060
actcaggaac cgtccgcgtc gcgtttcggt ctgatataac aaaccagtgc taccaggaac   9120
ttagcgagga gcgctttgaa aattgcactc atcgatcgtc ttctgttttt gtcggctgta   9180
aagtgaccga gtacacgttc tccgcctcga acagactaac cggacctcca cacccgttta   9240
agctcactat acgaaatcct cgtccgaacg acagcgggat gttctacgta attgttcggc   9300
tagacgacac caaagaaccc attgacgtct tcgcgatcca actatcggtg tatcaattcg   9360
cgaacaccgc cgcgactcgc ggactctatt ccaaggcttc gtgtcgcacc ttcggattac   9420
ctaccgtcca acttgaggcc tatctcagga ccgaggaaag ttggcgcaac tggcaagcgt   9480
acgttgccac ggaggccacg acgaccagcc ccgaggcgac aacccgacg cccgtcactg    9540
caaccagcgc ctccgaactt gaagcggaac actttacctt tccctggcta gaaaatggcg   9600
tggatcatta cgaaccgaca cccgcaaacg aaaattcaaa cgttactgtc cgtctcggga   9660
caatgagccc tacgctaatt ggggtaaccg tggctgccgt cgtgagcgca acgatcggcc   9720
tcgtcattgt aatttccatc gtcaccagaa acatgtgcac cccgcaccga aaattagaca   9780
cggtctcgca agacgacgaa gaacgttccc aaactagaag ggaatcgcga aaatttggac   9840
ccatggttgc gtgcgaaata acaagggggg ctgaccagga tagtgaactt gtggaacttg   9900
ttgcgattgt taacccgtct gcgctaagct cgcccgacto aataaaaatg tgattaagtc   9960
tgaatgtggc tctccaatca tttcgattct ctaatctccc aatcctctca aaaggggcag  10020
tatcggacac ggactgggag gggcgtacac gatagttata tggtacagca gaggcctctg  10080
aacacttagg aggagaattc agccggggag agccctgtt gagtaggctt gggagcatat    10140
tgcaggatga acatgttagt gatagttctc gcctcttgtc ttgcgcgcct aacttttgca  10200
acgcgacacg tcctctttttt ggaaggcact caggctgtcc tcggggaaga tgatcccaga  10260
aacgttccgg aagggactgt aatcaaatgg acaaaagtcc tgcggaacgc gtgcaagatg  10320
aaggcggccg atgtctgctc ttcgcctaac tattgctttc atgatttaat ttacgacgga  10380
ggaaagaaag actgcccgcc cgcggggaccc ctgtctgcaa acctggtaat tttactaaag  10440
cgcggcgaag cttagcttgc ctccgattct agcattacat agccggtcag tagatcctgc  10500
cattcggtag cgcaaccggc tacatcttca aacagtctca cgataaatgc atctctcgtt  10560
cctgccaatc cggaaccggg cataccactc ccgcctgccg atttaattct cacaattggg  10620
cgatgccggc ggggcaaaac gaatgtggat ttggcaaacc gacacaggtc tgctgtacgg  10680
actaatatgg gcacacccac atcattcttc agatgctcca tgcattgttc tatgagaaag  10740
atccataggg tggaggcagc gtcacgagat cgcccaggca atcgatcgca ttcgtctagt  10800
aaagtgacga gagttatcat gcacacaccc atgcccacgc cttccgaata actggagctg  10860
tggaagatcg gaaacgtctt tttgactgcc ggtctcgtac tactttcgca caggtgtata  10920
ccccggacgcg tactatatat tttatatcat ccaacgtccg aaattacata cgtggcggca  10980
atggaagtag atgttgagtc ttcgaaagta agtgcctcga atatgggtat tgtctgtgaa  11040
aatatcgaaa gcggtacgac ggttgcagaa ccgtcgatgt cgccagatac tagtaacaat  11100
agcttcgata acgaagactt ccgtgggcct gaatacgatg tggagataaa taccagaaaa  11160
tctgctaatc ttgatcgtat ggaatcttcg tgccgtgaac aacgagcggc gtgcgaactt  11220
cgaaagtgtt cgtgtcctac gtctgccgtg cgcatgcaat acagtattct ttcatctctc  11280
gctccgggtt cagagggtca tgtatatata tgtactagat acggggacgc ggaccaaaaa  11340
aaatgcatag tgaaggcagt cgttggagga aagaatcccg ggagggaagt ggatatttta  11400
aaaaccatct cacataaatc aattataaaa ttaatccata cctataaatg gaaaaatgtt  11460
gtgtgtatgg caatgcgtgt atatcgttat gatcttttca catatattga cggagtcggc  11520
cctatgcccc ttcaacagat gatctatatt caacgtggac tactagaggc gctagcatac  11580
atacatgaaa ggggcatcat tcaccgagac gtaaagacgg agaatatatt cttggataat  11640
cacgaaaatg cagtttttggg tgacttcggt gctgcatgcc aactaggaga ttgtatagat  11700
acgcccaat gttacggttg gagcggaact gtggaaacaa attcgccgga attatctgca   11760
cttgatccgt attgcacaaa acagatatt tggagtgccg gattggttct atatgagatg    11820
gcaattaaaa atgtaccatt gtttagtaag caggtgaaaa gttcgggatc tcagctgaga  11880
tccataatac ggtgcatgca agtgcatgaa ctggagtttc cccgcaacga ttctaccaac  11940
ctctgtaaac atttcaaaca atatgcggtt cgtgtacgac cgccttatac cattcctcga  12000
gttataagaa atggggggat gccaatggat gttgaatatg tcatttctaa aatgcttacg  12060
tttgaccagg agttcagacc ttctgctaag gaaattattga atatgcccct atttactaag  12120
gcgccgatta acctgcttaa tatcacaccc tctgacagtg tctaacggta tacaggcggg  12180
agcgggtcgt ggcgtcatca tcaccacttg agaatttata ttttgaattg ttgattgata  12240
aattaacctg attcattgag aactgaaacg ccatattggt ttcttggata tgtctacaac  12300
aattagttaa attgctatgt tctactgcga gtaacatttg ataagttgta agagacgggc  12360
```

```
gactcatgtc gaagttgacg aatataaagt acataacgtg tttagaatac ccagaatccg  12420
aatagtccgc gggggcgtct tctcgcgtga gtaccaaata ctgagttgaa cttgaaaatg  12480
ctaaatctgt gacactcttt gtgtgatgat tattgtcacc acttcgaaga tggcttcgac  12540
attcatgatg ttctggtgtt tgtttggaat cgtaatagcg cttgtttcgt ccaagtctga  12600
caacaaagaa aatctgaaga attatatcac ggataagtca accaatatta gaatacccac  12660
gccattattt gtatcaacgg aaaactctta tcccacaaaa catgtaatct acgatgaaaa  12720
ctgtggcttc gctgtactca atcctataag tgaccccaaa tatgtccttt tgagccagct  12780
tctaatggga aggcgcaaat atgatgcgac ggtcgcgtgg tttgttctcg gtaaaatgtg  12840
tgccagatta atatatttgc gcgaatttta taactgctcg acaaatgagc cttttggcac  12900
atgttctatg agctctcctg gatggtggga caggcgctac gtctcaacca gtttcatttc  12960
tcgcgacgaa ttacagctgg tttttgcagc gccgtcccga gaattagatg gtttatatac  13020
gcgcgtagta gttgtcaacg gggactttac tacggccgat ataatgttta atgttaaagt  13080
ggcatgtgcc ttttcaaaga ctggaataga agatgataca ttatgcaaac cctttcattt  13140
ctttgccaat gcaacattgc acaatttaac catgattaga tcggtaactc ttcgagcgca  13200
cgaaagccat ttaaaggaat gggtggcacg gagaggtggt aacgtccctg cagtgctact  13260
tgagtctacc atgtatcatg catccaatct gcctagaaat ttcagggatt tctacataaa  13320
gtctccagat gattataagt ataatcacct agatgggcca tctgtaatgc tcatcactga  13380
cagacctagt gaagatttgg atgggaggct cgttcaccaa agtgacattt ttactactac  13440
aagtcctata aaacaggtcc ggtatgaaga gcatcagtca catacaaagc agtatcctgt  13500
aaacaaaata caagctataa ttttttgat agggttaggc tcgttcattg gaagcatatt  13560
cgtagttttg gtagtatgga ttatacgcag atattgcaat ggagcgcgga gtgggggaac  13620
gccccccagt cctcgccggt atgtgtatac caggctatga tcacgtgtga aacttgggcg  13680
gacctgtatc atatgtacac cgtccctatt cgtttatagc cagtacgtgt tatctgcaca  13740
tagaggaaca tgtgtcatac tgggatcgca tgcatggtat gtgtgactct aatattattc  13800
tgtatcataa taaaaacaca gtgcatggta tatagaggat cgctggtaag cactacggta  13860
gaccaatcgg ctcagattgc attctttggc atcgataccg ttgttaattt atatggcaaa  13920
gtcttgttca tgggagatca gtatttggag gaaatatact ctggaacgat ggaaatactc  13980
aaatggaatc aagctaaccg ctgctattct attgcgcatg caacatatta cgccgactgt  14040
cctataatca gttctacggt attcagagga tgccgggacg ccgttgttta tactaggccc  14100
cacagcagaa ttc                                                     14113
```

```
SEQ ID NO: 16           moltype = DNA  length = 13064
FEATURE                 Location/Qualifiers
misc_feature            1..13064
                        note = Herpesvirus of turkeys, Infectious laryngotracheitis
                         virus, Gallus gallus, Infectious bursal disease virus, and
                         Feline Herpesvirus
misc_difference         7401..7403
                        note = n is a, c, g, or t
source                  1..13064
                        mol_type = other DNA
                        organism = synthetic construct
SEQUENCE: 16
gaattccaga ctaaatgccc cggcccaatt tgtcaagtgt gcagtcacgg aggcgtcgac  60
cgtgtccccg gcattaaaca ggaaagcgtt aaagtttttg aatgttaggt cacaggtaca  120
aacataaatg tttgtacaaa caggtaacag gtacaaacat aaatgccccg gcataaatgt  180
ccccttacggc ggatcgaaac gacattaggc atactcgggt accattttgc attccgatca  240
gcacggatga aattaggcag gaatgcggtt tatattatgc ggcattggac aaacgatatg  300
gcattgattg gcagtttatg aatgtcttca tgttgggcgt aaacggattc ctattggttc  360
agaagacaac gacgatatat ttagagagaa aaagctaccc agcataggat aaacacacat  420
tgagcattga gagacatagg tatcggtatg gatgggaaaa ctacacacgt gaacaccaaa  480
cgacttatat actcgagcgg tgatactact gagcaagaat gcactgcatc tgagccactg  540
aatgaagact gtgatgaaaa tgtgaccatc gatggaattg gagaagaata tgcgcagttc  600
ttcatgtccc cgcaatgggt cccaaatcta catcgcttga gcgaggatac caaaaaggta  660
taccgatgta tggtttccaa cagactcaat tattttccct attatgaggc gttcaggcgg  720
tctttgtttg atatgtatat gctaggtcgg ttggggcgtc gacttaagcg atctgactgg  780
gagactatta tgcatctgtc accaacgcaa agtcggcgtc tacatagaac tttaagattt  840
gtggagcgta gaattatccc atctaacagt tatatacgca catcgggcca cgttccgcct  900
tcgagggcac ttccgacaga tacgaattta aagatggatg aataattaaa ttggaaagag  960
taactacatt aatcgagcgt catgacggcg tcccgtgaaa atgggaattt tctactcgaa  1020
acaccgtgac atttgacaga cctggaattg ttattctgat atatagtggg tgtgtctggc  1080
cggcaacata cataatgtgc atgcgaaacc actttttcag tgtacgctga cattgtgcaa  1140
cacggagggg tagcatctac atacaatata tgttgattaa tgattggaga aaaaactatg  1200
cagctcgccg atcatatggc taactcgcct tcgtctatat ggcggacccc gcgggaaaaa  1260
tcgacgtacc atctgattta caacaccagt aatgaacatg tcgcatccct gcccagatct  1320
gtgcgcccat tggcgcggat cgttgtgaat gccgccgaaa cacttcaggt cggtatgaga  1380
gccgggaggc cgccatcagc aggagtttgg cgagaggtgt ttgatagaat gatgacagcc  1440
ttccgtgacc acgagcctac tgcgacattt aatgctgcaa atcccattag aaaaatggtc  1500
gagacagttc tacagaataa tgagagccc ccgcggacgc atgctgaaat gggtaatcgc  1560
cttatgaaca ttatgtactg gtgttgcttg ggacacgcag gacaatgctc gatatggcag  1620
ttgtacgaga cgaatcaggc cattttaagt ttattagatg aagtggttat cggcacaaca  1680
aatccctttt gcaccctcga gcaatactgg aagccattat gcaccgcaat cgccaacaag  1740
gggacctcat cgcttgttga ggatgccaaa gtggccgagt acctggttag catgcgcaaa  1800
ttgatataac ataggcacgc tctgatgtta cagaccacaa taccgcatac atttattgta  1860
aggttgttaa taaaggttta ttctatgtaa gactacaata ctttcgacat tgcttgtata  1920
catattaaat actttctcaa gttcctatta cataaaatgg gatctatcat tacattcgtt  1980
aagagtctgg ataattttac tgtttgccag cttcgatctt ggaacgtact gtggatagtg  2040
ccttacttgg aatcgtgaaa atttgaaacg tccattattt ggatatcttc cggttgtccc  2100
atatcccgcc ctggtaccgc tcggatacct tgcccgtatg gattcgtatt gacagtcgcg  2160
```

```
caatcgggga ccaacaacgc gtgggtccac actcattcgg aaattttccg atgattctga   2220
atatttattg ccgctcgtta cgagtcgttg gacatatctg taatacattt cttcttctga   2280
aggatcgctg cacatttgat ctatacattg gccaggatgt tcaagtctca gatgttgcat   2340
tctggcacag cacaacttta tggcatttcc gatgtaatcg tccggcagcc ctggggagt    2400
tctatattcg catattggga tggtaaggac aatagcagat ctcgcaacct ccagggaggc   2460
tataataacg tttttaaagg atggatttct cataaaaatc tgtcgcaaat tacactgaga   2520
atatcctttA ctagcgccga ttgagagcat cgtcgtccaa ttttctaaat ggaaagaaaa   2580
caaggcgggc aagagtgttc caaacatttt cattttcggc gaatctctca aatcccatgg   2640
cgtgcaattg attgcaaaat tggcacttcc gttcacgttt gtatctccaa actctaagac   2700
acttttaatt gaaaaactac gttctagtgt ggaaagaaac ctataggcag accatagaac   2760
tatttgacac cacatatctt tttgtatgtc aaactgacca tgatcgtatg ttgctgaatg   2820
cactagggca attcgctcgc gcgactccat acattgaata attccacacg tcagctcatc   2880
ggttagcaag gtccagtagt tgaagtcatt tattttttcc cgcggctggc caaatctacc   2940
tctgggaata tccaagttgt cgaatatgat cgcaccggct ctggtcatgg tgaaggaact   3000
gtagcataaa gacgcaggta tcataggggt aatattttt tattcactca catactaaaa    3060
gtaacgcata ttagcaccat gtatgggcta tcaattgaca tttgcgtagc actacatcac   3120
gattatgtac aacataatgg gacaaacatat ggcaagtaga tgcaatttcc tcacactagt   3180
tgggtttatc tactattgaa ttttcccta tctgtgatac acttgggagc ctctacaagc    3240
atattgccat catgtacgtt tttatctact gtcttaacgc ccatgggaac ggaggcgtcg   3300
tcgtcatgta ttggacggca acataggcag caacacaaat tgcgtttagg tggggtgcat   3360
gtggactcga taccaagccc ctgcagctgg ggaacgtctg gtgagagcc gataatttga    3420
tatacgcacg ccatattact gtcgttgaag tacgccttat cttctatgtt ttcaaattta   3480
ggttcccaag tggacgtgag aagtgtttgt atctcacatg gaatggccca aggcattcca   3540
gcccaggtgc ctggtacttt aatggcaaac aaacgttttg gtagaggtat tgattctatt   3600
gcagttctgc agatatctgc agccccgagt atccacaggc tatacgatac gttatcggag   3660
gcaagcttaa ttaagtaccg agctcgaatt ggcgcgcacg acggcagagt cgcagacgcc   3720
cctattggac gtcaaaattg tagaggtgaa gttttcaaac gatggcgaag taacggcgac   3780
ttgcgtttcc accgtcaaat ctccctatag ggtagaaact aattggaaag tagacctcgt   3840
agatgtaatg gatgaaattt ctgggaacag tcccgccggg gttttaaca gtaatgaaga    3900
atggcagaaa cagctgtact acagagtaac cgatggaaga acatcggtcc agctaatgtg   3960
cctgtcgtgc acgagccatt ctccggaacc ttactgtctt ttcgacacgt ctcttatagc   4020
gagggaaaaa gatatcgcgc cagagttata ctttacctct gatccgcaaa cggcatactg   4080
cacaataact ctgccgtccg gcgttgttcc gagattcgaa tggagcctta ataatgtttc   4140
actgccggaa tatttgacgg ccacgaccgt tgtttcgcat accgctggcc aaagtacagt   4200
gtggaagagc agcgcgagag caggcgaggc gtggatttct ggccggggag gcaatatata   4260
cgaatgcacc gtcctcatct cagacggcac tcgcgttact acgcgaaagg agaggtgctt   4320
aacaaacaca tggattgcgg tggaaaacg tgctgctcag gcgcagctgt attcactctt    4380
ttctggactt gtgtcaggat tatgcgggag catatctgct ttgtacgcaa cgctatggac   4440
cgccatttat ttttgaggaa tgcttttttgg actatcgtac ttcttcttc cttcgctagc    4500
cagagcaccg ccgccgtcac gtacgactac attttaggcc gtcgcgcgct cgacgcgcta   4560
accataccgg cggttggccc gtataacaga tacctcacta gggtatcaag aggctgcgac   4620
gttgtcgagc tcaacccgat ttctaacgtg gacgacatga tatcggcggc caaagaaaaa   4680
gagaagggg gccctttcga ggcctccgtc gtctggttct acgtgattaa gggcgacgac   4740
ggcgaggaca agtactgtcc aatctataga aaagagtaca gggaatgtgg cgacgtacaa   4800
ctgctatctg aatgcgccgt tcaatctgca cagatgtggg cagtggacta tgttcctagc   4860
acccttgtat cgcgaaatgg cgcgggactg actatattct cccccactgc tgcgctctct   4920
ggccaatact tgctgaccct gaaaatcggg agatttgcgc aaacagctct cgtaactcta   4980
gaagttaacg atcgctgttt aaagatcggg tcgcagctta acttttacc gtcgaaatgc    5040
tggacaacag aacagtatca gactggattt caaggcgaac acctttatcc gatcgcagac   5100
accaatacac gacacgcgga cgacgtatat cggggatacg aagatattct gcagcgctgg   5160
aataatttgc tgaggaaaaa gaatcctagc gcgccagacc ctcgtccaga tagcgtcccg   5220
caagaaattc ccgctgtaac caagaaagcg gaagggcgca ccccggacgc agaaagcagc   5280
gaaaagaagg cccctccaga agactcggag gacgacatgc aggcagaggc ttctggagaa   5340
aatcctgccg ccctccccga agacgacgaa gtccccgagg acaccgagca cgatgatcca   5400
aactcggatc ctgactatta caatgacatg cccgccgtga tcccggtgg ggagactact    5460
aaaagttcta atgccgtctc catgcccata ttcgcggcgt tcgtagcctg cgcggtcgcg   5520
ctcgtgggc tactcgttttg gagcatcgta aaatgcgcgc gtagctaatc gagcctagaa    5580
taggtggttt cttcctacat gccacgcctc acgctcataa tataaatcac atggaatagc   5640
ataccaatgc ctattcattg ggacgttcga aaagcatggc atcgctactt ggaactctgg   5700
ctctccttgc cgcgacgctc gcacccttcg gcgcgatggg aatcgtgatc actgaaaatc   5760
acgtctccgc caggattgac gacgatcaca tcgtgatcgt cgcgcctcgc cccgaagcta   5820
caattcaact gcagctattt ttcatgcctg gccagagacc ccacaaaccc tactcaggaa   5880
ccgtccgcgt cgcgtttcgg tctgatataa caaaccagtg ctaccaggaa cttagcgagg   5940
agcgctttga aaattgcact catcgatcgt ctttctgtttt tgtcggctgt aaagtgaccg   6000
agtacacgtt ctccgcctcg aacagactaa ccggaccttcc acaccgtttt aagctcacta    6060
tacgaaatcc tcgtccgaac gacagcggga tgttctacgt aattgttcgg ctagacgaca   6120
ccaaagaacc cattgacgtc ttcgcgatcc aactatcggt gtatcaattc gcgaacaccg   6180
ccgcgactcg cggactctat tccaaggctt cgtgtcgcac cttcggatta cctaccgtcc   6240
aacttgaggc ctatctcagg accgaggaaa gttggccca tgcaagcg tacgttgcca     6300
cggaggccac gacgaccagc gccgaggcga caaccccgac gcccgtcact gcaaccagcg   6360
cctccgaact tgaagcggaa cactttacct ttccctggct agaaaatggc gtggatcatt   6420
acgaaccgac acccgcaaac gaaaattcaa acgttactgt ccgtctcggg acaatgagcc   6480
ctacgctaat tgggtaacc gtggctgccg tcgtgagcgc aacgatcggc ctcgttcattg   6540
taatttccat cgtcaccaga aatcatgtca ccccgcacca aaattagac acggtctcgc    6600
aagacgacga agaacgttcc caaactagaa gggaatcgcg aaaatttgga cccatggttg   6660
cgtgcgaaat aaacaagggg gctgaccagg atagtgaact tgtggaactg gttgcgattg   6720
ttaacccgtc tgcgctaagc tcgcccgact caataaaaat gtgattaagt ctgaatgtgg   6780
ctctccaatc atttcgattc tctaatctcc caatcctctc aaaaggggca gtatcggaca   6840
cggactggga ggggcgtaca cgatagttat atggtacagc agaggcctct gaacacttag   6900
```

```
gaggagaatt cagccgggga gagccctgt  tgagtaggct tgggagcata ttgcaggatg  6960
aacatgttag tgatagttct cgcctcttgt cttgcgcgcc taactttgc  gacgcgacac  7020
gtcctctttt tggaaggcac tcaggctgtc ctcggggaag atgatcccag aaacgttccg  7080
gaagggactg taatcaaatg gacaaaagtc ctgcggaacg cgtgcaagat gaaggcggcc  7140
gatgtctgct cttcgcctaa ctattgcttt catgatttaa tttacgacgg aggaaagaaa  7200
gactgcccgc ccgcgggacc cctgtctgca aacctggtaa ttttactaaa gcgcggcggg  7260
cgcgccggat cagatctcca tggtcgaggt gagcccacg  ttctgcttca ctctcccat   7320
ctccccccc  tccccacccc caattttgta tttatttatt ttttaattat tttgtgcagc  7380
gatggggcg  ggggggggg  nnncgcgcgc caggcggggc ggggcgggc  gaggggcggg  7440
gcggggcgag gcggagaggt gcggcggcag ccaatcagag cggcgcgctc cgaaagtttc  7500
cttttatggc gaggcggcgg cggcggcggc cctataaaaa gcgaagcgcg cggcgggcgg  7560
gagtcgctgc gcgctgcctt cgccccgtgc cccgctccgc cgccgcctcg cgccgcccgc  7620
cccggctctg actaccgcg  ttactccac  aggtgagcgg gcgggacggc ccttctcctc  7680
cgggctgtaa ttagcggcag gaaggaaatg ggcggggagg gccttcgtgc gtcgccgcgc  7740
cgccgtcccc ttctccctct ccagcctcgg ggctgtccgc gggggacgg  ctgccttcgg  7800
ggggacggg  gcagggcggg gttcggcttc tggcgtgtga ccggcggctc tagagcctct  7860
gctaaccatg ttcatgcctt cttcttttc  ctacagctcc tgggcaacgt gctggttatt  7920
gtgctgtctc atcattttgg caaagaattg cagatctgga tctatgacaa acctgcaaga  7980
tcaaacccaa cagattgttc cgttcatacg gagccttctg atgccaacaa ccggaccggc  8040
gtccattccg gacgacaccc tggagaagca cactctcagg tcagagacct cgacctacaa  8100
tttgactgtg ggggacacag ggtcagggct aattgtcttt ttccctggat tccctggctc  8160
aattgtgggt gctcactaca cactgcagag caatgggaac tacaagttcg atcagatgct  8220
cctgactgcc cagaacctac cggccagcta caactactac agactagtga gtcggagtct  8280
cacagtgagg tcaagcacac tccctggtgg cgtttatgca ctaaacggca ccataaacgc  8340
cgtgaccttc caaggaagcc tgagtgaact gacagatgtt agctacaatg ggttgatgtc  8400
tgcaacagcc aacatcaacg acaaagttgg gaatgtcctg gtaggggaag gggtcactgt  8460
cctcagccta cccacatcat atgatcttgg gtatgtgagg cttggtgacc ccattcccgc  8520
tataggcctt gacccaaaaa tggtagctac atgcgacagc agtgacaggc ccagagtcta  8580
caccataact gcagccgatg attaccaatt ctcatcacag taccaaccag gtggggtaac  8640
aatcacactg ttctcagcca acattgatgc tatcacaagc ctcagcattg ggggagagct  8700
cgtgtttcaa acaagcgtcc aaggccttgt actgggcgcc accatctacc ttataggctt  8760
tgatgggact gcgtaatca  ccagagctgt ggccgcagat aatgggctga cggccggcac  8820
cgacaatctt atgccattca atcttgtcat tccaaccaat gagataaccc agccgatcac  8880
atccatcaaa ctgacagtag tgacctccaa aagtggtggt caggcagggg atcagatgct  8940
atggtcggca agtgggagcc tagcagtgac gatccatggt ggcaactatc cagggcccct  9000
ccgtcccgtc acactagtag cctacgaaag agtggcaaca ggatccgtcg ttacggtcgc  9060
tggggtgagt aacttcgagc tgatcccaaa tcctgaacta gcaaagaacc tggttacaga  9120
atacggccga tttgacccag gagccatgaa ctacacaaaa ttgatactga gtgagaggga  9180
ccgtcttggc atcaagaccg tctggccaac aagggagtac actgattttc gtgagtactt  9240
catggaggtg gccgacctca actctcccct gaagattgca ggagcatttg gcttcaaaga  9300
cataatccgg gctataagga ggtaagatcc gatctctcga ttaattaaca ataaacatag  9360
catacgtttat gacatggtct accgcgtctt atatgggac  gacaagcttg cctccgattc  9420
tagcattaca tagccggtca gtagatcctg ccattcagca cgcaaccgg  ctacatcttc  9480
aaacagtctc acgataaatg catctctcgt tcctgccaat ccggaaccgg gcataccact  9540
cccgcctgcc gatttaattc tcacaattgg gcgatgccgg cggggcaaaa cgaatgtgga  9600
tttggcaaac cgacacaggt ctgctgtacg gactaatatg ggcacaccca catcattctt  9660
cagatgctcc atgcattgtt ctatgagaaa gatccataag gtggaggcag cgtcacgaga  9720
tcgcccaggc aatcgatcgc attcgtctag taaagtgacg agagttatca tgcacacacc  9780
catgcccacg ccttccgaat aactggagct gtggaagatc ggaaacgtct ttttgactgc  9840
cggtctcgta ctactttcgc acaggtgtat acccggacgc gtactatata ttttatatca  9900
tccaacgtcc gaaattacat acgtgcggc  gatgaagta  gatgttgagt cttcgaaagt  9960
aagtgcctcg aatatgggta ttgtctgtga aaatatcgaa agcggtacga cggttgcaga 10020
accgtcgatg tcgccagata ctagtaacaa tagcttcgat aacgaagact tccgtgggcc 10080
tgaatacgat gtgagataa  ataccagaaa atctgctaat cttgatcgta tggaatcttc 10140
gtgccgtgaa caacgagcgg cgtgcgaact tcgaaagtgt tcgtgtccta cgtctgccgt 10200
gcgcatgcaa tacagtattc tttcatctct cgctccgggt tcagagggtc atgtatatat 10260
atgtactaga tacggggacg cggaccaaaa aaaatgcata gtgaaggcag tcgttggagg 10320
aaagaatccc ggggagggaag tggatatttt aaaaaccatc tcacataaat caattataaa 10380
attaatccat gcctataaat ggaaaaatgt tgtgtgtatg gcaatgcgtg tatatcgtta 10440
tgatcttttc acatatattg acggagtcgg ccctatgccc cttcaacaga tgatctatat 10500
tcaacgtgga ctactagagg cgctagcata catacatgaa aggggcatca ttcaccgaga 10560
cgtaaagacg gagaatatat tcttggataa tcacgaaaat gcagttttgg gtgacttcgg 10620
tgctgcatgc caactaggag attgtataga tacgcccaa  tgttacggtt ggagcggaac 10680
tgtggaaaca aattcgccgg aattatctgc acttgatcga tattgcacaa aaacagatat 10740
ttggagtgcc ggattggttc tatatgagat ggcaattaaa aatgtaccat tgtttagtaa 10800
gcaggtgaaa agttcgggat ctcagctgag atccataata cggtgcatgc aagtgcatga 10860
actggagttt ccccgcaacg attctaccaa cctctgtaaa catttcaaac aatatgcggt 10920
tcgtgtacga ccgccttata ccattcctcg agttataaga aggtggggga tgccaatgga 10980
tgttgaatat gtcatttcta aaatgcttac gtttgaccag gagttcagac cttctgctaa 11040
ggaaatattg aatatgcccc tatttactaa ggcgccgatt aacctgctta atatcacacc 11100
ctctgacagt gtctaacggt ataggcgg  gagcgggtcg tggcgtcatc atcaccactt 11160
gagaatttat attttgaatt gttgattgat aaattaacct gattcattga gaactgaaac 11220
gccatattgg tttcttggat atgtctacaa caattagtta aattgctatg ttctactgcg 11280
agtaacattt gataagttgt aagagacggg cgactcagct cgaagttgac gaatataaag 11340
tacataacgt gtttagaata cccagaatcc gaatagtccg cggggcgtc  ttctcgcgtg 11400
agtaccaaat actgagttga acttgaaaat gctaaatctg tgcactctt  tgtgtgatga 11460
ttattgtcac cacttcgaag atggcttcga cattcatgat gttctggtgt ttgtttggaa 11520
tcgtaatagc gcttgtttcg tccaagtctg acaacaaaga aaatcgaag  aattatatca 11580
cggataagtc aaccaatatt agaatacccca cgccattatt tgtatcaacg gaaaactctt 11640
```

```
atcccacaaa acatgtaatc tacgatgaaa actgtggctt cgctgtactc aatcctataa  11700
gtgaccccaa atatgtcctt ttgagccagc ttctaatggg aaggcgcaaa tatgatgcga  11760
cggtcgcgtg gtttgttctc ggtaaaatgt gtgccagatt aatatatttg cgcgaatttt  11820
ataactgctc gacaaatgag ccttttggca catgttctat gagctctcct ggatggtggg  11880
acaggcgcta cgtctcaacc agtttcattt ctcgcgacga attacagctg gtttttgcag  11940
cgccgtcccg agaattagat ggtttatata cgcgcgtagt agttgtcaac ggggacttta  12000
ctacggccga tataatgttt aatgttaaag tggcatgtgc cttttcaaag actggaatag  12060
aagatgatac attatgcaaa ccctttcatt tctttgccaa tgcaacattg cacaatttaa  12120
ccatgattag atcggtaact cttcgagcgc acgaaagcca tttaaaggaa tgggtggcac  12180
ggagaggtgg taacgtccct gcagtgctac ttgagtctac catgtatcat gcatccaatc  12240
tgcctagaaa tttcagggat ttctacataa agtctccaga tgattataag tataatcacc  12300
tagatgggcc atctgtaatg ctcatcactg acagacctag tgaagatttg gatgggaggc  12360
tcgttcacca aagtgacatt tttactacta caagtcctat aaaacaggtc cggtatgaag  12420
agcatcagtc acatacaaag cagtatcctg taaacaaaat acaagctata atttttttga  12480
tagggttagg ctcgttcatt ggaagcatat tcgtagtttt ggtagtatgg attatacgca  12540
gatattgcaa tggagcgcgg agtgggggaa cgccccccag tcctcgccgg tatgtgtata  12600
ccaggctatg atcacgtgtg aaacttgggc ggacctgtat catatgtaca ccgtccctat  12660
tcgtttatag ccagtacgtg ttatctgcac atagaggaac atgtgtcata ctgggatcgc  12720
atgcatggta tgtgtgactc taatattatt ctgtatcata ataaaaacac agtgcatggt  12780
atatagagga tcgctggtaa gcactacggt agaccaatcg gctcagattg cattctttgg  12840
catcgatacc gttgttaatt tatatggcaa agtcttgttc atgggagatc agtatttgga  12900
ggaaatatac tctggaacga tggaaatact caaatggaat caagctaacc gctgctattc  12960
tattgcgcat gcaacatatt acgccgactg tcctataatc agttctacgg tattcagagg  13020
atgccgggac gccgttgttt atactaggcc ccacagcaga attc                  13064

SEQ ID NO: 17          moltype = DNA  length = 13017
FEATURE                Location/Qualifiers
misc_feature           1..13017
                       note = Herpesvirus of turkeys, Infectious laryngotracheitis
                        virus, human cytomegalovirus, Infectious bursal disease
                        virus, and Herpes simplex virus
source                 1..13017
                       mol_type = other DNA
                       organism = synthetic construct
SEQUENCE: 17
gaattccaga ctaaatgccc cggcccaatt tgtcaagtgt gcagtcacgg aggcgtcgac  60
cgtgtccccg gcattaaaca ggaaagcgtt aaagtttttg aatgttaggt cacaggtaca  120
aacataaatg tttgtacaaa caggtaacag gtacaaacat aaatgccccg gcataaatgt  180
cccttacggc ggatcgaaac gacattaggc atactcgggt accattttgc attccgatca  240
gcacggatga aattaggcag gaatgcggtt tatattatgc ggcattggac aaacgatatg  300
gcattgattg gcagtttatg aatgtcttca tgttgggcgt aaacggattc ctattggttc  360
agaagacaac gacgatatat ttagagagaa aaagctaccc agcataggat aaacacacat  420
tgagcattga gagacatagg tatcggtatg gatgggaaaa ctacacacgt gaacaccaaa  480
cgacttatat actcgagcgg tgatactact gagcaagaat gcactgcatc tgagccactg  540
aatgaagact gtgatgaaaa tgtgaccatc gatggaattg gagaagaata tgcgcagttc  600
ttcatgtccc cgcaatgggt cccaaatcta catcgcttga gcgaggatac caaaaaggta  660
taccgatgta tggtttccaa cagactcaat tatttttccct attatgaggc gttcaggcgg  720
tctttgtttg atatgtatat gctaggtcgg ttggggcgtc gacttaagcg atctgactgg  780
gagactatta tgcatctgtc accaacgcaa agtcggcgtc tacatagaac tttaagattt  840
gtggagcgta gaattatccc atctaacagt tatatacgca catcgggcca cgttccgcct  900
tcgagggcac ttccgacaga tacgaattta aagatggatg aataattaaa ttggaaagag  960
taactacatt aatcgagcgt catgacggcg tcccgtgaaa atgggaattt tctactcgaa  1020
acaccgtgac atttgacaga cctggaattg ttattctgat atatagtggg tgtgtctggc  1080
cggcaacata cataatgtgc atgcgaaacc actttttcag tgtacgctga cattgtgcaa  1140
cacggagggg tagcatctac atacaatata tgttgattaa tgattggaga aaaaactatg  1200
cagctcgccg atcatatggc taactcgcct tcgtctatat ggcggacccc gcgggaaaaa  1260
tcgacgtacc atctgattta caacaccagt aatgaacatg tcgcatccct gcccagatct  1320
gtgcgcccat tggcgcggat cgttgtgaat gccgccgaaa cacttcaggt cggtatgaga  1380
gccgggaggc cgccatcagc aggagtttgg cgagaggtgt ttgatagaat gatgacagcc  1440
ttccgtgacc acgagcctac tgcgacattt aatgctgcaa atcccattag aaaaatggtc  1500
gagacagttc tacagaataa tgaagagccc ccgcggacgc atgctgaaat gggtaatcgc  1560
cttatgaaca ttatgtactg gtgttgcttg ggacacgcag gacaatgctc gatatggcag  1620
ttgtacgaga cgaatcaggc cattttaagt ttattagatg aagtggttat cggcacaaca  1680
aatccctttt gcaccctcga gcaatactgg aagccattat gcaccgcaat cgccaacaag  1740
gggacctcat cgcttgttga ggatgccaaa gtggccgagt acctggttag catgcgcaaa  1800
ttgatataac ataggcacgc tctgatgtta cagaccacaa taccgcatac atttattgta  1860
aggttgttaa taaaggttta ttctatgtaa gactacaata ctttcgacat tgcttgtata  1920
catattaaat actttctcaa gttcctatta cataaaatgg gatctatcat tacattcgtt  1980
aagagtctgg ataattttac tgtttgccag cttcgatctt ggaacgtact gtggatagtg  2040
ccttacttgg aatcgtgaaa atttgaaacg tccattattt ggatatcttc cggttgtccc  2100
atatcccgcc ctggtaccgc tcggatacct tgcccgtatg gattcgtatt gacagtcgcg  2160
caatcgggga ccaacaacgc gtgggtccac actcattcgg aaattttccg atgattctga  2220
atatttattg ccgctcgtta cgagtcgttg gacatatctg taatacattt cttcttctga  2280
aggatcgctg cacatttgat ctatacattg gccaggatgt tcaagtctca gatgttgcat  2340
tctggcacag cacaacttta tggcatttcc gatgtaatcg tccggcagcc ctgggggagt  2400
tctatattcg catattggga tggtaaggac aatagcagat ctcgcaacct ccagggaggc  2460
tataataacg tttttaaagg atggatttct cataaaaatc tgtcgcaaat tacactgaga  2520
atatccttta ctagcgccga ttgagagcat cgtcgtccaa ttttctaaat ggaaagaaaa  2580
caaggcgggc aagagtgttc caaacatttt cattttcggc gaatctctca aatcccatgg  2640
```

-continued

```
cgtgcaattg attgcaaaat tggcacttcc gttcacgttt gtatctccaa actctaagac 2700
acttttaatt gaaaaactac gttcagtgtg ggaaagaaac ctataggcag accatagaac 2760
tatttgacac cacatatctt tttgtatgtc aaactgacca tgatcgtatg ttgctgaatg 2820
cactagggca attcgctcgc gcgactccat acattgaata attccacacg tcagctcatc 2880
ggttagcaag gtccagtagt tgaagtcatt tattttttccc cgcggctggc caaatctacc 2940
tctgggaata tccaagttgt cgaatatgat cgcaccggct ctggtcatgg tgaaggaact 3000
gtagcataaa gacgcaggta tcatagggt aatattttt tattcactca catactaaaa 3060
gtaacgcata ttagcaccat gtatgggcta tcaattgaca tttgcgtagc actacatcac 3120
gattatgtac aacataatgg gacaacatat ggcaagtaga tgcaatttcc tcacactagt 3180
tgggtttatc tactattgaa ttttcccta tctgtgatac acttgggagc ctctacaagc 3240
atattgccat catgtacgtt tttatctact gtcttaacgc ccatgggaac ggaggcgtcg 3300
tcgtcatgta ttggacggca acataggcag caacacaaat tgcgtttagg tggggtgcat 3360
gtggactcga taccaagccc ctgcagctgg ggaacgtctg gtggagagcc gataatttga 3420
tatacgcacg ccatattact gtcgttgaag tacgccttat cttctatgtt ttcaaattta 3480
ggttcccaag tggacgtgag aagtgtttgt atctcacatg gaatggccca aggcattcca 3540
gcccaggtgc ctggtacttt aatggcaaac aaacgttttg gtagaggtat tgattctatt 3600
gcagttctgc agatatctgc agccccgagt atccacaggc tatacgatac gttatcggag 3660
gcaagcttgt taattaagtc gacggcagag tcgcagacgc ccctattgga cgtcaaaatt 3720
gtagaggtga agtttttcaaa cgatggcgaa gtaacggcga cttgcgtttc caccgtcaaa 3780
tctccctata gggtagaaac taattggaaa gtagacctcg tagatgtaat ggatgaaatt 3840
tctgggaaca gtcccgccgg ggttttttaac agtaatgaga aatggcagaa acagctgtac 3900
tacagagtaa ccgatggaag aacatcggtc cagctaatgt gcctgtcgtg cacgagccat 3960
tctccggaac cttactgtct tttcgacacg tctcttatag cgagggaaaa agatatcgcg 4020
ccagagttat actttacctc tgatccgcaa acggcatact gcacaataac tctgccgtcc 4080
ggcgttgttc cgagattcga atggagcctt aataatgttt cactgccgga atatttgacg 4140
gccacgaccg ttgtttcgca taccgctggc caaagtacga tgtggaagag cagcgcgaga 4200
gcaggcgagg cgtggatttc tggccgggga ggcaatatat acgaatgcac cgtcctcatc 4260
tcagacggca ctcgcgttac tacgcgaaag gagaggtgct taacaaacac atggattgcg 4320
gtggaaaacg tgctgctca ggcgcagctg tattcactct tttctggact tgtgtcagga 4380
ttatgcggga gcatatctgc tttgtacgca acgctatgga ccgccattta tttttgagga 4440
atgcttttg gactatcgta ctgctttctt ccttcgctag ccagagcacc gccgccgtca 4500
cgtacgacta catttttaggc cgtcgcgcgc tcgacgcgct aaccataccg gcggttggcc 4560
cgtataacag atacctcact agggtatcaa gaggctgcga cgttgtcgag ctcaacccga 4620
tttctaacgt ggacgacatg atatcggcgg ccaaagaaaa agagaaggggg ggcccttttcg 4680
aggcctccgt cgtctggttc tacgtgatta agggcgacga cggcgaggac aagtactgtc 4740
caatctatag aaaagagtac agggaatgtg gcgacgtaca actgctatct gaatgcgccg 4800
ttcaatctgc acagatgtgg gcagtggact atgttcctag cacccttgta tcgcgaaatg 4860
gcgcgggact gactatattc tcccccactg ctgcgctctc tggccaatac ttgctgaccc 4920
tgaaaatcgg gagatttgcg caaacagctc tcgtaactct agaagttaac gatcgctgtt 4980
taaagatcgg gtcgcagctt aacttttac cgtcgaaatg ctggacaaca gaacagtatc 5040
agactggatt tcaaggcgaa caccttttatc cgatcgcaga caccaataca cgacacgcgg 5100
acgacgtata tcgggatac gaagatattc tgcagcgctg gaataaatttg ctgaggaaaa 5160
agaatcctag cgcgccagac cctcgtccag atagcgtccc gcaagaaatt cccgctgtaa 5220
ccaagaaagc ggaagggcgc accccggacg cagaaagcag cgaaaagaag gccctccag 5280
aagactcgga ggacgacatg caggcagagg cttctggaga aaatcctgcc gccctccccg 5340
aagacgacga agtccccgag gacaccgagc acgatgatcc aaactcggat cctgactatt 5400
acaatgacat gcccgccgtg atcccggtgg aggagactac taaaagttct aatgccgtct 5460
ccatgcccat attcgcggcg ttcgtagcct gcgcggtcgc gctcgtgggg ctactggttt 5520
ggagcatcgt aaaatgcgcg cgtagctaat cgagcctaga ataggtggtt tcttcctaca 5580
tgccacgcct cacgctcata atataaatca catggaatag cataccaatg cctattcatt 5640
gggacgttcg aaaagcatgg catcgctact tggaactctg gctctccttg ccgcgacgct 5700
cgcacccttc ggcgcgatgg gaatcgtgat cactggaaat cacgtctccg ccaggattga 5760
cgacgatcac atcgtgatcg tcgcgcctcg ccccgaagct acaattcaac tgcagctatt 5820
tttcatgcct ggcagagac cccacaaacc ctactcagga accgtccgcg tcgcgttttcg 5880
gtctgatata acaaaccagt gctaccagga acttagcgga gagcgctttg aaaatttgcac 5940
tcatcgatcg tcttctgttt ttgtcggctg taaagtgacc gagtacacgt tctccgcctc 6000
gaacagacta accggacctc cacacccgtt taagctcact atacgaaatc ctcgtccgaa 6060
cgacagcggg atgttctacg taattgttcg gctagacgac accaaagaac ccattgacgt 6120
cttcgcgatc caactatcgg tgtatcaatt cgcgaacacc gccgactc gcggactcta 6180
ttccaaggct tcgtgtcgca ccttcggatt acctaccgct caacttgagg cctatctcag 6240
gaccgaggaa agttggcgca actggcaagc gtacgttgcc acggaggcca cgacgaccag 6300
cgccgaggcg acaaccccga cgcccgtcac tgcaaccagc gcctccgaac ttgaagcgga 6360
acactttacc tttccctggc tagaaaatgg cgtggatcat tacgaaccga cacccgcaaa 6420
cgaaaattca aacgttactg tccgtctcgg gacaatgacg cctactgctaa ttgggtaac 6480
cgtggctgcc gtcgtgagcg caacgatcgg cctcgtcatt gtaatttcca tcgtcaccag 6540
aaacatgtgc accccgcacc gaaaattaga cacgtctcg caagacgacg aagaacgttc 6600
ccaaactaga agggaatcgc gaaaatttgg acccatggtt gcgtgcgaaa taaacaaggg 6660
ggctgaccag gatagtgaac ttgtggaact ggttgcgatt gttaacccgt ctgcgctaag 6720
ctcgcccgac tcaataaaaa tgtgattaag tctgaatgtg gctctccaat catttcgatt 6780
ctctaatctc ccaatcctct caaaaggggc agtatcggac acggactggg aggggcgtac 6840
acgatagtta tatggtacag cagaggcctc tgaacactta ggaggagaat tcagccgggg 6900
agagcccctg ttgagtaggc ttgggagcat attgcaggat gaacatgtta gtgatagttc 6960
tcgcctcttg tcttgcgcgc ctaacttttg cgacgcgaca cgtcctctt ttggaaggca 7020
ctcaggctgt ctcggggaa gatgatccca gaaacgttga gcgaagggact gtaatcaaat 7080
ggacaaaagt cctgcggaac gcgtgcaaga tgaaggcggc cgatgtctgc tcttcgccta 7140
actattgctt tcatgattta atttacgacg gaggaaagaa agactgcccg cccgcgggac 7200
ccctgtctgc aaacctggta attttactaa agcgcggcga aagcttaggt caattccctg 7260
gcattatgcc cagtacatga ccttatggga ctttcctact tggcagtaca tctacgtatt 7320
agtcatcgct attaccatgg tgatgcggtt ttggcagtac atcaatgggc gtggatagcg 7380
```

```
gtttgactca cggggatttc caagtctcca ccccattgac gtcaatggga gtttgttttg   7440
gcaccaaaat caacgggact ttccaaaatg tcgtaacaac tccgccccat tgacgcaaat   7500
gggcggtagg cgtgtacggt gggaggtcta tataagcaga gctcgtttag tgaaccgtca   7560
gatcgcctgg agacgccatc cacgctgttt tgacctccat agaagacacc gggcgcgccg   7620
gatctatgac aaacctgcaa gatcaaaccc aacagattgt tccgttcata cggagccttc   7680
tgatgccaac aaccgaccg gcgtccattc cggacgacac cctggagaag cacactctca   7740
ggtcagagac ctcgacctac aatttgactg tggggacaa agggtcaggg ctaattgtct   7800
ttttccctgg attccctggc tcaattgtgg gtgctcacta cacactgcag agcaatggga   7860
actacaagtt cgatcagatg ctcctgactg cccagaacct accggccagc tacaactact   7920
gcagactagt gagtcggagt ctcacagtga ggtcaagcac actccctggt ggcgtttatg   7980
cactaaacgg caccataaac gccgtgacct tccaaggaag cctgagtgaa ctgacagatg   8040
ttagctacaa tgggttgatg tctgcaacag ccaacatcaa cgacaaagtt gggaatgtcc   8100
tggtagggga agggtcact gtcctcagcc tacccacatc atatgatctt gggtatgtga   8160
ggcttggtga ccccattccc gctataggc ttgacccaaa aatggtagct acatgcgaca   8220
gcagtgacag gcccagagtc tacaccataa ctgcagccga tgattaccaa ttctcatcac   8280
agtaccaacc aggtgggta acaatcacac tgttctcagc caacattgat gctatcacaa   8340
gcctcagcat tggggagag ctcgtgtttc aaacaagcgt ccaaggcctt gtactgggcg   8400
ccaccatcta ccttataggc tttgatggga ctgcggtaat caccagagct gtggccgcag   8460
ataatgggct gacggccggc accgacaatc ttatgccatt caatcttgtc attccaacca   8520
atgagataac ccagccgatc acatccatca aactggagat agtgacctcc aaaagtggtg   8580
gtcaggcagg ggatcagatg tcatggtcgg caagtgggag cctagcagtg acgatccatg   8640
gtggcaacta tccaggggcc ctccgtcccg tcacactagt gctactacgaa agagtggcaa   8700
caggatccgt cgttacggtc gctggggtga gtaacttcga gctgatccca aatcctgaac   8760
tagcaaagaa cctggttaca gaatacggcc gatttgaccc aggagccatg aactacacaa   8820
aattgatact gagtgagagg gaccgtcttg gcatcaagac cgtctggcca acaagggagt   8880
acactgattt tcgtgagtac ttcatggagg tggccgaacct caactctccc ctgaagattg   8940
caggagcatt tggcttcaaa gacataatcc gggctataag gaggtaagat ccataattga   9000
ttgacgggag atgggggagg ctaactgaaa cacggaagga gacaataccg gaaggaaccc   9060
gcgctatgac ggcaataaaa agacagaata aaacgcacgg gtgttgggtc gtttgttcat   9120
aaacgcgggg ttcggtccca gggctggcac tctgtcgata ccccaccgag accccattgg   9180
ggccaatacg cccgcgtttc ttcctttcc ccaccccacc ccccaagttc gggtgaaggc   9240
ccagggctcg cagccaacgt cggggcggca ggccctgcca tagccactgg ccccgtgggt   9300
tagggacggg gtcccccatg gggaatggtt tatggttcgt gggggttatt attttgaagc   9360
ttgcctccga ttctagcatt acatagccgg tcagtagatc ctgccattcg gtagcgcaac   9420
cggctacatc ttcaaacagt ctcacaataa atgcatctct cgttcctgcc aatccggaac   9480
cgggcatacc actcccgcct gccgatttaa ttctcacaat tgggcgatgc cggcggggca   9540
aaacgaatgt ggatttggca aaccgacaca ggtctgctgt acggactaat atgggcacac   9600
ccacatcatt cttcagatgc tccatgcatt gttctatgag aaagatccat agggtggagg   9660
cagcgtcacg agatcgccca ggcaatcgat cgcattcgtc tagtaaagtg acgagagtta   9720
tcatgcacac acccatgccc acgccttccg aataactgga gctgtggaag atcggaaacg   9780
tcttttgac tgccggtctc gtactacttt cgcacaggtg tatacccgga cgcgtactat   9840
atattttata tcatccaacg tccgaaatta catacgtggc ggcgatggaa gtagatgttg   9900
agtcttcgaa agtaagtgcc tcgaatatgg gtattgtctg tgaaaatatc gaaagcgtta   9960
cgacggttgc agaaccgtcg atgtcgccag atactagtaa caatagcttc gataacgaag   10020
acttccgtgg gcctgaatac gatgtggaga taaataccag aaaatctgct aatcttgatc   10080
gtatggaatc ttcgtgccgt gaacaacgag cggcgtgcga acttcgaaag tgttcgtgtc   10140
ctacgtccgc cgtgcgcatg caatacagta ttctttcatc tctcgctccg ggttcagagg   10200
gtcatgtata tatatgtact agatacgggg acgcggacca aaaaaaatgc atagtgaagg   10260
cagtcgttga aggaaagaat cccgggaggg aagtggatat tttaaaaacc atctcacata   10320
aatcaattat aaaattaatc catgcctata atgaaaaa tgttgtgtgt atggcaatgc   10380
gtgtatatcg ttatgatctt ttcacatata ttgacggagt cggccctatg ccccttcaac   10440
agatgatcta tattcaacgt ggactactag aggcgctagc atacatacat gaaaggggca   10500
tcattcaccg agacgtaaag acggagaata tattcttgga taatcacgaa aatgcagttt   10560
tgggtgactt cggtgctgca tgccaactag gagattgtat agatacgccc caatgttacg   10620
gttggagcgg aactgtggaa acaaaattcgc cggaattatc tgcacttgat ccgtattgca   10680
caaaaacaga tatttggagt gccggattgg ttctatatga gatggcaatt aaaaatgtac   10740
cattgtttag taagcaggtg aaaagttcgg gatctcagct gagatccata atacggtgca   10800
tgcaagtgca tgaactggag tttccccgca acgattctac caacctctgt aaacatttca   10860
aacaatatgc ggttcgtgta cgaccgcctt ataccattcc tcgagttata agaaatgggg   10920
ggatgccaat ggatgttgaa tatgtcattt ctaaaatgct tacgtttgac caggagttca   10980
gaccttctgc taaggaaata ttgaaatatgc ccctatttac taaggcgccg attaacctgc   11040
ttaatatcac accctctgac agtgtctaac ggtatacagg cgggagcggg tcgtggcgtc   11100
atcatcacca cttgagaatt tatattttga attgttgatt gataaattaa cctgattcat   11160
tgagaactga aacgccatat tggttcttg gtatgtcta caacaattag ttaaattgct   11220
atgttctact gcgagtaaca tttgataagt tgtaagagac gggcgactca tgtcgaagtt   11280
gacgaatata aagtacataa cgtgtttaga atacccagaa tccgaatagt ccgcggggc   11340
gtcttctcgc gtgagtacca aatactgagt tgaacttgaa aatgctaaat ctgtgacact   11400
ctttgtgtga tgattattgt caccacttcg aagatggctc cgacattcat gatgttctgg   11460
tgtttgtttg gaatcgtaat agcgcttgtt tcgtccaagt ctgacaacaa agaaaatctg   11520
aagaattata tcacggataa gtcaaccaat attagaaatac ccacgccatt atttgtatca   11580
acggaaaact cttatcccac aaaaacatgta atctacgatg aaaactgtgg cttcgctgta   11640
ctcaatccta taagtgaccc caaatatgtc cttttgagcc agcttctaat gggaaggcgc   11700
aaatatgatg cgacggtcgc gtggtttgtt ctcggtaaaa tgtgtgccag attaatatat   11760
ttgcgcgaat tttataactg ctcgacaaat gagccttttg cgcacatgttc tatgagctct   11820
cctggatggt gggacaggcg ctacgtctca accagtttca tttctcgcga cgaattacag   11880
ctggtttttg cagcgccgtc ccgagaatta gatggtttat atacgcgcgt agtagttgtc   11940
aacgggggact ttactacggc cgatataatg tttaatgtta aagtggcatg tgccttttca   12000
aagactggaa tagaagatga tacattatgc aaacccttc atttctttgc caatgcaaca   12060
ttgcacaatt taaccatgat tagatcggta actcttcgag cgcacgaaag ccatttaaag   12120
```

```
gaatgggtgg cacggagagg tggtaacgtc cctgcagtgc tacttgagtc taccatgtat   12180
catgcatcca atctgcctag aaatttcagg gatttctaca taaagtctcc agatgattat   12240
aagtataatc acctagatgg gccatctgta atgctcatca ctgacagacc tagtgaagat   12300
ttggatggga ggctcgttca ccaaagtgac attttttacta ctacaagtcc tataaaacag   12360
gtccggtatg aagagcatca gtcacataca aagcagtatc ctgtaaacaa aatacaagct   12420
ataattttt tgatagggtt aggctcgttc attggaagca tattcgtagt tttggtagta   12480
tggattatac gcagatattg caatggagcg cggagtgggg aacgccccc cagtcctcgc   12540
cggtatgtgt ataccaggct atgatcacgt gtgaaacttg ggcggacctg tatcatatgt   12600
acaccgtccc tattcgttta tagccagtac gtgttatcgt cacatagagg aacatgtgtc   12660
atactgggat cgcatgcatg gtatgtgtga ctctaatatt attctgtatc ataataaaaa   12720
cacagtgcat ggtatataga ggatcgctgg taagcactac ggtagaccaa tcggctcaga   12780
ttgcattctt tggcatcgat accgttgtta atttatatgg caaagtcttg ttcatgggag   12840
atcagtattt ggaggaaata tactctggaa cgatggaaat actcaaatgg aatcaagcta   12900
accgctgcta ttctattgcg catgcaaact attacgccga ctgtcctata atcagttcta   12960
cggtattcag aggatgccgg gacgccgttg tttatactag gccccacagc agaattc      13017

SEQ ID NO: 18             moltype = DNA  length = 15252
FEATURE                   Location/Qualifiers
misc_feature              1..15252
                          note = Herpesvirus of turkeys, murine cytomegalovirus,
                          Infectious bursal disease virus, Simian vacuolating virus
                          40, and Infectious laryngotracheitis virus
source                    1..15252
                          mol_type = other DNA
                          organism = synthetic construct
SEQUENCE: 18
ggcgcgccac tggagaacgg catgaccgca aaaggcgttg tagagatcga tcccacgaac     60
tctcaggcga tcgtgtcagt cgccataaac agcgacgatc gtctccagga tctgaacggt    120
tttcttctca acgatcatca gtatatgagg aactgaacct gatatttagc cgagggaaac    180
gcaggttaaa aaccctatca agcgattgcg attttcggt atctagtaaa aatagatggg    240
cttcggtact agccttcgcc gccaactctg aatatgccct tcgtggacct catataacat    300
ggcattgttt gttggatgcg gggccggaat taagaagaac attcgaaata cgagcaaaaa    360
tttcggccct ggcatgtgct gcgcgagaat cggtacttcg gggagaaagt tttatcggag    420
cttgggtag tgcagaggaa actctatctt ggttgaaaga gcatgcgacc ctgcacttga    480
ttctggttaa ccacgatcca atttttaaga cggctggcgc ggtcctagat aacctccgct    540
taaaactagc cccaatattg atgtgcagat ataacacaga aaaacgatca atggaagaca    600
tgctacggcg gtcatctccc gaagacatca ccgattccct aacaatgtgc ctgattatgt    660
tatcgcgcat tcgtcgtacc atgcgcaccg caggaaataa atatagctat atgatagatc    720
caatgaatcg tatgtctaat tacactccag gcgaatgtat gacaggtata ttgcgatata    780
ttgacgaaca tgctagaagg tgtcctgatc acatatgtaa tttgtatatc acatgtacac    840
ttatgccgat gtatgtgcac gggcgatatt tctattgtaa ttcatttttt tgttagtaaa    900
ctaccacagg ctgtccggaa atcaagtta atgaataaag tagatggtta atactcattg    960
cttagaattg gactacttt aattctcttt aatgttcgta ttaaataaaa acatctttaa   1020
taaacttcag cctcttcgct tattgtagaa attgagtatt caaaatcatg ttcaaagccg   1080
tcttcggaga gtgtactcgc cacggtggtt ggaacatcac tatgtctaca cgtcaaattt   1140
aagcacgtca ggtctgtcga ggacaagaaa tggttaacta gtgtttcaat tattcttata   1200
aacgttaagc attgtaagcc ccccggccgt ccgcagcaac aatttactag tatgccgtgg   1260
gctccgggac tatcacggat gtccaattcg cacatgcata taattttttct agggtctctc   1320
atttcgagaa atcttcgggg atccatcagc aatgcgggct gtagtcccga ttcccgtttc   1380
aaatgaaggt gctccaacac ggtcttcaaa gcaaccggca taccagcaaa cacagactgc   1440
aactcccccgc tgcaatgatt ggttataaac agtaatctgt cttctggaag tatatttcgg   1500
ccgacaatcc acggcgcccc caaagttaaa aaccatccat gtgtatttgc gtcttctctg   1560
ttaaaagaat attgactggc attttcccgt tgaccgccag atatccaaag tacagcacga   1620
tgttgcacgg acgactttgc agtcaccagc cttcctttcc acccccccac caacaaaatg   1680
tttatcgtag gacccatatc cgtaataagg atgggtctgg cagcaaccc ataggcgcct   1740
cggcgtggta gttctcgagg ccttaagctt aaggatcccc caactccgcc cgttttatga   1800
ctagaaccaa tagttttaa tgccaaatgc actgaaatcc ctaatttgc aaagccaaac   1860
gcccctatg tgagtaatac ggggactttt taccccaattt cccacgcgga aagccccta   1920
atacactcat atggcatatg aatcagcacg gtcatgcact ctaatggcgg cccataggga   1980
cttttccacat agggggcgtt caccatttcc cagcataggg gtggtgactc aatggccttt   2040
acccaagtac attgggtcaa tggaggtaa gccaatgggt ttttcccatt actggcaagc   2100
acactgagtc aaatgggact ttccactggg ttttgcccaa gtacattggg tcaatgggag   2160
gtgagccaat gggaaaaacc cattgctgcc aagtacactg actcaatagg gactttccaa   2220
tgggttttttc cattgttggc aagcatataa ggtcaatgtg ggtgagtcaa tagggacttt   2280
ccattgtatt ctgccagta cataaggtca atagggggtg aatcaacagg aaagtcccat   2340
tggagccaag tacactgcgt caatagggac ttttccattgg gttttgccca gtacataagg   2400
tcaataggga tgagtcaat gggaaaaacc cattggagcc aagtacactg actcaatagg   2460
gacttttccat tgggttttgc ccagtacata aggtcaatag ggggtgagtc aacaggaaag   2520
ttccattgga gccaagtaca ttgagtcaat agggactttc caatggtttt tgccagtac   2580
ataaggtcaa tgggaggtaa gccaatgggt ttttcccatt actggcacgt atactgagtc   2640
attagggact ttccaatggg ttttgcccag tacataaggt caatagggggt gaatcaacag   2700
gaaagtccca ttggagccaa gtacactgag tcaatagggac ctttccattg ggttttgcc   2760
agtacaaaag gtcaataggg ggtgagtcaa tgggtttttc ccattattgg cacgtacata   2820
aggtcaatag gggtgagtca ttgggttttt ccagccaatt taattaaaac gccatgtact   2880
ttccccaccat tgacgtcaat gggctattga aactaatgca acgtgacctt taaacgtac   2940
tttcccatag ctgattaatg ggaaagtacc gttctcgagc caatacacgt caatgggaag   3000
tgaaagggca gccaaaacgt aacaccgccc cggttttccc ctggaaattc catattggca   3060
cgcattctat tggctgagct gcgttctacg tgggtataag aggcgcgacc agcgtcggta   3120
ccgtcgcagt cttcggtctg accaccgtag aacgcagagc tcctcgctgc aggcggccgc   3180
```

```
tctagaactc gtcgatcgca gcgatgacaa acctgcaaga tcaaacccaa cagattgttc   3240
cgttcatacg gagccttctg atgccaacaa ccggaccggc gtccattccg gacgacaccc   3300
tggagaagca cactctcagg tcagagacct cgacctacaa tttgactgtg ggggacacag   3360
ggtcagggct aattgtcttt ttccctggat tccctggctc aattgtgggt gctcactaca   3420
cactgcagag caatgggaac tacaagttcg atcagatgct cctgactgcc cagaacctac   3480
cggccagcta caactactgc agactagtga gtcggagtct cacagtgagg tcaagcacac   3540
tccctggtgg cgtttatgca ctaaacggca ccataaacgc cgtgaccttc caaggaagcc   3600
tgagtgaact gacagatgtt agctacaatg ggttgatgtc tgcaacagcc aacatcaacg   3660
acaaaattgg gaatgtcctg gtaggggaag gggtcactgt cctcagccta cccacatcat   3720
atgatcttgg gtatgtgagg cttggtgacc ccattcccgc tatagggctt gacccaaaaa   3780
tggtagctac atgcgacagc agtgacaggc ccagagtcta caccataact gcagccgatg   3840
attaccaatt ctcatcacag taccaaccag gtggggtaac aatcacactg ttctcagcca   3900
acattgatgc tatcacaagc ctcagcattg ggggagagct cgtgtttcaa acaagcgtcc   3960
aaggccttgt actgggcgcc accatctacc ttataggctt tgatgggact gcggtaatca   4020
ccagagctgt ggccgcagat aatgggctga cggccggcac cgacaatctt atgccattca   4080
atcttgtcat tccaaccaat gagataaccc agccaatcac atcatcaaaa ctggagatag   4140
tgacctccaa aagtggtggt caggcagggg atcagatgtc atggtcggca agtgggagcc   4200
tagcagtgac gatccatggt ggcaactatc caggggccct ccgtcccgtc acactagtag   4260
cctacgaaag agtggcaaca ggatccgtcg ttacggtcgc tgggggtgagt aacttcgagc   4320
tgattccaaa tcctgaacta gcaaagaacc tggttacaga atacgccga tttgacccag   4380
gagccatgaa ctacacaaaa ttgatactga gtgagaggga ccgtcttggc atcaagaccg   4440
tctggccaac aagggagtac actgattttc gtgagtactt catggaggtg gccgacctca   4500
actctcccct gaagattgca ggagcatttg gcttcaaaga cataatccgg gctataagga   4560
ggtagatcca gacatgataa gatacattga tgagtttgga caaaccacaa ctagaatgca   4620
gtgaaaaaaa tgctttattt gtgaaatttg tgatgctatt gctttatttg taaccattat   4680
aagctgcaat aaacaagtta acaacaacaa ttgcattcat tttatgtttc aggttcaggg   4740
ggaggtgtgg gaggtttttt cggatcctct agagtcgacg gcagagtcgc agacgcccct   4800
attggacgtc aaaattgtag aggtgaagtt ttcaaacgat ggcgaagtaa cggcgacttg   4860
cgtttccacc gtcaaatctc cctataggt agaaactaat tggaaagtag acctcgtaga   4920
tgtaatggat gaaatttctg ggaacagtcc cgccgggcct tttaacagta atgagaaatg   4980
gcagaaacag ctgtactaca gagtaaccga tggaagaaca tcggtccagc taatgtgcct   5040
gtcgtgcacg agccattctc cggaaccta ctgtctttc gacacgtctc ttatagcgag   5100
ggaaaaagat atcgcgccag agttatactt tacctctgat ccgcaaacgg catactgcac   5160
aataactctg ccgtccggcg ttgttccgag attcgaatgg agccttaata atgtttcact   5220
gccggaatat ttgacggcca cgaccgttgt ttccatacc gctggccaaa gtacagtgta   5280
gaagagcagc gcgagagcag gcgaggcgtg gatttctggc cggggaggca atatatacga   5340
atgcaccgtc ctcatctcag acggcactcg cgttactacg cgaaggaga ggtgcttaac   5400
aaacacatgg attgcggtgg aaaacggtgc tgctcaggcg cagctgtatt cactcttttc   5460
tggacttgtg tcaggattat gcgggagcat atctgctttg tacgcaacgc tatgaccgc   5520
catttatttt tgaggaatgc ttttttggact atcgtactgc tttcttcctt cgctagccag   5580
agcaccgccg ccgtcacgta cgactacatt ttaggccgtc gcgcgctcga cgcgctaacc   5640
ataccggcgg ttggcccgta taacagatac ctcactaggg tatcaagagg ctgcgacgtt   5700
gtcgagctca acccgatttc taacgtggac gacatgatat ggcggccaa agaaaaagag   5760
aagggggggcc ctttcgaggc ctccgtcgtc tggttctacg tgattaaggg cgacgacggc   5820
gaggacaagt actgtccaat ctatagaaaa gagtacaggg aatgtggcga cgtacaactg   5880
ctatctgaat gcgccgttca atctgcacag atgtgggcag tggactatgt tcctagcacc   5940
cttgtatcgc gaaatggcgc gggactgact atattctccc ccactgctgc gctctctggc   6000
caatacttgc tgaccctgaa aatcgggaga tttgcgcaaa cagctctcgt aactctagaa   6060
gttaacgatc gctgtttaaa gatcgggtcg cagcttaact ttttaccgtc gaaatgctgg   6120
acaacagaac agtatcagac tggatttcaa ggcgaacacc tttatccgat cgcagacacc   6180
aatacgacac acgcggacga cgtatatcgg ggatacgaa atattctgca gcgctggaat   6240
aatttgctga ggaaaagaa tcctagcgcg ccagaccctc gtccagatag cgtcccgcaa   6300
gaaattcccg ctgtaaccaa gaaagcgaa gggcgcaccc cggacgcaga aagcagcgaa   6360
aagaaggccc ctccagaaga ctcggaggac gacatgcagg cagaggcttc tggagaaaat   6420
cctgccgccc tccccgaaga cgacgaagtc cccgaggaca gcgagcacga tgatccaaac   6480
tcggatcctg actattacaa tgacatgccc gccgtgatcc cggtggagga gactactaaa   6540
agttctaatg ccgtctccat gcccatattc gcggcgttcg tagcctgcgc ggtcgcgctc   6600
gtgggggctac tggtttggag catcgtaaaa tgcgcgcgta gctaatcgag cctagaatag   6660
gtggtttctt cctacatgcc acgcctcacg ctcataatat aaatcacatg gaatagcata   6720
ccaatgccta ttcattggga cgttcgaaaa gcatggcatc gctacttgta actctggctc   6780
tccttgccgc gacgctcgca cccttcggcg cgatgggaat cgtgatcact ggaaatcacg   6840
tctccgccag gattgacgac gatcacatcg tgatcgtcgc gcctcgcccc gaagctacaa   6900
ttcaactgca gctattttc atgcctggcc agagacccca caaaccctac tcaggaaccg   6960
tccgcgctgc gtttcggtct gatataacaa accagtgcta ccaggaactt agcgaggagc   7020
gctttgaaaa ttgcactcat cgatcgtctt ctgtttttgt cggctgtaaa gtgaccgagt   7080
acacgttctc cgcctcgaac agactaaccg gacctccaca cccgtttaag ctcactatac   7140
gaaatcctcg tccgaacgac agcgggatgt tctacgtaat tgttcggcta gacgacacca   7200
aagaacccat tgacgtcttc gcgatccaac tatcggtgta tcaattcgcg aacaccgcta   7260
cgactcgcgg actctattcc aaggcttcgt gtcgcaccct cggattacct accgtccaac   7320
ttgaggccta tctcaggacc gaggaaagtt ggcgcaactg gcaagcgtac gttgccacgg   7380
aggccacgac gaccagcgcc gaggcgacaa ccccgacgcc cgtcactgca accagcgcct   7440
ccgaacttga agcggaacac tttacctttc cctggctaga aaatggcgtg gatcattacg   7500
aaccgacacc cgcaaacgaa aattcaaacg ttactgtccg tctcgggaca atgagcccta   7560
cgctaattgg ggtaacctgg gctgccgtcg tgagcgcaac gatcgcgctc cgcattgtaa   7620
tttccatcgt caccagaaac atgtgcaccc cgcaccgaaa attagacacg gtctcgcaag   7680
acgacgaaga acgttcccaa actagaaggg aatcgcgaaa atttgacccc atggttgcgt   7740
gcgaaataaa caagggggct gaccaggata gtgaacttgt ggaactggtt gcgattgtta   7800
acccgtctgc gctaagctcg cccgactcaa taaaaatgtg attaagtctg aatgtggctc   7860
tccaatcatt tcgattctct aatctcccaa tcctctcaaa aggggcagta tcggacacgg   7920
```

```
actgggaggg gcgtacacga tagttatatg gtacagcaga ggcctctgaa cacttaggag   7980
gagaattcag ccggggagag cccctgttga gtaggcttgg gagcatattg caggatgaac   8040
atgttagtga tagttctcgc ctcttgtctt gcgcgcctaa cttttgcgac gcgacacgtc   8100
ctcttttttgg aaggcactca ggctgtcctc ggggaagatg atcccagaaa cgttccggaa   8160
gggactgtaa tcaaatggac aaaagtcctg cggaacgcgt gcaagatgaa ggcggccgat   8220
gtctgctctt cgcctaacta ttgctttcat gatttaattt acgacggagg aaagaaagac   8280
tgcccgcccg cgggaccccct gtctgcaaac ctggtaattt tactaaagcg cggcgaaagc   8340
ttcccggggtt aattaaggcc ctcgaggata catccaaaga ggttgagtat tctctctaca   8400
cttcttgtta aatggaaagt gcatttgctt gttcttacaa tcggcccgag tctcgttcac   8460
agcgcctcgt tcacacttaa accacaaata gtctacaggc tatatgggag ccagactgaa   8520
actcacatat gactaatatt cggggggtgtt agtcacgtgt agcccattgt gtgcatataa   8580
cgatgttgga cgcgtcctta ttcgcggtgt acttgatact atggcagcga gcatgggata   8640
ttcatcctcg tcatcgttaa catctctacg ggttcagaat gtttggcatg tcgtcgatcc   8700
tttgcccatc gttgcaaatt acaagtccga tcgccatgcc cgcgataagc ctgtaccatg   8760
tggcattagg gtgacatctc gatcatacat tataagacca acgtgcgagt cttccaaaga   8820
cctgcacgcc ttcttcttcg gattgtcaac gggttcttca gaatctatgc ccatatctgg   8880
cgttgagacc attgtgcgtt taatgaacaa taaagcggca tgccatgaaa aggagggctg   8940
cagatctcca ttttctcacg ccactatcct ggacgctgta gacgataatt ataccatgaa   9000
tatagagggg gtatgtttcc actgccactg tgatgataag ttttctccag attgttggat   9060
atctgcattt tctgctgccg aacaaacttc atcgctatgc aaagagatgc gtgtgtacac   9120
gcgccggtgg agtacgggg aaactaaatg ttcatagagg tctttgggct atatgttatt   9180
aaataaaata attgaccagt gaacaatttg tttaattgtta gtttattcaa tgcattggtt   9240
gcaaatattc attacttctc caatcccagg tcattcttta gcgagatgat gttatgacat   9300
tgctgtgaaa attactacag gatatatttt taagatgcag gagtaacaat gtgcatagta   9360
ggcgtagtta tcgcagacgt gcaacgcttc gcatttgagt taccgaagtg cccaacagtg   9420
ctgcggttat ggtttatgcg cacagaatcc atgcatgtcc taattgaacc atccgatttt   9480
tcttttaatc gcgatcgatg tttgggcaac tgcgttattt cagatctaaa aaatttaccc   9540
tttatgacca tcacatctct ctggctcata ccccgcttgg ataagatatc atgtagattc   9600
cgccctaaga aatgcaaact aacattattg tcggttccat atacacttcc atcttgtcct   9660
tcgaaaataa caaactcgcg caatagaccg tccgtacatg catggccgat gtgtgtcaac   9720
atcattggtc tgctagatcc cgatgggacg aatcgtacag tcgtcgctcc agcattggca   9780
aaaatcccca gataccctcc atgcggcaaa tctaaattgc gacccgaag agactgcacc   9840
aaagtcttat cgacgcacgc tgattttttt gaacagcggg agcccattat cttcagtgga   9900
gcgtagacgg gcgaggctaa ttatgtgaca tagcaacact gcatgtatgt ttttataaat   9960
caataagagt acataattta ttacgtatca tttccgtttg taatatactg tatacatcat  10020
ccacactatt agtcagcact agcgcgcggg cgcacgttac aatagcagcg tgcccgttat  10080
ctatattgtc cgatatttac acataacatt tcatcgacat gattaaatac ctaagtactg  10140
cacacagatg tttaatgtat atcgtcatat aaattatatc gctaggacag acccaaacga  10200
cctttatccc aaacagtcag atcctctct caagtgtcga tttctgttat ggaatatgca  10260
taccctggcc cagaaattgc acgcacgagc gtagtgaatg cgtcattggt tttacattta  10320
aaggctaaat gcacaaattc tttagacgac agcacatcgt taaatagcat ctctagcgtt  10380
cttatgaatg ctaagcattg gagtcctcct ggtcggccac aataacagct gagtatcata  10440
ccctgagctc cggggttgtc gcacatagcg gattcgtata aacataggat tttccgcgaa  10500
tccatcagtt gcaaaaatct gttaggctcc atcaacaacg ctggatttac ttcagatcca  10560
cgcgtaaagt aatggtgctc gaataccgtt tttagagttg tcggcatttc aaggaacaaa  10620
gaattcattt cttcattgca acgacgcgcc agaaatccca agacctcttt gggtagtatg  10680
ttcttgccta taaaacacgg cgttccaagt gccaggaacc acgcatgtgt tactgttggg  10740
gcgtattcag aaataaagcg gggtttatgc ggcttttgaa gctcggatat ccaaagtatc  10800
gcttgctgat gaacgagcga tgtagctgtt acaaaacctc cttttccatcc tccagtcaac  10860
ataatattta tcgcctacc tatgtccgta ataagtattg gtcgggcaat tattccgtat  10920
gaggtcttgc aggaataagc tcttagggac agccagcttg gatatggtgc gaaacagacc  10980
ttctcggctt cagaatgtcg ctccgcagtc tcttcgtgtc ggtgcatctt agatccacca  11040
tcaatgtgtg cagcattgac tcccgcccgt cgaatattcc ttttgttacg atgcagtaat  11100
gagcacgatc atgggcgggg cgatgacgtt ctatttgcat gtctgcgaac aatttgcgtc  11160
agtcatacag ctatggagtg gggcatttct ggccgtcaac ttaaaaacgc gaaccgcaga  11220
catatgtatt tgcatgcaaa gacgtatctt cgtatttctg ggcatcttca aatgctctgt  11280
ccaatatggc aatgaatttg gattcgtttg acgccgatgg tatgcagtgc aaatgtgcca  11340
atagcccaca tccgaaaaag ttatttgtca tacaagcagg tgttaagtag caatcacata  11400
aaggcaccag acgcctcatg gcatcataat gaatagctcc ttctccccac tggaaccact  11460
gacaaaatct gcgagtatat tccgcaaacc acattttatt tctcatagaa actaccctaa  11520
atcctttttaa cgggaagaag aatcctagat agtgcttgaa gtcatgactg ttactgctgc  11580
aataacactg tatattattt ataaattccg tttgtctagg tatctgatgt aggcattccg  11640
atcccttttac tattgcgtct tcacgaccaa atgggaatgc gccaaaatcc ccacacctca  11700
tcaccctgga ggcagattgt agttattaa atccgccgca ttgaagcaca aaacggtacg  11760
gtactgttcc taattctggt atagattcta tggtcaaaag tctgcatatc ccgacattg  11820
ccatgagatc acacagtcca agtagcatgt ttattgagtc actcagactg tcaacgtccc  11880
tcgccgcacc accaatcgaa aataaagtat ctacgcaagt tatagctccg catttctcat  11940
cgctagcagc aatcgcgacg caaaacataa aggccatgtt gggatttgaa ctctctgggg  12000
ggcttgttat cttctgcacc gtcgcagtcg cagtttttccg atcttatgt ctaatatatt  12060
ttccggccgt gctccaatcg gccgaaaaga atctgcgtat taccagactc attgacgggc  12120
cgataaagac cataaaacaa aattcctgtg cactccctcc tccagttttg ccatcgtcca  12180
agtcccgtaa cttttttttgc gtttcgagga gcaagcgttc gttatcccta cccacacttg  12240
ttttccaccg tttttcttatt ataagcggtt gtatcgccaa cgcgtcaccg caggttgtca  12300
catacagtga tggcatactt gaacgtgcaa caacgcgtc gctttgcaaa tcttaagtcat  12360
tgaccatcaa atcgcgttga gaggatagcc aggcatcttt ttcctagta tggtgacggt  12420
gcagccaccc caactcagtt cttgtaaaaa agctattgg cgggaattta tgttctgagg  12480
tgcattctat atttatgagt ccatcaaatg ccattaacca gattcgtatt ttttcgctcg  12540
acccggcatc actatggata caatacctt ctatggccca tttcagctct cgaaccaacc  12600
acacggacaa ttgactaaca taagtatgat ctttatcaca gtcgcaccca tctgagttat  12660
```

```
atttatggca tccgagcgct cttactgtac ggtcggatac acccatggtt tttcctttat 12720
atagtcgggt tatagtctgt cgggtttggc ggtagcacgg agtagtttga tttttaagaa 12780
tcgaaaaccg gcttggagag accactgtcg aatatttgtc cgtatactct acacgtgagt 12840
gttgtccatt cctaggtata ttcatctgtt cggatacctt caattgctgt tcaggcataa 12900
ccttaaagca tatgttatgt tgtacatcaa aacttggtga gttatgttcg attgccgcgc 12960
ataaagaatc gtacatgagc gtttctgcta acatactatc tatattctca cacgccctg  13020
catatactgt tcctattcca aattcacgtt ttgccccatc ggctatctgc tcccaaaaag 13080
ttgtaatata ggtgccgctg ggtgcgaaat tttcatcagt tgtattcctg ataaactgaa 13140
tcactttaca taattttgc cacatatctg cgtgcagcca tagtatcgaa cccgtgggct 13200
cggagacgac agtgcgtaca atgggtattt taccttccc caacaaaata atggtataca 13260
agttaggtcc gtacctagac cttaatgttt ccaattcttc tgaatcactg cactctcgta 13320
ggggagtaac ggtaataatt tcgtctctga gccccgtttt gcgttgaaaa ctaatcacat 13380
tagataatgt gcaatcggtt tcttttatcc ggatacatct aagtattatg acatcggtgg 13440
tcattgtttc catcaacgac catcttttac gatcgcccat actactcatg gacgttgtcg 13500
gtgttgaaaa atcaccagaa ttgcaacgga tctctgggta ccatgctgct gatggaattg 13560
gcggttttaa ttgttgtttc agtctattat tgctatcttt ggcggggttg aataatgtgg 13620
ggggagagtg attgcaggaa tccgaatggg tcaataaaac gaccgtgctc cgttctgccg 13680
gcgccgatcc gattgaagct atatacttcg cttctctccc cactttttcca atttgatccg 13740
gaaataaaac ggccccgac aacagtatcg tacgatccgg atccggatcc tgcttgccta 13800
cagaagaatc aacatctcgc cccaatattc tggtcaaaac tggctcgctc atggcaacgc 13860
ggacgtttcc cccggtggcc agtcttaatg gttaatgttc ttttcggcaa tcttatacat 13920
cagcgggttg cgtgaatact ggtcacagtt cagtcattta ctacacacca caatacgac  13980
gacgacagt accgtcccga cgaacgcgac gcccaaaatt gctatcgcga ccgcgtccga  14040
ggcgatgtcg tacgggcggt gcggggttgg atcctcggca aagagatcct cgtaattcgg 14100
cggtgggagc ggagggtaaa gacgcgggtg gggatctccc tccggaccgc gcgccgggcg 14160
cggttcgaaa atgctttccg cctcgctcag tgtcaacgcc aagtattcgg gcgggctggg 14220
ggccggaata tctcccgcga cttcttctat cggcgcggaa ttggagtcgc ggtcgtggcg 14280
cgcttctagc gtcgtcaacg gaagtccatt ttcggggtct cccggtgggc gttcagcgtc 14340
catcgtcgta tatgctctaa cacacgtctc gctatattaa aaaaagaag agtatcggtc  14400
agtgtcgagt gtcgccgaca atgtcgcgag ttctcggcga tttaattttt ggaactgctc 14460
cctatgaatc ccgtaactgt agcgcccgcg cagaaagccg ccatcagacc aactacgtgt 14520
ctgttcgatg tttgcccgcc gatcgcttta ccgattaagg ttccggcgag aaatgacatg 14580
ctcgatccaa gaacaaagtt tttcgcggta aacaacaaca tagttaccgt gcgagatgga 14640
gaaaccacat ctcccgaatt agtagaggaa agcccgcgct gtcggtttgg ggacatatcg 14700
atctttttg tgttttttcct aggacccttt tgccagatcg tacaaagtcg cgtcttatga 14760
gcggacgttc ttactgcagc tcggtaggag tggggcaggg ttagatttcg tcggcgtttc 14820
ggcccccgta tgcgccgcgc caccctcttc gccgagctct ttatgcgcgg tggggtgag  14880
cgcttccgga gttgcgatct ccgatctcga gccgcagccc ggcggtgtct ctttcagtgg 14940
agcgttagcg ccatcatgtg gttcgtggcg gtggaaaggc tattatgtgt tagggagag  15000
accacgtgat cggcatgcaa atgagcaagg cgaacgcgtc agcgttcgca ctgcgaacca 15060
ataatatata tattatacta ttggcttag gtgcgaacgt ccggctagtc caatagcggg 15120
gtcgcgtttc gtaccacgtg ttatagaccg ccctaaactc gcactcgggg gtccggccgc 15180
gcccagacag ggcggagacg tgccacaggg gctttaaaac accgcttcgg gcaccgttca 15240
tctcggcgcg cc                                                    15252
```

SEQ ID NO: 19    moltype = DNA    length = 199
FEATURE          Location/Qualifiers
source           1..199
                 mol_type = genomic DNA
                 organism = Simian virus 40
SEQUENCE: 19
```
agcttcagac atgataagat acattgatga gtttggacaa accacaacta gaatgcagtg  60
aaaaaaatgc tttatttgtg aaatttgtga tgctattgct ttatttgtaa ccattataag 120
ctgcaataaa caagttaaca acaacaattg cattcatttt atgtttcagg ttcaggggga 180
ggtgtgggag gttttttcg                                              199
```

RECOMBINANT NON-PATHOGENIC MAREK'S DISEASE VIRUS CONSTRUCTS ENCODING INFECTIOUS LARYNGOTRACHEITIS VIRUS AND INFECTIOUS BURSAL DISEASE VIRUS ANTIGENS

CROSS-REFERENCE TO RELATED APPLICATIONS

This application is a continuation application of U.S. application Ser. No. 16/309,297, filed on Dec. 12, 2018, which is a national stage entry under 35 U.S.C. § 371 of PCT/EP2017/064662, filed on Jun. 15, 2017, which claims priority to U.S. Application No. 62/351,471, filed on Jun. 17, 2016.

SEQUENCE LISTING

The instant application contains a Sequence Listing which has been submitted electronically in XML file format and is hereby incorporated by reference in its entirety. Said XML copy, created on Jun. 8, 2023, is named 24341-US-CNT-_SL.xml and is 88,048 bytes in size.

FIELD OF THE INVENTION

The present invention relates to novel recombinant multivalent non-pathogenic Marek's Disease virus constructs encoding and expressing Infectious Laryngotracheitis Virus and Infectious Bursal Disease Virus protein antigens, and methods of their use in poultry vaccines.

BACKGROUND OF THE INVENTION

Pathogenic poultry viruses are not only debilitating to chickens, but they also are costly to chicken breeders because most of the resulting diseases are contagious and the poultry industry relies heavily on confined, large-scale breeding facilities. Vaccinating young chicks is often the only viable means to combat these viruses. Although attenuated or killed poultry viral vaccines remain important in the market place, in recent years significant resources have been expended on developing vaccines containing recombinant viral constructs which express pathogenic viral protein antigens. Furthermore, substantial efforts have been made to construct stable and efficacious multivalent recombinant non-pathogenic Marek's Disease virus (abbreviated as $rMDV_{np}$) vectors that express foreign genes from multiple viral pathogens. Such multivalent vaccines would serve to minimize the number of injections given to the chicks and thereby, reduce discomfort and stress on the vaccinated chick, as well as significantly reduce costs in labor and materials. Vaccinating with such single multivalent constructs also would be preferable to alternative multivalent $rMDV_{np}$ vaccines that contain multiple recombinant monovalent $rMDV_{np}$ constructs, because these alternative vaccines have, at least to date, resulted in protection against only a single viral pathogen. The failure of such alternative vaccines is presumably due to one of the monovalent $rMDV_{np}$ constructs overgrowing the other monovalent $rMDV_{np}$ constructs thereby, preventing these other monovalent $rMDV_{np}$ constructs from inducing a significant immune response. In any case, despite substantial efforts in the past to construct stable and efficacious multivalent $rMDV_{np}$ vectors that express foreign genes from multiple viral pathogens indeed, such vaccines had been suggested more than twenty years ago [see e.g., U.S. Pat. No. 5,965,138], it has been only recently that a multivalent vaccine that comprises a recombinant herpesvirus of turkeys (abbreviated as rHVT) encoding antigens from more than one other pathogen has been shown to be both stable and efficacious.

One poultry virus disease that can be controlled through vaccination is Marek's disease. Marek's disease is a pathogenic disease that adversely affects chickens worldwide. Marek's disease occurs predominantly in young chickens between 2 and 5 months of age. Clinical signs include: progressive paralysis of one or more of the extremities, incoordination due to paralysis of legs, drooping of the limb due to wing involvement, and a lowered head position due to involvement of the neck muscles. In acute cases, severe depression may result. Bursal and thymic atrophy may also develop.

The etiological agent for Marek's disease is Marek's disease virus serotype 1 (abbreviated as MDV1), a cell-associated virus having a double-stranded DNA genome. MDV1 is a lymphotropic avian alphaherpesvirus that both: (i) infects B cells, which can result in cytolysis, and (ii) latently infects T cells, which can induce T-cell lymphoma. Closely related to the virulent MDV1 strain, Marek's disease virus serotype 2 (abbreviated as MDV2), previously known as Gallid herpes virus 3, is a naturally attenuated MDV strain that has been shown to have little to no pathogenicity in chickens [Petherbridge et al., *J. Virological Methods* 158:11-17 (2009)]. SB-1 is a specific MDV2 strain that has been shown to be useful in vaccines against MDV1 [see e.g., Murthy and Calnek, Infection and Immunity 26(2) 547-553 (1979)].

Another closely related alphaherpesvirus, Marek's disease virus serotype 3 (abbreviated as MDV3), more widely known as herpesvirus of turkeys (abbreviated as HVT), is a nonpathogenic virus of domestic turkeys [see e.g., Kingham et al., *J. of General Virology* 82:1123-1135 (2001)]. Two commonly used strains of HVT are the PB1 strain and the FC126 strain. Whereas, HVT is also nonpathogenic in chickens, it does induce a long-lasting protective immune response in chickens against MDV1. Accordingly, HVT has been used in poultry vaccines against virulent MDV1 for many years, generally in combination with SB-1, which is more viraemic than HVT, but considered less safe. Alternatively, when flocks are challenged with particularly virulent MDV1 strains, HVT can be combined with the Rispen's vaccine. The Rispen's vaccine is an isolate that originated from a mildly virulent MDV1 strain that was subsequently further weakened by cell passaging. The Rispen's strain however, retains some virulence towards highly susceptible lines of chickens.

The sequence of the complete genome of HVT has been disclosed [Afonso et al., *J. Virology* 75(2):971-978 (2001)], and as most alphaherpesviruses, HVT possesses a significant number of potential nonessential insertion sites [see e.g., U.S. Pat. Nos. 5,187,087; 5,830,745; 5,834,305; 5,853,733; 5,928,648; 5,961,982; 6,121,043; 6,299,882 B1]. HVT also has been shown to be amenable to genetic modification and thus, has been used as a recombinant vector for many years [WO 87/04463]. Accordingly, recombinant HVT vectors have been reported to express foreign genes that encode antigens from e.g., Newcastle Disease Virus (NDV), [Sondermeijer et al., *Vaccine,* 11:349-358 (1993); Reddy et al., *Vaccine,* 14:469-477 (1996)], Infectious Bursal Disease Virus (IBDV), [Darteil et al., *Virology,* 211:481-490 (1995); Tsukamoto et al., *J. of Virology* 76(11):5637-5645 (2002)], and Infectious Laryngotracheitis Virus (ILTV) [Johnson et al., *Avian Disease,* 54(4):1251-1259 (2010); WO 92/03554;

U.S. Pat. No. 6,875,856]. The entire genomic sequence of MDV2 is also known [see, GenBank acc. nr: AB049735.1, and Petherbridge et al., supra]. The genomic organization of the MDV2 is very similar to that of HVT, with the US region in particular, being identical to that of HVT [see, Kingham et al., supra].

In addition a recombinant chimeric virus, known as the novel avian herpesvirus (NAHV), has been constructed in which specific regions of the HVT genome have been replaced by the corresponding regions of the MDV1 genome. The NAHV also has been used to express foreign genes that encode antigens from other poultry viruses [U.S. Pat. Nos. 5,965,138; 6,913,751].

Like MDV, infectious laryngotracheitis virus (abbreviated as ILTV or ILT) is an alphaherpesvirus that adversely affects chickens, worldwide [Fuchs et al., *Veterinary Research* 38:261-279 (2007)]. ILTV causes acute respiratory disease in chickens, which is characterized by respiratory depression, gasping, and expectoration of bloody exudate. Viral replication is limited to cells of the respiratory tract, where in the trachea the infection gives rise to tissue erosion and hemorrhage.

Infectious bursal disease virus (abbreviated as IBDV or IBD), also called Gumboro disease virus, is the causative agent of infectious bursal disease. IBDV causes an acute, highly-contagious, viral infection of a chicken's lymphoid tissue, with its primary target being the bird's essential immunological organ: the bursa of Fabricius. The morbidity rate in susceptible flocks is high, with rapid weight loss and moderate to high mortality rates. Chicks that recover from the disease may have immune deficiencies because of destruction of (or parts of) the bursa of Fabricius. This makes them particularly vulnerable to secondary infections.

IBDV is a member of the Birnaviridae family. The viruses in this family have a genome consisting of two segments (A and B) of double-stranded RNA. Two serotypes of IBDV exist, serotype 1 and 2, which can be differentiated by virus neutralization (VN) tests. Serotype 1 viruses have been shown to be pathogenic to chickens, while serotype 2 viruses cause only sub-acute disease in turkeys. Historically, IBDV serotype 1 viruses consisted of only one type that is now known as "classic" IBD virus. More recently, so-called "variant" IBDV strains have emerged. Classic and variant strains of IBDV can be identified and distinguished by a virus neutralization test using a panel of monoclonal antibodies, or by RT-PCR [Wu et al., Avian Diseases, 51:515-526(2007)]. Well-known classic IBDV strains include, D78, Faragher 52/70, and STC, whereas 89/03 is a well-known variant strain. Many live or inactivated IBDV vaccines are commercially available, e.g. a live vaccine such as NOBILIS$^R$ Gumboro D78 (MSD Animal Health).

As indicated above, because HVT can act as both an antigen that provides significant protection against Marek's Disease and as a recombinant vector, it is presently used as a platform vector for such multivalent vaccines as Innovax®-ILT (sold by Merck Animal Health), which protects against ILTV; Innovax®-ND-SB (sold by Merck Animal Health) Vectormune® HVT-NDV (sold by Ceva), both of which protect against NDV; and Vaxxitek® HVT+IBD (Merial; previously named: Gallivac™ HVT–IBD), and Vectormune™ HVT–IBD (Ceva) both of which protect against IBDV. Notably, Innovax®-ILT comprises two foreign genes, i.e., ILTV gD and ILTV gI, which has proved to be safe, effective, and stable. However, these two foreign genes are from the same pathogen and moreover, they naturally overlap and need to be co-expressed in order to allow proper immunization against ILTV. More recently, a recombinant safe, effective, and stable multivalent vaccine comprising HVT-ILTV-NDV has been disclosed [U.S. Pat. Nos. 8,932,604 B2 and 9,409,954 B2, the contents of which are hereby incorporated by reference in their entireties]. An early HVT-NDV-IBDV also has been disclosed, though upon prolonged testing during the development of the corresponding product one of the main constructs, HVP309, was found neither to display adequate genetic stability nor sustained expression of the heterologous inserts [WO 2013/057,235]. Subsequently, a more stable and efficatious construct was developed [WO 2016/102647].

Therefore, despite the clear advantages of stable, multivalent, recombinant $MDV_{np}$ constructs that can efficaciously express heterologous antigens from two or more different pathogens, and the substantial efforts to design them, heretofore, few have been forthcoming and even one of those few proved to be incapable of achieving all of the requisite requirements. Accordingly, the suitability of any given multivalent recombinant $MDV_{np}$ as a vaccine remains unpredictable when the recombinant $MDV_{np}$ comprises a combination of heterologous antigens that are obtained from a unique set of two or more poultry viruses. Therefore, there is a clear need to overcome the collective industry failures, by constructing novel, stable, recombinant $MDV_{np}$ vectors that can be used in multivalent vaccines as the sole active to protect against two or more different non-MDV1 poultry virus pathogens.

The citation of any reference herein should not be construed as an admission that such reference is available as "prior art" to the instant application.

SUMMARY OF THE INVENTION

Accordingly, the present invention provides a novel, stable, and efficacious multivalent recombinant nonpathogenic Marek's Disease virus ($rMDV_{np}$) for use as a vector to express foreign genes from multiple viral pathogens. In particular embodiments, the $rMDV_{np}$ is a recombinant herpesvirus of turkeys (rHVT). In alternative embodiments, the $rMDV_{np}$ is a recombinant Marek's disease virus serotype 2 (rMDV2). An $rMDV_{np}$, e.g., an rHVT or an rMDV2, can be used in vaccines against pathogenic poultry viruses.

In particular embodiments, an $rMDV_{np}$ comprises a first heterologous nucleic acid located in a first nonessential site in the $rMDV_{np}$ genome and a second heterologous nucleic acid located in a second nonessential site in the $rMDV_{np}$ genome. The first heterologous nucleic acid comprises both a nucleotide sequence that encodes an Infectious Laryngotracheitis Virus (ILTV) gD protein and a nucleotide sequence that encodes an Infectious Laryngotracheitis Virus (ILTV) gI protein. The second heterologous nucleic acid comprises a nucleotide sequence that encodes an Infectious Bursal Disease Virus (IBDV) viral protein 2 (VP2). In specific embodiments of this type, the first heterologous nucleic acid comprises the nucleotide sequence of SEQ ID NO: 9 and the second heterologous nucleic acid comprises the nucleotide sequence of SEQ ID NO: 5. In specific embodiments, the $rMDV_{np}$ is an rHVT. In alternative embodiments, the $rMDV_{np}$ is an rMDV2.

In certain embodiments, the first nonessential site of the $rMDV_{np}$ is the US2 site, while the second nonessential site is a nonessential site of the $rMDV_{np}$ other than the US2 site. In related embodiments, the first nonessential site of the $rMDV_{np}$ is the US2 site and the second nonessential site of the $rMDV_{np}$ is the UL7/8 site. In yet other embodiments, the first nonessential site of the $rMDV_{np}$ is the US2 site and the second nonessential site of the $rMDV_{np}$ is the US10 site. In still other embodiments, the first nonessential site of the rMDV$_{np}$ is the US2 site and the second nonessential site of the rMDV$_{np}$ is the UL 54.5 site. In specific embodiments, the rMDV$_{np}$ is an rHVT. In alternative embodiments, the rMDV$_{np}$ is an rMDV2.

In other embodiments, the second nonessential site of the rMDV$_{np}$ is the US2 site, while the first nonessential site is a nonessential site of the rMDV$_{np}$ other than the US2 site. In related embodiments, the second nonessential site of the rMDV$_{np}$ is the US2 site and the first nonessential site of the rMDV$_{np}$ is the UL7/8 site. In yet other embodiments, the second nonessential site of the rMDV$_{np}$ is the US2 site and the first nonessential site of the rMDV$_{np}$ is the US10 site. In still other embodiments, the second nonessential site of the rMDV$_{np}$ is the US2 site and the first nonessential site of the rMDV$_{np}$ is the UL 54.5 site. In specific embodiments, the rMDV$_{np}$ is an rHVT. In alternative embodiments, the rMDV$_{np}$ is an rMDV2.

In other embodiments, the first nonessential site and the second nonessential site of the rMDV$_{np}$ are the same. In specific embodiments of this type, the first heterologous nucleic acid and the second heterologous nucleic acid are actually constructed as part of the same DNA molecule, which is inserted into a nonessential site of the rMDV$_{np}$. Such a DNA molecule can be an expression cassette that encodes an Infectious Laryngotracheitis Virus (ILTV) gD protein, an Infectious Laryngotracheitis Virus (ILTV) gI protein, and an Infectious bursal disease virus (IBDV) VP2. In particular embodiments of this type, the DNA molecule comprises the nucleotide sequence of SEQ ID NO: 15. In other embodiments of this type, the DNA molecule comprises the nucleotide sequence of SEQ ID NO: 16. In still other embodiments of this type, the DNA molecule comprises the nucleotide sequence of SEQ ID NO: 17. In yet other embodiments of this type, the DNA molecule comprises the nucleotide sequence of SEQ ID NO: 18. In specific embodiments, the rMDV$_{np}$ is an rHVT. In alternative embodiments, the rMDV$_{np}$ is an rMDV2.

Accordingly, in particular embodiments, the first nonessential site and the second nonessential site of the rMDV$_{np}$ are the US2 site. In other embodiments, the first nonessential site and the second nonessential site of the rMDV$_{np}$ are the UL54.5 site. In yet other embodiments, the first nonessential site and the second nonessential site of the rMDV$_{np}$ are the UL7/8 site. In still other embodiments, the first nonessential site and the second nonessential site of the rMDV$_{np}$ are the US10 site. In specific embodiments, the rMDV$_{np}$ is an rHVT. In alternative embodiments, the rMDV$_{np}$ is an rMDV2.

The nucleotide sequences encoding the ILTV gD protein, the ILTV gI protein, and the IBDV VP2 protein can be operatively under the control of exogenous promoters, i.e., promoters that are not naturally found in the MDV$_{np}$. In certain embodiments, these three nucleotide sequences are operatively under the control of different promoters, i.e., the nucleotide sequence encoding the ILTV gD protein is operatively under the control of a first promoter, the nucleotide sequence encoding the ILTV gI protein is operatively under the control of a second promoter, and the nucleotide sequence encoding the IBDV VP2 protein is operatively under the control of a third promoter, with the first promoter, the second promoter, and the third promoter all being different. In particular embodiments, the promoter for the nucleotide sequence encoding the ILTV gD protein is the endogenous ILTV gD promoter. In certain embodiments, the promoter for the nucleotide sequence encoding the ILTV gI protein is the endogenous ILTV gI promoter. In particular embodiments of this type, the promoter for the nucleotide sequence encoding the ILTV gD protein is the endogenous ILTV gD promoter and the promoter for the nucleotide sequence encoding the ILTV gI protein is the endogenous ILTV gI promoter. In specific embodiments, the rMDV$_{np}$ is an rHVT. In alternative embodiments, the rMDV$_{np}$ is an rMDV2.

In certain embodiments, at least one of the promoters operably linked to a nucleotide sequence encoding the ILTV gD protein, the ILTV gI protein, or the IBDV VP2 protein is the murine cytomegalovirus immediate early (mCMV IE) promoter. In related embodiments, at least one of the promoters operably linked to a nucleotide sequence encoding the ILTV gD protein, the ILTV gI protein, or the IBDV VP2 protein is the human cytomegalovirus immediate early (hCMV IE) promoter or a derivative thereof (e.g., from strain AD169). In other embodiments, at least one of the promoters operably linked to a nucleotide sequence encoding the ILTV gD protein, the ILTV gI protein, or the IBDV VP2 protein is the chicken β-actin promoter. In still other embodiments, at least one of the promoters operably linked to a nucleotide sequence encoding the ILTV gD protein, the ILTV gI protein or the IBDV VP2 protein is the pseudorabies virus (PRV) gpX promoter.

In particular embodiments, the promoter for the nucleotide sequence encoding the IBDV VP2 protein is the mCMV IE promoter. In related embodiments, the promoter for the nucleotide sequence encoding the IBDV VP2 protein is the human cytomegalovirus immediate early (hCMV IE) promoter or a derivative thereof (e.g., from strain AD169). In other embodiments, the promoter for the nucleotide sequence encoding the IBDV VP2 protein is the chicken beta-actin gene promoter. In specific embodiments, the promoter for the nucleotide sequence encoding the IBDV VP2 protein is the mCMV IE promoter, the promoter for the nucleotide sequence encoding the ILTV gD protein is the endogenous ILTV gD promoter, and the promoter for the nucleotide sequence encoding the ILTV gI protein is the endogenous ILTV gI promoter. In other specific embodiments, the promoter for the nucleotide sequence encoding the IBDV VP2 protein is the hCMV IE promoter (or a derivative thereof), the promoter for the nucleotide sequence encoding the ILTV gD protein is the endogenous ILTV gD promoter, and the promoter for the nucleotide sequence encoding the ILTV gI protein is the endogenous ILTV gI promoter. In yet other specific embodiments, the promoter for the nucleotide sequence encoding the IBDV VP2 protein is the chicken β-actin promoter, the promoter for the nucleotide sequence encoding the ILTV gD protein is the endogenous ILTV gD promoter, and the promoter for the nucleotide sequence encoding the ILTV gI protein is the endogenous ILTV gI promoter.

In certain embodiments, an rMDV$_{np}$ of the present invention that includes insertions of nucleotide sequences encoding the ILTV gD protein, the ILTV gI protein, and the IBDV VP2 protein also includes one or more exogenous transcription terminator sequences. In specific embodiments of this type, a transcription terminator sequence is downstream from the nucleotide sequence encoding the IBDV VP2 protein. In particular embodiments, the nucleotide sequences encoding the ILTV gD protein and the ILTV gI protein share one transcription terminator sequence and the nucleotide sequence encoding the IBDV VP2 protein has another. In particular embodiments, at least one of the transcription terminator sequences comprises a feline herpesvirus US-9 (FHV US-9) polyadenylation sequence. In related embodiments at least one of the transcription terminator sequences comprises a Herpes Simplex Virus thymidine kinase (HSV TK) polyadenylation sequence. In specific embodiments, the rMDV$_{np}$ is an rHVT. In alternative embodiments, the rMDV$_{np}$ is an rMDV2.

The present invention provides a recombinant nucleic acid comprising in 5' to 3' direction in the following order, (i) a murine cytomegalovirus immediate early (mCMV IE) promoter, (ii) a coding sequence for the IBDV VP2 protein, (iii) a transcription terminator sequence (iv) an ILTV gD promoter, (v) a coding sequence for the ILTV gD protein, (vi) an ILTV gI promoter, and (vii) a coding sequence for the ILTV gI protein. In a particular embodiment of this type, the recombinant nucleic acid comprises the nucleotide sequence of SEQ ID NO: 15. The present invention further provides a recombinant nucleic acid comprising in 5' to 3' direction in the following order, (i) a human cytomegalovirus immediate early (hCMV IE) promoter or derivative thereof, (ii) a coding sequence for the IBDV VP2 protein, (iii) a transcription terminator sequence (iv) an ILTV gD promoter, (v) a coding sequence for the ILTV gD protein, (vi) an ILTV gI promoter, and (vii) a coding sequence for the ILTV gI protein. The present invention also provides a recombinant nucleic acid comprising in 5' to 3' direction in the following order, (i) a chicken β-actin promoter, (ii) a coding sequence for the IBDV VP2 protein, (iii) a transcription terminator sequence (iv) an ILTV gD promoter, (v) a coding sequence for the ILTV gD protein, (vi) an ILTV gI promoter, and (vii) a coding sequence for the ILTV gI protein.

The present invention further provides a recombinant nucleic acid comprising in 5' to 3' direction in the following order, (i) an Infectious Laryngotracheitis Virus (ILTV) gD promoter, (ii) a coding sequence for the ILTV gD protein, (iii) an ILTV gI promoter, (iv) a coding sequence for the ILTV gI protein, (v) a human cytomegalovirus immediate early (hCMV IE), a derivative thereof (e.g., from strain AD169), or an mCMV IE promoter, (vi) a coding sequence for the IBDV VP2 protein, and (vii) a transcription terminator sequence. In a specific embodiment of this type, the recombinant nucleic acid comprises the nucleotide sequence of SEQ ID NO: 17.

The present invention further provides an rMDV$_{np}$ in which a recombinant nucleic acid of the present invention has been inserted into a nonessential insertion site of the rMDV$_{np}$. In certain embodiments of this type, the rMDV$_{np}$ includes an insert in a nonessential site that comprises a recombinant nucleic acid comprising in 5' to 3' direction in the following order (i) a murine cytomegalovirus immediate early (mCMV IE) promoter, (ii) a coding sequence for the IBDV VP2 protein, (iii) a transcription terminator sequence (iv) an ILTV gD promoter, (v) a coding sequence for the ILTV gD protein, (vi) an ILTV gI promoter, and (vii) a coding sequence for the ILTV gI protein. In specific embodiments, intervening nucleotide sequences, such as linkers, spacer sequences, and/or extraneous coding sequences, can also be included, see Example 1 below. In a particular embodiment, the rHVT comprises the nucleotide sequence of SEQ ID NO: 15 inserted into a nonessential site. In particular embodiments of these types, the nonessential site is the US2 site. In other such embodiments, the nonessential site is the UL54.5 site. In still other such embodiments, the nonessential site is the UL7/8 site. In yet other such embodiments, the nonessential site is the US10 site. In specific embodiments, the rMDV$_{np}$ is an rHVT. In alternative embodiments, the rMDV$_{np}$ is an rMDV2.

The present invention also provides methods of making an rMDV$_{np}$ of the present invention. In certain embodiments, a heterologous nucleic acid is constructed that comprises a nucleotide sequence that encodes an ILTV gD protein, a nucleotide sequence that encodes an ILTV gI protein, and a nucleotide sequence that encodes an IBDV VP2 protein. The heterologous nucleic acid is then inserted into a nonessential site of an rMDV$_{np}$ of the present invention. In certain embodiments, the heterologous nucleic acid is an expression cassette. In particular embodiments of this type, the expression cassette comprises the nucleotide sequence of SEQ ID NO: 15. In other embodiments, a first heterologous nucleic acid is constructed that comprises a nucleotide sequence that encodes an ILTV gD protein and a nucleotide sequence that encodes an ILTV gI protein; and a second heterologous nucleic acid is constructed that comprises a nucleotide sequence that encodes an IBDV VP2 protein. The first heterologous nucleic acid is inserted into a US2 site of an rMDV$_{np}$ and the second heterologous nucleic acid is inserted into an alternative nonessential site of the rMDV$_{np}$. In certain embodiments, such heterologous nucleic acids are expression cassettes. In particular embodiments of this type, the first heterologous nucleic acid comprises the nucleotide sequence of SEQ ID NO: 9, and the second heterologous nucleic acid comprises the nucleotide sequence of SEQ ID NO: 5. In other embodiments of this type, the first heterologous nucleic acid comprises the nucleotide sequence of SEQ ID NO: 5, and the second heterologous nucleic acid comprises the nucleotide sequence of SEQ ID NO: 9. In specific embodiments, the method of making an rMDV$_{np}$ is a method of making an rHVT. In alternative embodiments, the method of making an rMDV$_{np}$ is a method of making an rMDV2.

The present invention further provides immunogenic compositions and/or vaccines that comprise any rMDV$_{np}$ of the present invention. In specific embodiments, the rMDV$_{np}$ is an rHVT. In alternative embodiments, the rMDV$_{np}$ is an rMDV2. In addition, the present invention provides methods for aiding in the protection of poultry against a disease caused by ILTV and/or IBDV and/or MDV1 by administering such a vaccine and/or immunogenic composition of the present invention. In specific embodiments, such methods aid in the protection of a chicken. In particular embodiments of this type, a vaccine of the present invention is administered subcutaneously. In other embodiments, a vaccine of the present invention is administered in ovo.

Accordingly in one aspect, the present invention provides immunogenic compositions and/or vaccines that comprise an rMDV$_{np}$ of the present invention. In particular embodiments these immunogenic compositions and/or vaccines are stable, safe, and have relatively strong antigen expression and/or efficacy. Alternatively, or in addition, the immunogenic compositions and/or vaccines that comprise an rMDV$_{np}$ of the present invention aid in the protection of a chicken against a disease caused by ILTV and/or IBDV and/or MDV1, following the administration of the immunogenic compositions and/or vaccines to the chicken.

The present invention also provides immunogenic compositions and/or vaccines that comprise any rMDV$_{np}$ of the present invention that is further combined with an additional IBDV, ILTV, and/or MDV antigen to improve and expand the immunogenicity provided. In addition, the present invention also provides immunogenic compositions and/or vaccines that comprise any rMDV$_{np}$ of the present invention that is further combined with an antigen for a pathogen other than MDV, ILTV, or NDV. In a particular embodiment of this type, the antigen is an attenuated or mild live variant IBDV (e.g., IBDV 89/03). In another particular embodiment of this type, the antigen is an attenuated (or mild live) Newcastle Disease Virus (NDV), e.g., NDV C2. The present invention also provides methods for aiding in the protection of poultry against a disease caused by ILTV and/or IBDV and/or MDV1 and/or NDV by administering such a vaccine and/or immunogenic composition to the poultry (e.g., chicken). In particular embodiments of this type, a vaccine of the present invention is administered subcutaneously. In other embodiments, a vaccine of the present invention is administered in ovo.

In certain embodiments the immunogenic compositions and/or vaccines of the present invention comprise an rHVT that comprises as an insertion into its US2 site of a recombinant nucleic acid comprising 5' to 3': (i) an Infectious Laryngotracheitis Virus (ILTV) gD promoter; (ii) a coding sequence for the ILTV gD protein; (iii) an ILTV gI promoter; (iv) a coding sequence for the ILTV gI protein; (v) a murine cytomegalovirus immediate early (mCMV IE) promoter; (vi) a coding sequence for the Infectious bursal disease virus VP2 protein (IBDV V2); and (vii) a transcription terminator sequence. In even more particular embodiments of this type, the recombinant nucleic acid has the nucleotide sequence of SEQ ID NO: 17. In specific embodiments of this type the immunogenic compositions and/or vaccines further comprise an attenuated (or mild live) variant infectious bursal disease virus (IBDV), e.g., IBDV is 89/03.

The present invention further provides immunogenic compositions and/or vaccines that comprise any rMDV$_{np}$ of the present invention combined with an additional IBDV, ILTV, and/or MDV antigen, and a pathogen other than MDV, ILTV, or IBDV.

These and other aspects of the present invention will be better appreciated by reference to the following Figures and the Detailed Description.

DETAILED DESCRIPTION OF THE INVENTION

Figure 1:
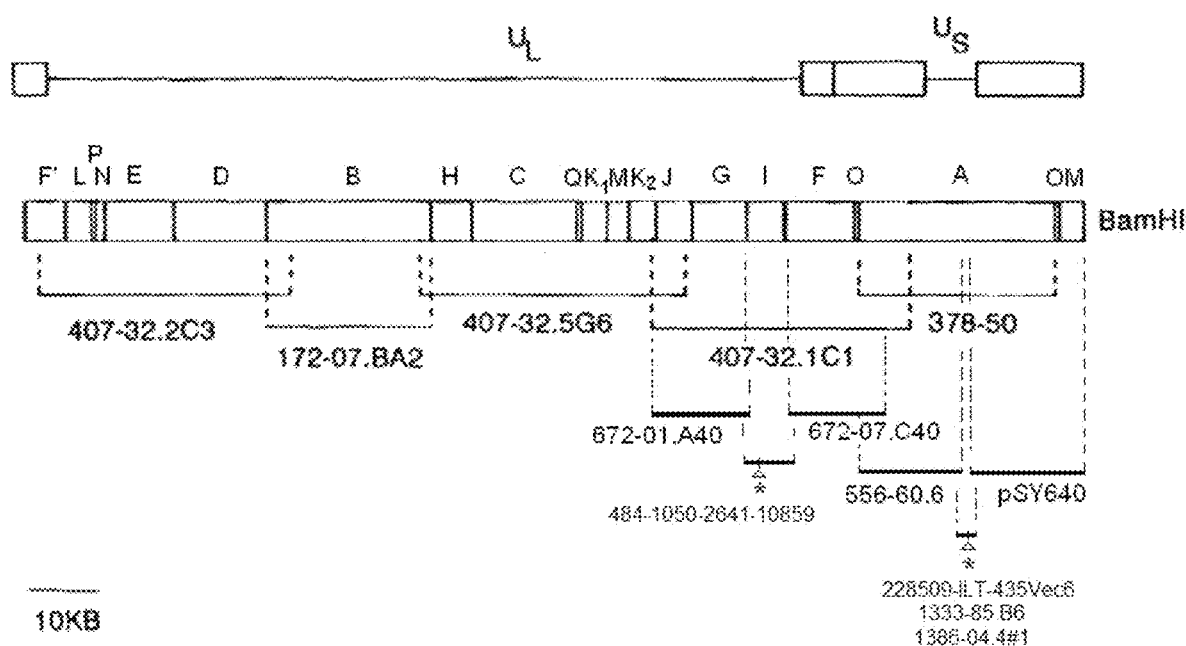
FIG. 1 is a schematic drawing of the HVT (FC126) genome, consisting of a unique long (UL) region, and a unique short (US) region, each denoted by straight lines, and flanked by repeat regions, denoted as boxes. Below the genome schematic, is a bar indicating the location of BamHI restriction enzyme digestion fragments, relative to their genome position, and the lettering nomenclature associated with each fragment. (The largest fragment was given the letter "A", the next largest given the letter "B", and so forth and so on). The positions of each cloned subgenomic fragment (and their designation) used to reconstruct either HVT (FC126) or the rHVT/ILT/IBDV viruses are indicated below the BamHI restriction map. The asterisk (*) indicates the position of the insertion sites: UL54.5 in 484-1050-2641-10859; US2 in 228509-ILT-435Vec6, 1333-85.B6 or 1386-04.4 #1.

The present invention overcomes the prior failure to be able to construct a single rMDV$_{np}$ vector that encodes and expresses antigens from both ILTV and IBDV. In particular embodiments, an rMDV$_{np}$ of the present invention encodes and expresses foreign antigens from only ILTV and IBDV, and are designed to aid in the protection against Mareks disease, Infectious Bursal Disease (Gumboro disease), and Infectious Laryngotraceitis virus. In specific embodiments, the rMDV$_{np}$ is an rHVT. In alternative embodiments, the rMDV$_{np}$ is an rMDV2. In a completely different aspect, the recombinant vector that encodes and expresses the foreign antigens from ILTV and IBDV is not an rMDV$_{np}$, but rather a chimeric Marek's Disease virus that contains specified genomic sequences from MDV1 replacing their counterparts in an HVT vector, e.g., the novel avian herpes virus (NAHV) [see e.g., U.S. Pat. No. 6,913,751].

Prior to the present invention, an HVT vector already had been constructed containing an NDV gene inserted into the US10 region. This HVT-NDV vector was shown to be stable and to express sufficient levels of the corresponding NDV gene product, the NDV F protein, to protect vaccinated chickens against a virulent NDV challenge. In addition, an HVT vector already had been constructed containing a pair of ILTV genes inserted in the HVT UL54.5 region. This HVT-ILTV vector was shown to be stable and to express sufficient levels of the corresponding ILTV gene products, the ILTV gI and gD proteins, to protect vaccinated chickens against a virulent ILTV challenge virus.

Previously, a multivalent HVT construct to protect against both NDV and ILTV was designed based on the successful constructs above, i.e., inserting the NDV-F gene in the US10 site and inserting the ILTV gD and gI genes in UL54.5 site [see, U.S. Pat. No. 8,932,604 B2]. Unexpectedly however, following the passaging of this construct in tissue culture the recombinant virus lost its ability to express the ILTVgD, ILTVgI, and NDV F proteins. This proved to be true with a number of duplicate recombinant HVT constructs. Indeed, these recombinant viruses were unstable and unsuitable for further development as vaccines. These findings demonstrate that the design of a single multivalent rHVT vector that can stably express both the NDV F protein and the ILTVgD and ILTVgI proteins was not a simple process that can be extrapolated from existing information. Indeed, if such stable and efficacious multivalent rHVT vectors were possible at all, their design needed to be premised on an unpredictable set of complex interactions minimally involving the relationship between the insertion sites used and the foreign nucleotide sequences to be inserted. Accordingly, the design of rHVT constructs remains unpredictable from the known art.

The present invention therefore, provides recombinant MDV$_{np}$ vectors in which two genes from ILTV and one gene from IBDV have been inserted. In a particular embodiment of the present invention all three genes were inserted in the US2 region of the HVT genome. In another embodiment of the present invention all three genes were inserted in the UL54.5 site of the HVT genome. Accordingly, such rMDV$_{np}$ vectors should be capable to be used to provide protection against both IBDV and ILTV infections. Previously, two separate rHVT vectors were necessary to protect against these two viruses, namely one for protection against ILTV and the other for protection against IBDV.

The present invention therefore, is advantageous over current methods because it should be able to provide simultaneous protection against ILTV and IBDV by inoculation of poultry and/or poultry eggs with only a single recombinant $MDV_{np}$. In particular, this allows for additional vaccines to be administered via the in ovo route, because there is a limit on how much volume can be injected into an egg, and further saves on manufacturing costs because only one rather than two vectors is needed. Moreover, this can allow an additional antigen to be included in the vaccine such as an attenuated and/or mild live NDV, e.g., strain C2.

Furthermore, the present invention includes embodiments that comprise different $rMDV_{np}$ constructs in the same vaccine and/or immunogenic compositions. In certain embodiments of this type, the vaccine and/or immunogenic composition comprise both an rMDV2 and an rHVT, each of which encode one or more foreign antigens. Indeed, unlike the combination of two rHVTs, which inevitably lead to one construct significantly overgrowing the other, combining an rHVT with an rMDV2 leads to no such significant overgrowth. Therefore, in specific embodiments, a vaccine of the present invention comprises an rHVT that encodes an ILTVgD protein, an ILTVgI protein, and an IBDV VP2 protein with an rMDV2 that encodes yet another poultry viral antigen, e.g., the NDV F protein.

In order to more fully appreciate the instant invention, the following definitions are provided.

The use of singular terms for convenience in description is in no way intended to be so limiting. Thus, for example, reference to a composition comprising "a polypeptide" includes reference to one or more of such polypeptides.

As used herein a "nonpathogenic Marek's Disease Virus" or "$MDV_{np}$" or "npMDV" is a virus in the MDV family that shows little to no pathogenicity in poultry. The term "$MDV_{np}$" includes naturally occurring MDVs that have been passaged or otherwise similarly manipulated, but does not include viral constructs in which a specific region of the genome of one MDV serotype is replaced by the corresponding region of a different MDV serotype to form a chimeric virus, such as the novel avian herpesvirus (NAHV). In certain embodiments, the $MDV_{np}$ is an HVT. In other embodiments, the $MDV_{np}$ is an MDV2. In particular embodiments of this type, the MDV2 is SB1.

As used herein, an $MDV_{np}$ that has been genetically modified to encode a heterologous nucleotide sequence (e.g., a foreign gene) is defined as a "recombinant $MDV_{np}$" or "$rMDV_{np}$". The term "$rMDV_{np}$" includes naturally occurring $MDV_{np}$'s that have been genetically modified to encode a heterologous nucleotide sequence, but does not include viral constructs in which a specific region of the genome of one MDV serotype is replaced by the corresponding region of a different MDV serotype to form a chimeric virus, such as the novel avian herpesvirus (NAHV).

As used herein a "novel avian herpesvirus" ("NAHV") is a recombinant chimeric virus comprising a unique long viral genomic region which naturally occurs in herpesvirus of turkeys virus (HVT) and a unique short viral genomic region which naturally occurs in Marek's disease 1 (MDV1) [see, U.S. Pat. Nos. 5,965,138, 6,183,753, 6,913,751 B2]. In a preferred embodiment the NAHV comprises a unique long viral genomic region which naturally occurs in herpesvirus of turkeys virus (HVT), a unique short viral genomic region which naturally occurs in Marek's disease 1 (MDV1), and the repeat viral regions of the HVT [see, U.S. Pat. No. 6,913,751 B2].

As used herein, a "nonessential site" is a site in the $MDV_{np}$ genome (or alternatively in the NAVH genome) in which an insertion of a heterologous nucleotide sequence into that site does not prevent the $MDV_{np}$ (or NAVH) from replicating in a host cell. Nonessential sites are generally identified by the gene in which they reside, e.g., the US2 site, or a region between two genes, e.g., the UL7/8 site. The use of the term "nonessential site" is in no way intended to even suggest that there is only a single unique nucleotide position in the nucleotide sequence of a given gene (or in the region between two genes) where an insertion of a heterologous nucleic acid must be made in order for the $MDV_{np}$ (or NAVH) to maintain its ability to replicate in a host cell.

As used herein, when an $rMDV_{np}$ (or NAHV) is said to comprise a given nucleic acid "inserted" in a nonessential site in the $rMDV_{np}$ genome (or NAHV genome), it means that the given nucleic acid is a heterologous nucleic acid that is located in that nonessential site of the $MDV_{np}$ (or NAHV). Accordingly, an $rMDV_{np}$ comprising a first nucleic acid inserted in a first nonessential site in the $rMDV_{np}$ genome and a second nucleic acid inserted in a second nonessential site in the $rMDV_{np}$ genome is equivalent to an $rMDV_{np}$ comprising a first heterologous nucleic acid located in a first nonessential site in the $rMDV_{np}$ genome and a second heterologous nucleic acid located in a second nonessential site in the $rMDV_{np}$ genome, and vice versa.

As used herein the term "poultry" can include chickens, turkeys, ducks, geese, quail, and pheasants.

As used herein, a "vaccine" is a composition that is suitable for application to an animal (including, in certain embodiments, humans, while in other embodiments being specifically not for humans) comprising one or more antigens typically combined with a pharmaceutically acceptable carrier such as a liquid containing water, which upon administration to the animal induces an immune response strong enough to minimally aid in the protection from a clinical disease arising from an infection with a wild-type microorganism, i.e., strong enough for aiding in the prevention of the clinical disease, and/or preventing, ameliorating or curing the clinical disease. As established by the USDA and codified in the Title 9 Code of Federal Regulations, part 113 (9CFR 113) «Standard requirements for Animal Products» live virus vaccines must provide at least 90% protection, in the case of NDV, IBDV and ILTV, and at least 80% in the case of MDV, from clinical signs or lesions associated with the disease to obtain a license.

As used herein, a "multivalent vaccine" is a vaccine that comprises two or more different antigens. In a particular embodiment of this type, the multivalent vaccine stimulates the immune system of the recipient against two or more different pathogens.

As used herein, the term "aids in the protection" does not require complete protection from any indication of infection. For example, "aids in the protection" can mean that the protection is sufficient such that, after challenge, symptoms of the underlying infection are at least reduced, and/or that one or more of the underlying cellular, physiological, or biochemical causes or mechanisms causing the symptoms are reduced and/or eliminated. It is understood that "reduced," as used in this context, means relative to the state of the infection, including the molecular state of the infection, not just the physiological state of the infection.

As used herein, an "adjuvant" is a substance that is able to favor or amplify the cascade of immunological events, ultimately leading to a better immunological response, i.e., the integrated bodily response to an antigen. An adjuvant is in general not required for the immunological response to occur, but favors or amplifies this response.

As used herein, the term "pharmaceutically acceptable" is used adjectivally to mean that the modified noun is appropriate for use in a pharmaceutical product. When it is used, for example, to describe an excipient in a pharmaceutical vaccine, it characterizes the excipient as being compatible with the other ingredients of the composition and not disadvantageously deleterious to the intended recipient.

As used herein, "systemic administration" is administration into the circulatory system of the body (comprising the cardiovascular and lymphatic system), thus affecting the body as a whole rather than a specific locus such as the gastro-intestinal tract (via e.g., oral or rectal administration) and the respiratory system (via e.g., intranasal administration). Systemic administration can be performed e.g., by administering into muscle tissue (intramuscular), into the dermis (intradermal or transdermal), underneath the skin (subcutaneous), underneath the mucosa (submucosal), in the veins (intravenous) etc.

As used herein the term "parenteral administration" includes subcutaneous injections, submucosal injections, intravenous injections, intramuscular injections, intradermal injections, and infusion.

The term "approximately" is used interchangeably with the term "about" and signifies that a value is within twenty-five percent of the indicated value i.e., a peptide containing "approximately" 100 amino acid residues can contain between 75 and 125 amino acid residues.

As used herein, the term, "polypeptide" is used interchangeably with the terms "protein" and "peptide" and denotes a polymer comprising two or more amino acids connected by peptide bonds. The term "polypeptide" as used herein includes a significant fragment or segment, and encompasses a stretch of amino acid residues of at least about 8 amino acids, generally at least about 12 amino acids, typically at least about 16 amino acids, preferably at least about 20 amino acids, and, in particularly preferred embodiments, at least about 30 or more amino acids, e.g., 35, 40, 45, 50, etc. Such fragments may have ends which begin and/or end at virtually all positions, e.g., beginning at residues 1, 2, 3, etc., and ending at, e.g., 155, 154, 153, etc., in all practical combinations.

Optionally, a polypeptide may lack certain amino acid residues that are encoded by a gene or by an mRNA. For example, a gene or mRNA molecule may encode a sequence of amino acid residues on the N-terminus of a polypeptide (i.e., a signal sequence) that is cleaved from, and therefore, may not be part of the final protein.

As used herein the term "antigenic fragment" in regard to a particular protein (e.g., a protein antigen) is a fragment of that protein (including large fragments that are missing as little as a single amino acid from the full-length protein) that is antigenic, i.e., capable of specifically interacting with an antigen recognition molecule of the immune system, such as an immunoglobulin (antibody) or T cell antigen receptor. For example, an antigenic fragment of an IBDV VP2 protein is a fragment of the VP2 protein that is antigenic. Preferably, an antigenic fragment of the present invention is immunodominant for antibody and/or T cell receptor recognition.

As used herein an amino acid sequence is 100% "homologous" to a second amino acid sequence if the two amino acid sequences are identical, or differ only by neutral or conservative substitutions as defined below. Accordingly, an amino acid sequence is about 80% "homologous" to a second amino acid sequence if about 80% of the two amino acid sequences are identical, and/or differ only by neutral or conservative substitutions.

Functionally equivalent amino acid residues often can be substituted for residues within the sequence resulting in a conservative amino acid substitution. Such alterations define the term "a conservative substitution" as used herein. For example, one or more amino acid residues within the sequence can be substituted by another amino acid of a similar polarity, which acts as a functional equivalent, resulting in a silent alteration. Substitutions for an amino acid within the sequence may be selected from other members of the class to which the amino acid belongs. For example, the nonpolar (hydrophobic) amino acids include alanine, leucine, isoleucine, valine, proline, phenylalanine, tryptophan and methionine. Amino acids containing aromatic ring structures are phenylalanine, tryptophan, and tyrosine. The polar neutral amino acids include glycine, serine, threonine, cysteine, tyrosine, asparagine, and glutamine. The positively charged (basic) amino acids include arginine, lysine and histidine. The negatively charged (acidic) amino acids include aspartic acid and glutamic acid. Such alterations will not be expected to affect apparent molecular weight as determined by polyacrylamide gel electrophoresis, or isoelectric point.

Particularly preferred conservative substitutions are: Lys for Arg and vice versa such that a positive charge may be maintained; Glu for Asp and vice versa such that a negative charge may be maintained; Ser for Thr such that a free —OH can be maintained; and Gln for Asn such that a free $NH_2$ can be maintained. The amino acids also can be placed in the following similarity groups: (1) proline, alanine, glycine, serine, and threonine; (2) glutamine, asparagine, glutamic acid, and aspartic acid; (3) histidine, lysine, and arginine; (4) cysteine; (5) valine, leucine, isoleucine, methionine; and (6) phenylalanine, tyrosine, and tryptophan.

In a related embodiment, two highly homologous DNA sequences can be identified by their own homology, or the homology of the amino acids they encode. Such comparison of the sequences can be performed using standard software available in sequence data banks. In a particular embodiment two highly homologous DNA sequences encode amino acid sequences having about 80% identity, more preferably about 90% identity and even more preferably about 95% identity. More particularly, two highly homologous amino acid sequences have about 80% identity, even more preferably about 90% identity and even more preferably about 95% identity.

As used herein, protein and DNA sequence percent identity can be determined using software such as MacVector v9, commercially available from Accelrys (Burlington, Massachusetts) and the Clustal W algorithm with the alignment default parameters, and default parameters for identity. See, e.g., Thompson, et al,. 1994. *Nucleic Acids Res.* 22:4673-4680. ClustalW is freely downloadable for Dos, Macintosh and Unix platforms from, e.g., EMBLI, the European Bioinformatics Institute. The present download link is found at http://www.ebi.ac.uk/clustalw/. These and other available programs can also be used to determine sequence similarity using the same or analogous default parameters.

As used herein the terms "polynucleotide", or a "nucleic acid" or a "nucleic acid molecule" are used interchangeably and denote a molecule comprising nucleotides including, but is not limited to, RNA, cDNA, genomic DNA and even synthetic DNA sequences. The terms are also contemplated to encompass nucleic acid molecules that include any of the art-known base analogs of DNA and RNA.

A nucleic acid "coding sequence" or a "sequence encoding" a particular protein or peptide, is a nucleotide sequence which is transcribed and translated into a polypeptide in vitro or in vivo when placed under the control of appropriate regulatory elements.

The boundaries of the coding sequence are determined by a start codon at the 5'-terminus and a translation stop codon at the 3'-terminus. A coding sequence can include, but is not limited to, prokaryotic sequences, cDNA from eukaryotic mRNA, genomic DNA sequences from eukaryotic (e.g., avian) DNA, and even synthetic DNA sequences. A transcription termination sequence can be located 3' to the coding sequence.

"Operably linked" refers to an arrangement of elements wherein the components so described are configured so as to perform their usual function. Thus, control elements operably linked to a coding sequence are capable of effecting the expression of the coding sequence. The control elements need not be contiguous with the coding sequence, so long as they function to direct the expression thereof. Thus, for example, intervening untranslated yet transcribed sequences can be present between a promoter and the coding sequence and the promoter can still be considered "operably linked" to the coding sequence.

As used herein, the term "transcription terminator sequence" is used interchangeably with the term "polyadenylation regulatory element" and is a sequence that is generally downstream from a DNA coding region and that may be required for the complete termination of the transcription of that DNA coding sequence. A transcription terminator is a regulatory DNA element involved in the termination of the transcription of a coding region into RNA. Generally, such an element encodes a section, e.g. a hairpin structure, which has a secondary structure that can cause the RNA polymerase complex to stop transcription. A transcription terminator is therefore always situated downstream of the stop codon from the region to be translated, the 3' untranslated region.

As used herein an "expression cassette" is a recombinant nucleic acid that minimally comprises a promoter and a heterologous coding sequence operably linked to that promoter. In many such embodiments, the expression cassette further comprises a transcription terminator sequence. Accordingly, the insertion of an expression cassette into a nonessential site of the $rMDV_{np}$ genome can lead to the expression of the heterologous coding sequence by the $rMDV_{np}$. In specific embodiments, the $rMDV_{np}$ is an rHVT. In alternative embodiments, the $rMDV_{np}$ is an rMDV2.

A "heterologous nucleotide sequence" as used herein is a nucleotide sequence that is added to a nucleotide sequence of the present invention by recombinant methods to form a nucleic acid that is not naturally formed in nature. In specific embodiments, a "heterologous nucleotide sequence" of the present invention can encode a protein antigen such as the IBDV VP2 protein, the ILTV gI protein, and/or the ILTV gD protein. Heterologous nucleotide sequences can also encode fusion (e.g., chimeric) proteins. In addition, a heterologous nucleotide sequence can encode peptides and/or proteins that contain regulatory and/or structural properties. In other such embodiments, a heterologous nucleotide sequence can encode a protein or peptide that functions as a means of detecting the protein or peptide encoded by the nucleotide sequence of the present invention after the recombinant nucleic acid is expressed. In still another embodiment, the heterologous nucleotide sequence can function as a means of detecting a nucleotide sequence of the present invention. A heterologous nucleotide sequence can comprise non-coding sequences including restriction sites, regulatory sites, promoters and the like. A "heterologous nucleic acid" comprises a heterologous nucleotide sequence.

Insertion of a nucleic acid encoding an antigen of the present invention into an $rMDV_{np}$ vector is easily accomplished when the termini of both the nucleic acid and the vector comprise compatible restriction sites. If this cannot be done, it may be necessary to modify the termini of the nucleotide sequence and/or vector by digesting back single-stranded nucleic acid overhangs (e.g., DNA overhangs) generated by restriction endonuclease cleavage to produce blunt ends, or to achieve the same result by filling in the single-stranded termini with an appropriate polymerase. Alternatively, desired sites may be produced, e.g., by ligating nucleotide sequences (linkers) onto the termini. Such linkers may comprise specific oligonucleotide sequences that define desired restriction sites. Restriction sites can also be generated through the use of the polymerase chain reaction (PCR). [See, e.g., Saiki et al., *Science* 239:487-491 (1988)]. The cleaved vector and the DNA fragments may also be modified, if required, by homopolymeric tailing.

Protein Antigens and Nucleic Acids Encoding the Protein Antigens

The ILTV gD gene appears to encode a glycoprotein of 434 amino acids in length having a molecular weight of 48,477 daltons, although others have suggested that a downstream start codon, which leads to an ILTV gD protein comprising only 377 amino acid residues, is the actual start codon [Wild et al., *Virus Genes* 12:104-116 (1996)]. The ILTV gI gene encodes a glycoprotein of 362 amino acids in length having a molecular weight of 39,753 daltons [U.S. Pat. No. 6,875,856, hereby incorporated by reference]. Nucleic acids encoding natural and/or laboratory derived variants of the ILTV gD and ILTV gI may be substituted for those presently exemplified.

In particular embodiments of the present invention, an $rMDV_{np}$ comprises a recombinant nucleic acid (e.g., an expression cassette) that encodes an ILTV gD protein comprising the amino acid sequence of SEQ ID NO: 2 or an antigenic fragment thereof. In related embodiments the $rMDV_{np}$ comprises a recombinant nucleic acid that encodes an ILTV gD protein comprising an amino acid sequence that has greater than 90%, and/or greater than 95%, and/or greater than 98%, and/or greater than 99% identity to the amino acid sequence of SEQ ID NO: 2. In particular embodiments, the ILTV gD protein is encoded by the nucleotide sequence of SEQ ID NO: 1. In specific embodiments, the $rMDV_{np}$ is an rHVT. In alternative embodiments, the $rMDV_{np}$ is an rMDV2.

In certain embodiments of the present invention, an $rMDV_{np}$ comprises a recombinant nucleic acid (e.g., an expression cassette) that encodes an ILTV gI protein comprising the amino acid sequence of SEQ ID NO: 4 or an antigenic fragment thereof. In related embodiments, the $rMDV_{np}$ comprises a recombinant nucleic acid that encodes an ILTV gI protein comprising an amino acid sequence that has greater than 90%, and/or greater than 95%, and/or greater than 98%, and/or greater than 99% identity to the amino acid sequence of SEQ ID NO: 4. In particular embodiments, the ILTV gI protein is encoded by the nucleotide sequence of SEQ ID NO: 3. In specific embodiments, the $rMDV_{np}$ is an rHVT. In alternative embodiments, the $rMDV_{np}$ is an rMDV2.

As mentioned earlier, IBDV is a member of the Birnaviridae family, which has a genome consisting of two segments (A and B) of double-stranded RNA. The larger segment A encodes a polyprotein of 110 kDa, which is subsequently cleaved by autoproteolysis to form mature viral proteins VP2, VP3 and VP4. Of these, VP2 and VP3 are the structural capsid proteins for the virion, with VP2 protein being the major host-protective immunogen. In the case of IBDV, two serotypes exist, serotype 1 and 2 which can be distinguished by virus neutralization (VN) tests. Serotype 1 viruses have been shown to be pathogenic to chickens, while serotype 2 IBDV only causes sub-acute disease in turkeys. Historically, IBDV serotype 1 viruses consisted of only one type that is known as "classic" IBD virus, but subsequently, so-called "variant" IBDV strains have emerged. In particular embodiments of the present invention the IBDV VP2 gene encodes a VP2 protein from an IBDV that is of the classic type. Such genes are well known and their sequence information is readily available,[ see e.g., GenBank acc.nr: D00869 (F52/70), D00499 (STC), or AF499929 (D78)]. Alternatively, this gene can be obtained from the genome of a classic IBDV isolated from nature, using routine techniques for manipulating a Birnavirus. Classic type IBDV's can be readily identified using serology, or molecular biology.

In particular embodiments of the present invention, an $rMDV_{np}$ comprises a recombinant nucleic acid (e.g., an expression cassette) that encodes an IBDV VP2 protein comprising the amino acid sequence of SEQ ID NO: 6 or an antigenic fragment thereof. In related embodiments, the $rMDV_{np}$ comprises a recombinant nucleic acid that encodes an IBDV VP2 protein comprising an amino acid sequence that has greater than 90%, and/or greater than 95%, and/or greater than 98%, and/or greater than 99% identity to the amino acid sequence of SEQ ID NO: 6. In specific embodiments, the IBDV VP2 protein is encoded by the nucleotide sequence of SEQ ID NO: 5. In specific embodiments, the $rMDV_{np}$ is an rHVT. In alternative embodiments, the $rMDV_{np}$ is an rMDV2.

Routine vaccinations against IBDV are performed as early as possible in the life of poultry using attenuated IBDV strains, but these can only be applied when the level of MDA against IBDV has decreased enough, which commonly is somewhere between 15 and 20 days post hatch. Many 'live' or inactivated IBDV vaccines are commercially available, e.g., a 'live' vaccine such as Nobilis™ Gumboro D78 (Merck Animal Health).

NDV has a non-segmented, negative sense, single stranded RNA genome, which is about 15 kb in size, and contains six genes, amongst which is the NDV F protein gene which encodes the so-called "fusion" glycoprotein (F protein). The F protein is involved in NDV's attachment of and entry into host cells, and as the immunodominant protein it can be the basis of an effective immune response against NDV. The NDV F protein is expressed as a native F0 protein, which is activated upon cleavage by extra-cellular peptidases.

An NDV F protein gene, for example, can be derived from NDV Clone 30, a common lentogenic NDV vaccine strain. Nucleic acids encoding natural and/or laboratory derived variants of the F protein gene would equally be applicable, either from lentogenic, mesogenic or velogenic NDV, as the F protein gene sequence itself is highly conserved in these different NDV pathotypes.

Promoters and Polyadenylation Regulatory Elements

A promoter is a functional region on the genome of an organism that directs the transcription of a downstream coding region. A promoter is therefore situated upstream of the coding region of a gene. The mRNA synthesis directed by the promoter starts from the 'transcription start site' (TSS). The mRNA produced is in turn translated into protein starting from the gene's start codon, which is the first ATG sequence in the open reading frame (the first AUG in the mRNA). Typically the TSS is located at 30-40 nucleotides upstream of the start codon. A TSS can be determined by sequencing the 5' end of the mRNA of a gene, e.g. by the RACE technique. In general promoters are comprised within about 1000 nucleotides upstream of the position of the A of the start codon, which is generally denoted as A+1, and most promoters are situated between nucleotides −500 and A+1.

The nomenclature for a promoter is commonly based on the name of gene that it controls the expression of For example, the murine cytomegalovirus immediate early 1 gene (mCMV-IE1) promoter "mCMV-IE1 gene promoter", refers to the promoter that naturally drives the expression of the early 1 gene (IE1 gene) for mCMV and accordingly, is situated immediately upstream of that gene. Because the IE1-gene is such a well-documented and clearly recognizable gene, and because the genomes of several mCMVs have been sequenced (in whole or in part), such a promoter readily can be identified by routine techniques. For example, in a basic protocol a promoter can be obtained by roughly sub-cloning the region in between two consecutive genes, e.g. from the poly A signal of an upstream gene to the TSS of a downstream gene. The promoter then can be identified by standard tests, e.g., by the expression of a marker gene by progressively smaller sections of a suspected promoter.

Generally, promoters contain a number of recognizable regulatory regions, such as an enhancer region, which is involved in binding regulatory factors that influence the time, the duration, the conditions, and the level of transcription. Whereas the enhancer region is normally situated upstream, a promoter also contains a region more downstream that is involved in the binding of transcription factors and directing RNA polymerase itself This downstream region generally contains a number of conserved promoter sequence elements such as the TATA box, the CAAT box, and the GC box.

A promoter comprising both the enhancer—and the downstream region is termed a "complete" promoter, whereas a promoter comprising only the downstream region, is termed a "core" promoter.

A promoter for the expression of a (heterologous) gene in a (virus) vector needs to be able to effectively drive the transcription of that downstream coding sequence. This is generally referred to as the promoter being "operatively linked" to the coding sequence, such that the gene is 'under the control' of the promoter, or is 'driven by' the promoter. This generally means that in an expression cassette the promoter and the coding sequence of the gene are found on the same nucleic acid, in effective proximity, and with no signals or sequences between them that would intervene with effective transcription of the coding sequence.

The mCMV-IE1 gene promoter is well known in the art, and can be readily obtained from a variety of commercial sources, such as from suppliers of commercial plasmids for cloning and expression. The IE1 gene is also called the 'major IE gene'. The mCMV-IE1 protein has also been referred to as pp89. Dörsch-Häsler et al. [*Proc. Nat. Acad. Sci.*, 82:8325-8329 (1985)] described the mCMV IE1 gene promoter in 1985, and the use of this promoter in heterologous expression is also described in WO 87/03.905 and EP 728,842. The nucleotide sequence of the complete mCMV IE locus is available from GenBank under acc. nr. L06816.1

(from March 2004). The mCMV itself is available from the ATCC: initially under acc. nr. VR-194, and more recently this has been continued under acc. nr. VR-1399.

In one embodiment of the invention, the mCMV-IE1 gene promoter is a complete promoter, comprising both the core promoter region, as well as the enhancer region for the mCMV-IE1 gene. The complete mCMV-IE1 gene promoter is about 1.4 kb in size. However, the present invention also allows for some variance in length of not only the mCMV IE1-gene promoter, but also of the other elements that make up the recombinant DNA expression cassette employed in the present invention. This can result from differences in the exact conditions that are used for cloning and construction. For example, this variance may arise from using different restriction enzyme sites, PCR cloning primers, or different conditions for adapting the ends of the cloning molecules used. Consequently, some variation in length—smaller or larger—of the constituting elements may occur, without affecting the stability, and relatively strong antigen expression and/or efficacy of the overall expression cassette. In that case these length differences are immaterial, and are within the scope of the invention. Therefore, an mCMV-IE1 gene promoter of "about 1.4 kb" is: 1.4 kb±about 25%. In particular embodiments the promoter is 1.4 kb±about 20%. In still other embodiments the variance can be 1.4 kb±about 15%, 1.4 kb±about 12%, 1.4 kb±about 10%, 1.4 kb±about 8%, 1.4 kb±about 6%, 1.4 kb±about 5%, 1.4 kb±about 4%, 1.4 kb±about 3%, 1.4 kb±about 2%, or even 1.4 kb±about 1%.

Similarly, homologs or variants of the promoter element may be used that are equally effective and stable. Therefore, in certain embodiments the mCMV-IE1 gene promoter of the present invention can be a DNA molecule of about 1.4 kb that comprises a nucleotide sequence with at least 95%, 96%, 97%, 98%, or even 99% nucleotide sequence identity to the nucleotide sequence of SEQ ID NO: 10. In a particular embodiment the mCMV-IE1 gene promoter consists of nucleotide sequence of SEQ ID NO: 10.

Many alternative promoters can be used to drive the expression of a heterologous gene encoding a protein antigen or antigenic fragment thereof in an rMDV$_{np}$ of the present invention. Examples include the pseudorabies virus (PRV) gpX promoter [see, WO 87/04463], the Rous sarcoma virus LTR promoter, the SV40 early gene promoter, the chicken beta-actin gene promoter comprising the nucleotide sequence of SEQ ID NO: 11, the Towne Strain hCMV IE promoter, a derivative of the hCMV IE promoter (from strain AD169) comprising the nucleotide sequence of SEQ ID NO: 12, an ILTV gD promoter comprising the nucleotide sequence of SEQ ID NO: 7, and an ILTV gI promoter comprising the nucleotide sequence of SEQ ID NO: 8, [see e.g., U.S. Pat. No. 6,183,753 B1], the human cytomegalovirus immediate early 1 (hCMV IE1) gene promoter [U.S. Pat. Nos. 5,830,745; 5,980,906], and the chicken beta-actin gene promoter [EP 1 298 139 B1]. A particular heterologous promoter for the IBDV VP2 gene is the murine (mCMV IE1) cytomegalovirus promoter. In a particular embodiment of this type the mCMV IE1 comprises the nucleotide sequence of SEQ ID NO: 10 [see e.g., EP 728,842; PCT/EP2015/081121].

The inclusion of a polyadenylation regulatory element downstream from a DNA coding region is oftentimes required to terminate the transcription of the coding DNA sequence. Accordingly, many genes comprise a polyadenylation regulatory element at the downstream end of their coding sequence. Many such regulatory elements have been identified and can be used in an rMDV$_{np}$ of the present invention. Specific examples of polyadenylation regulatory elements as exemplified herein, include a FHV US-9 polyadenylation signal comprising the nucleotide sequence of SEQ ID NO: 13, and the HSV thymidine kinase polyadenylation signal comprising the nucleotide sequence of SEQ ID NO: 14.

Vaccines and Immunogenic Compositions

The present invention relates to the use of the recombinant MDV$_{np}$, the nucleic acid molecules used to construct the MDV$_{np}$, or the host cells to grow them, or any combination thereof, all according to the present invention for the manufacture of a vaccine for poultry. Accordingly, the present invention provides vaccines and/or immunogenic compositions that include a multivalent recombinant MDV$_{np}$ of the present invention. Such vaccines can be used to aid in the prevention and/or prevent Infectious Bursal Disease (Gumboro disease), and/or Marek's disease, and/or maladies associated with ILTV infections. A vaccine according to the present invention can be used for prophylactic and/or for therapeutic treatment, and thus can interfere with the establishment and/or with the progression of an infection and/or its clinical symptoms of disease.

A recombinant MDV$_{np}$ of the present invention can be grown by any number of means currently practiced in the field. For example, a recombinant MDV$_{np}$ of the present invention can be grown through the use of in vitro cultures of primary chicken cells, see e.g., the Examples below where chicken embryo fibroblast cells (CEFs) were used. The CEFs can be prepared by trypsinization of chicken embryos. The CEFs also can be plated in monolayers and then infected with the MDV$_{np}$. This particular process can be readily scaled up to industrial-sized production.

Therefore, a further aspect of the invention relates to a method for the preparation of the vaccine according to the invention comprising the steps of infecting host cells with a recombinant MDV$_{np}$ of the present invention, harvesting the infected host cells, and then admixing the harvested infected host cells with a pharmaceutically acceptable carrier. Suitable methods for infection, culture and harvesting are well known in the art and are described and exemplified herein.

Typically, the infected host cells are harvested while still intact to obtain the recombinant MDV$_{np}$ in its cell-associated form. These cells can be taken up in an appropriate carrier composition to provide stabilization for storage and freezing. The infected cells can be filled into glass ampoules, which are sealed, frozen and stored in liquid nitrogen. Accordingly, in certain embodiments of the present invention, the vaccines and/or immunogenic compositions of the present invention are stored frozen and accordingly, comprise a cryopreservative, such as dimethyl sulfoxide (DMSO), to preserve the frozen infected cells.

Alternatively, when the recombinant MDV$_{np}$ is a recombinant HVT, it can be isolated from its host cell, for instance through sonication at the end of culturing, and then taken up into a stabilizer, and freeze-dried (lyophilized) for stable storage or otherwise reduced in liquid volume, for storage, and then reconstituted in a liquid diluent before or at the time of administration. Such reconstitution may be achieved using, for example, vaccine-grade water. In certain embodiments, a lyophilized portion of a multivalent vaccine can comprise one or more antigens and the diluent can comprise one or more other antigens.

In particular embodiments a vaccine of the present invention (or a portion thereof) can be in a freeze-dried form, e.g., as tablets and/or spheres that are produced by a method described in WO 2010/125084, hereby incorporated by reference in its entirety. In particular, reference is made to the examples, from page 15, line 28 to page 27, line 9 of WO 2010/125084, describing a method to produce such fast disintegrating tablets/spheres. Such freeze-dried forms can be readily dissolved in a diluent, to enable systemic administration of the vaccine.

Vaccines and immunogenic compositions can, but do not necessarily include, physiologically compatible buffers and saline and the like, as well as pharmaceutically acceptable adjuvants. Adjuvants can be useful for improving the immune response and/or increasing the stability of vaccine preparations. Adjuvants are typically described as non-specific stimulators of the immune system, but also can be useful for targeting specific arms of the immune system. One or more compounds which have this activity may be added to the vaccine. Therefore, particular vaccines of the present invention can further comprise an adjuvant. Examples of chemical compounds that can be used as adjuvants include, but are not limited to aluminum compounds (e.g., aluminum hydroxide), metabolizable and non-metabolizable oils, mineral oils including mannide oleate derivatives in mineral oil solution (e.g., MONTANIDE ISA 70 from Seppic SA, France), and light mineral oils such as DRAKEOL 6VR, block polymers, ISCOM's (immune stimulating complexes), vitamins and minerals (including but not limited to: vitamin E, vitamin A, selenium, and vitamin B12) and CARBOPOL®.

Other suitable adjuvants, which sometimes have been referred to as immune stimulants, include, but are not limited to: cytokines, growth factors, chemokines, supernatants from cell cultures of lymphocytes, monocytes, cells from lymphoid organs, cell preparations and/or extracts from plants, bacteria or parasites (*Staphylococcus aureus* or lipopolysaccharide preparations) or mitogens. Generally, an adjuvant is administered at the same time as an antigen of the present invention. However, adjuvants can also or alternatively be administered within a two-week period prior to the vaccination, and/or for a period of time after vaccination, i.e., so long as the antigen, e.g., a recombinant $MDV_{np}$ of the present invention persists in the tissues.

The vaccines and/or immunogenic compositions of the present invention may be administered by any route such as in ovo, by parenteral administration, including intramuscular injection, subcutaneous injection, intravenous injection, intradermal injection, by scarification, by oral administration, or by any combination thereof.

Furthermore, the multivalent recombinant $MDV_{np}$ of the present invention can be used and/or combined with additional IBDV, ILTV, and/or MDV antigens to improve and expand the immunogenicity provided, and/or antigens for other pathogens (e.g., NDV) in order to provide immune protection against such other pathogens. These additional antigens can be either live or killed whole microorganisms, other recombinant vectors, cell homogenates, extracts, proteins, or any other such derivative, provided that they do not negatively interfere with the safety, and stability with relatively strong antigen expression and/or efficacy of the vaccine according to the present invention.

The combination of a multivalent recombinant $MDV_{np}$ of the present invention with an additional MDV, IBDV, and/or ILTV antigen can be advantageous in those cases in which very virulent field strains of MDV, IBDV, or ILTV are prevalent, e.g., in a particular geographic region. In this regard, the combination of a multivalent recombinant $MDV_{np}$ of the present invention with an MDV1, MDV2, or HVT includes the Rispens (MDV1) strain, the SB1 (MDV2) strain, the FC-126 (HVT) strain and/or PB1 (HVT) strain. To improve the response against IBDV, multivalent recombinant $MDV_{np}$ may be combined with an IBDV vaccine strain, such as a mild live IBDV vaccine strain, e.g., D78 (cloned intermediate strain), PBG98, Cu-1, ST-12 (an intermediate strain), or 89/03 (a live Delaware variant strain) in a multivalent vaccine.

Examples of other microorganisms that can be used as antigens together with the multivalent recombinant $MDV_{np}$ of the present invention include: (i) viruses such as infectious bronchitis virus, adenovirus, egg drop syndrome virus, infectious bursal disease virus, chicken anaemia virus, avian encephalo-myelitis virus, fowl pox virus, turkey rhinotracheitis virus, duck plague virus (duck viral enteritis), pigeon pox virus, avian leucosis virus, avian pneumovirus, and reovirus, (ii) bacteria, such as *Escherichia coli, Salmonella* spec., *Ornitobacterium rhinotracheale, Haemophilis paragallinarum, Pasteurella multocida, Erysipelothrix rhusiopathiae, Erysipelas* spec., *Mycoplasma* spec., and *Clostridium* spec., (iii) parasites such as *Eimeria* spec., and (iv) fungi, such as *Aspergillus* spec. In particular embodiments of the present invention, a recombinant $MDV_{np}$ of the present invention can be combined with a mild live NDV vaccine strain such as vaccine strain C2. Many of such strains are used in commercial vaccines.

The combination vaccine can be made in a variety of ways including by combining the recombinant $MDV_{np}$ of the present invention with preparations of virus, or bacteria, or fungi, or parasites, or host cells, or a mixture of any and/or all of these. In particular embodiments, the components for such a combination vaccine are conveniently produced separately and then combined and filled into the same vaccine container.

As described above, a vaccine according to the invention can be used advantageously to provide safe and effective immune protection in poultry to a multiple diseases, by a single inoculation at very young age or in ovo. Alternatively, as would be apparent to anyone skilled in the art of poultry vaccines the combinations described above also could include vaccination schedules in which the multivalent recombinant $MDV_{np}$ of the present invention and the additional antigen are not applied simultaneously; e.g., the recombinant $MDV_{np}$ may be applied in ovo, and the NDV C2 and/or the IBDV strain (e.g., 89/03) could be applied at a subsequent time/date.

Accordingly, the vaccines of the present invention can be administered to the avian subject in a single dose or in multiple doses. For example, a vaccine of the present invention may be applied at the day of hatch and/or in ovo at day 16-18 (Embryonation Day) ED. When multiple doses are administered, they may be given either at the same time or sequentially, in a manner and time compatible with the formulation of the vaccine, and in such an amount as will be immunologically effective. Therefore, a vaccine of the present invention may effectively serve as a priming vaccination, which later can be followed and amplified by a booster vaccination of the identical vaccine, or with a different vaccine preparation e.g., a classical inactivated, adjuvanted whole-virus vaccine.

The volume per dose of a vaccine of the present invention can be optimized according to the intended route of application: in ovo inoculation is commonly applied with a volume between 0.05 and 0.5 ml/egg, and parenteral injection is commonly done with a volume between 0.1 and 1 ml/avian. In any case, optimization of the vaccine dose volume is well within the capabilities of the skilled artisan.

SEQUENCE TABLE

| SEQ ID NO: | Description | Type |
|---|---|---|
| 1 | ILTV gD Glycoprotein | nucleic acid |
| 2 | ILTV gD Glycoprotein | amino acid |
| 3 | ILTV gI Glycoprotein | nucleic acid |
| 4 | ILTV gI Glycoprotein | amino acid |
| 5 | IBDV VP2 | nucleic acid |
| 6 | IBDV VP2 | amino acid |
| 7 | ILTV gD promoter | nucleic acid |
| 8 | ILTV gI promoter | nucleic acid |
| 9 | ILTV insert | nucleic acid |
| 10 | mCMV IE promoter | nucleic acid |
| 11 | chicken β-actin promoter | nucleic acid |
| 12 | hCMV IE promoter (from strain AD169) | nucleic acid |
| 13 | FHV US-9 polyadenylation signal | nucleic acid |
| 14 | HSV TK polyadenylation signal | nucleic acid |
| 15 | 228509-ILT-435Vec6 (HVT/IBDV/ILT 1386-134) mCMV IEpro-VP2-SV40pA/ILT/HVT | nucleic acid |
| 16 | 1333-85.B6 (HVT/ILT/IBDV 1386-48.1.1.1) ILT/Chicken β-actin pro-VP2-FHV US9pA/HVT | nucleic acid |
| 17 | 1386-04.4#1 (HVT/ILT/IBDV 1386-48.3.1.7) ILT/hCMV IEpro-VP2-HSV TKpA/HVT | nucleic acid |
| 18 | 484-1050-2641-10859 (HVT/IBDV/ILT 484) mCMV IEpro-VP2-SV40pA/ILT/HVT | nucleic acid |
| 19 | SV40 polyadenylation signal | nucleic acid |

The present invention may be better understood by reference to the following non-limiting examples, which are provided as exemplary of the invention. The following examples are presented in order to more fully illustrate embodiments of the invention and should in no way be construed as limiting the broad scope of the invention.

EXAMPLES

Example 1

Construction of Recombinant HVT/ILTV/IBDV Virus Vectors

Recombinant multivalent non-pathogenic Marek's Disease virus constructs were prepared that encode and express both Infectious Laryngotracheitis Virus and Infectious Bursal Disease Virus protein antigens. The present invention overcomes the problem of vaccine interference encountered when two recombinant HVT vaccines, such as Innovax®-ILT (sold by Merck Animal Health) and Vaxxitek® (sold by Merial) are given to the same animal.

Recombinant virus constructs were created in which antigenic donor material from two poultry pathogens, Infectious Laryngotracheitis Virus (ILTV) and Infectious Bursal Disease virus (IBDV) are inserted into a Herpesvirus of Turkey (HVT) vector [see also, U.S. Pat. No. 8,932,604 B2, WO 2013/057,235, and WO 2016/102647, the contents of all of which are hereby incorporated by reference in its entireties]. The donor materials include a 3.563 kb SalI-HindIII fragment from ILTV, NVSL Challenge Strain, Lot #83-2 [pos. 10532-14094; Wild et al., Virus Genes 12:104-116(1996): Acc. #U28832], encoding the full length genes for glycoprotein D (gD) and glycoprotein I (gI), plus partial coding regions from glycoprotein E (amino acids 1-101), and ORF5 (amino acids 734-985); and an expression cassette consisting of the coding region for IBDV, Faragher, type F52/70 strain, viral protein 2 (vp2) gene, driven by a eukaryotic or viral promoter and followed by a terminator sequence. In the present embodiment, the promoter driving VP2 expression may come from the immediate early (IE) gene of human cytomegalovirus (hCMV), strain AD 169, from chicken beta-actin (cβ-act) gene or from the IE gene of mouse cytomegalovirus (mCMV) strain ATCC VR-194. The terminator and polyadenylation sequence may come from human Herpes Simplex Virus (HSV), thymidine kinase (TK) gene, from the glycoprotein B (gB) gene of Feline Herpesvirus (FHV), from the immediate early (IE) gene of human cytomegalovirus (hCMV), strain AD 169 or from simian virus 40 (SV40). The donor material may be inserted into one of two non-essential sites in the HVT vector, the US2 site [pos. 140540/140541, Afonso et al., J. Virology 75(2): 971-978 (2001); Acc. #AF291866, between amino acids residues 124 and 125], or in the UL54.5 site [pos. 111240/111241, Afonso et al., 2001, supra; Acc. #AF291866, between amino acids residues 21 and 22], or one insert in each site.

Genetic and phenotypic stability is a major component of the safety and relatively strong antigen expression and/or efficacy profile of any new recombinant viral vaccine candidate. The IBDV and ILTV expression cassettes inserted into the HVT backbone are not intrinsically required for viral replication and therefore may be lost due to mutation during amplification of the virus stock in tissue culture passages. A satisfactory vaccine candidate must not easily mutate to lose expression of the foreign gene insert. A vaccine candidate is considered stable if it can be demonstrated that at least 90% of the viral plaques express the inserted foreign antigenic protein following greater than or equal to 10 passages in tissue culture.

Example 2

Construction of Recombinant HVT/ILTV/IBDV Virus Vectors

The ability to generate herpesviruses by this method has previously been demonstrated for pseudorabies virus [van Zijl et al., J. Virology 62:2191-2195 (1988)]. This procedure subsequently was employed to construct recombinant HVT vectors [see, U.S. Pat. No. 5,853,733, hereby incorporated by references with respect to the methodology disclosed regarding the construction of recombinant HVT vectors] and was used to construct the recombinant HVT/ILTV/IBDV vectors of the present invention. In this method, the entire HVT genome is cloned into bacterial vectors as several large overlapping subgenomic fragments constructed utilizing standard recombinant DNA techniques [Maniatis et al., (1982) Molecular Cloning, Cold Spring Harbor Laboratory press, Cold Spring Harbor, New York (1982); and Sambrook et al., Molecular Cloning, Cold Spring Harbor Laboratory press, Cold Spring Harbor, New York (1989)]. An HVT strain FC126 cosmid library was derived from sheared viral DNA cloned into the cosmid vector pWE15 (Stratagene, now Agilent Technologies of Santa Clara, Calif.). In addition, several large genomic DNA fragments were isolated by restriction digestion with the enzyme, BamHI, and cloned into either pWE15 or the plasmid vector pSP64 (Promega, Madison Wis.). As described in U.S. Pat. No. 5,853,733, cotransfection of these fragments into chicken embryo fibroblast (CEF) cells results in the regeneration of HVT genome mediated by homologous recombination across the overlapping regions of the fragments. If an insertion is engineered directly into one or more of the subgenomic fragments prior to the cotransfection, this procedure results in a high frequency of viruses containing the insertion. Five overlapping subgenomic clones are required to generate HVT/FC126 HVT, and served as the basis for creating all HVT/ILTV/IBDV recombinant viruses.

Figure 2:
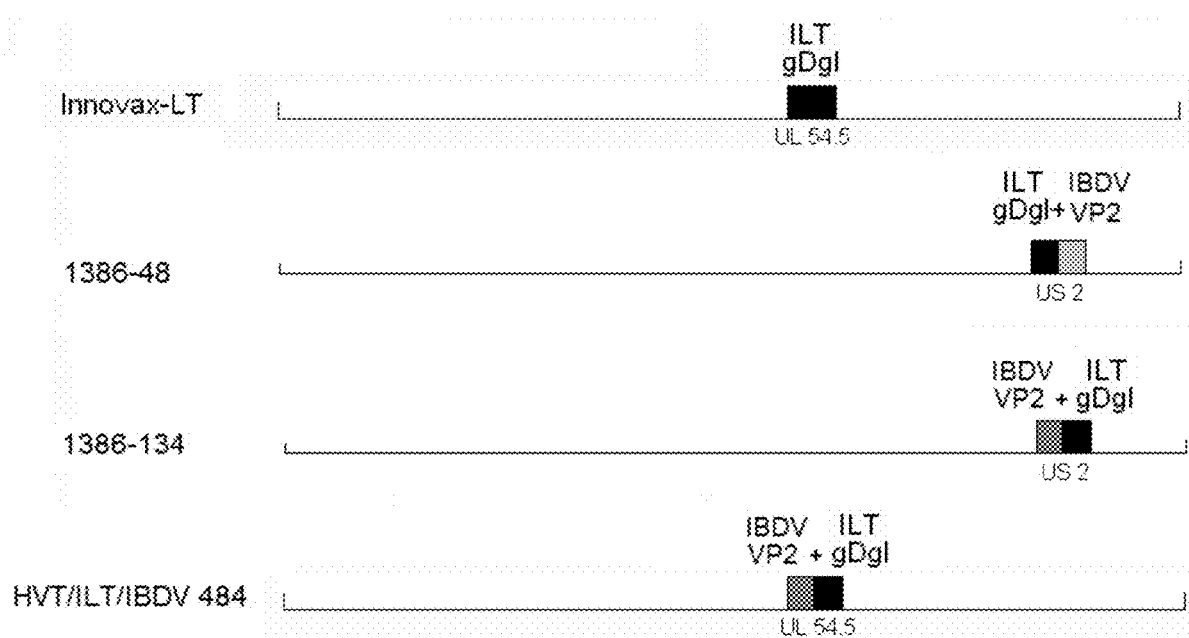
FIG. 2 is a schematic drawing of four different recombinant HVTs, which depict the genes inserted into the HVT backbone and the site of their insertion. Innovax®-ILT is an rHVT that includes an expression cassette encoding the ILTV gD and ILTV gI genes inserted in the UL54.5 site of the rHVT. 1386-48 is an rHVT that includes an expression cassette that encodes the ILTV gD, the ILTV gI, and the IBDV viral protein 2 genes inserted in the US2 site of the rHVT. 1386-134 is an rHVT that also includes both an expression cassette encoding the ILTV gD and ILTV gI, and the IBDV viral protein 2 genes inserted in the US2 site, but the cassette order is switched (i.e., VP2, then ILT gD and gI). HVT/ILT/IBDV 484 is an rHVT that includes an expression cassette that encodes the IBDV viral protein 2, the ILTV gD, and the ILTV gI genes inserted in the UL54.5 site of the rHVT.

Construction of HVT/ILT/IBDV 1386-134.1-2: [See, 1386-134 Depicted in FIG. 2]

The cosmid regeneration of HVT/ILT/IBDV 1386-134.1-2 was performed essentially as described in U.S. Pat. No. 5,853,733 [e.g. FIG. 8 of U.S. Pat. No. 5,853,733; redrawn, at least in part, in FIG. 1, herein]. To allow integration into the US region of the FC126 HVT genome, the region covered by the cosmid nr. 378-50 in U.S. Pat. No. 5,853,733, was now provided from three smaller plasmids: pSY640 and 556-60.6, and one transfer plasmid (228509-ILT-435Vec6), overlapping these two, and containing the IBDV/ILTV expression cassettes in the US2 gene locus. The set of seven linearized constructs: 3 cosmids and 4 plasmids are transfected all together into CEFs, using a standard CaCl$_2$ transfection protocol and the resulting virus stock was plaque purified two times.

Construction of HVT/ILT/IBDV 1386-48.1.1.1: [See, 1386-48 Depicted in FIG. 2]

The cosmid regeneration of HVT/ILT/IBDV 1386-48.1.1.1 was performed essentially as described in U.S. Pat. No. 5,853,733 [e.g. FIG. 8 of U.S. Pat. No. 5,853,733; redrawn, at least in part, in FIG. 1, herein]. To allow integration into the US region of the FC126 HVT genome, the region covered by the cosmid nr. 378-50 in U.S. Pat. No. 5,853,733, was now provided from three smaller plasmids: pSY640 and 556-60.6, and one transfer plasmid (1333-85.B6), overlapping these two, and containing the IBDV/ILTV expression cassettes in the US2 gene locus.

The set of seven linearized constructs: 3 cosmids and 4 plasmids are transfected all together into CEFs, using a standard CaCl$_2$ transfection protocol and the resulting virus stock was plaque purified two times.

Construction of HVT/ILT/IBDV 1386-48.3.1.7: [See, 1386-48 Depicted in FIG. 2]

The cosmid regeneration of HVT/ILT/IBDV 1386-48.3.1.7 was performed essentially as described in U.S. Pat. No. 5,853,733 [e.g. FIG. 8 of U.S. Pat. No. 5,853,733; redrawn, at least in part, in FIG. 1, herein]. To allow integration into the US region of the FC126 HVT genome, the region covered by the cosmid nr. 378-50 in U.S. Pat. No. 5,853,733, was now provided from three smaller plasmids: pSY640 and 556-60.6, and one transfer plasmid (1386-04.4#1), overlapping these two, and containing the IBDV/ILTV expression cassettes in the US2 gene locus. The set of seven linearized constructs: 3 cosmids and 4 plasmids are transfected all together into CEFs, using a standard CaCl$_2$ transfection protocol and the resulting virus stock was plaque purified two times.

Construction of HVT/ILT/IBDV 484: [See, 1386-484 Depicted in FIG. 2]

The cosmid regeneration of HVT/ILT/IBDV 484 was performed essentially as described in U.S. Pat. No. 5,853,733 [e.g. FIG. 8 of U.S. Pat. No. 5,853,733; redrawn, at least in part, in FIG. 1, herein]. To allow integration into the UL54.5 region of the FC126 HVT genome, the region covered by the cosmid nr. 407-32.1C1 in U.S. Pat. No. 5,853,733, was now provided from three smaller plasmids: 672-01.A40 and 672-07.C40, and one transfer plasmid (484-1050-2641-10859), overlapping these two, and containing the IBDV/ILTV expression cassettes in the UL54.5 gene locus. The set of seven linearized constructs: 4 cosmids and 3 plasmids are transfected all together into CEFs, using a standard CaCl$_2$ transfection protocol and the resulting virus stock was plaque purified two times.

Description of Subgenomic Fragments for Generating FC126 HVT:

Subgenomic Clone 407-32.2C3

Cosmid 407-32.2C3 contains an approximately 40,170 base pair region of genomic HVT DNA [Left terminus—pos. 39,754; Afonso et al., 2001, supra; Acc. #AF291866]. This region includes HVT BamHI fragments F', L, P, N1, E, D, and 2,092 base pairs of fragment B.

Subgenomic Clone 172-07.BA2

Plasmid 172-07.BA2 contains a 25,931 base pair region of genomic HVT DNA. It was constructed by cloning the HVT BamHI B fragment [pos. 37,663 to 63,593; Afonso et al., 2001, supra; Acc. #AF291866], into the plasmid pSP64 (Promega, Madison Wis.).

Subgenomic Clone 407-32.5G6

Cosmid 407-32.5G6 contains a 39,404 base pair region of genomic HVT DNA [pos. 61,852-101,255; Afonso et al., 2001, supra; Acc. #AF291866]. This region includes HVT BamHI fragments H, C, Q, K1, M, K2, plus 1,742 base pairs of fragment B, and 3,880 base pairs of fragment J. Subgenomic Clone 407-31.

1C1Cosmid 407-31.1C1 contains a 37,444 base pair region of genomic HVT DNA [pos. 96,095-133,538; Afonso et al., 2001, supra; Acc. #AF291866]. This region includes HVT BamHI fragments J, G, I, F, O, plus 1,281 base pairs of fragment K2, and 6,691 base pairs of fragment A.

Subgenomic Clone 378-50

Cosmid 378-50 contains a 28,897 base pair region of genomic HVT DNA [see, FIG. 8 of U.S. Pat. No. 5,853,733; redrawn, at least in part, in FIG. 1, herein]. This region includes HVT BamHI fragment A. It was constructed by cloning the HVT BamHI A fragment [pos. 126,848-155,744; Afonso et al., 2001, supra; Acc. #AF291866] into cosmid pWE15.

Additional Insertion Fragments for Generating HVT/ILT/IBDV 1386-134.1-2:

Subgenomic Clone 228059-ILT-435Vec6

The insertion plasmid 228059-ILT-435Vec6 contains a 7311 base pair EcoRI fragment of the HVT unique short regions [pos. 126880-144190; Afonso et al., 2001, supra; Acc. #AF291866], cloned into the plasmid pSP64 (Promega, Madison, WI.). Inserted into a unique StuI site within the HVT US2 gene [pos. 140540/140541; Afonso et al., 2001, supra; Acc. #AF291866, between amino acid residues 124 and 125] are 2 elements: an expression cassette consisting of the mCMV IE promoter, the IBDV classic type F52/70, Faragher strain, virus protein 2 gene (VP2), and the SV40 polyadenylation signal, followed by a 3563 base pair SalI-HindIII fragment from ILTV, NVSL Challenge Strain, Lot#83-2 [pos. 10532-14094; Wild et al., *Virus Genes* 12:104-116 (1996); Acc.#U28832], encoding the full length genes for glycoprotein D (gD) and glycoprotein I (gI), plus partial coding regions from glycoprotein E (amino acids 1-101), and ORF5 (amino acids 734-985). The IBDV VP2, ILTV gD and ILTV gI genes are transcribed in the opposite direction relative to the HVT US2 gene.

Subgenomic Clone pSY640

Plasmid pSY640 contains an approximately 13,600 base pair region of genomic HVT DNA (pos. 126848 -140540; Afonso et al., 2001, supra; Acc. #AF291866] derived from BamHI fragment A. To generate this plasmid the region of DNA located upstream of the US2 gene, beginning at the StuI site located in the US2 gene and continuing to the end of the BamHI A fragment, was cloned into the plasmid pSP64 (Promega, Madison WI.).

Subgenomic Clone 556-60.6

Plasmid 556-60.6 contains an approximately 12,500 base pair region of genomic HVT DNA derived from BamHI fragment A (approximate pos. 143300-155744; Afonso et al., 2001, supra; Acc. #AF291866]. To generate this plasmid, the region of DNA located downstream of the US2 gene (beginning at the StuI site located in the US2 gene and continuing to the end of the BamHI A fragment) was cloned into pSP64 (Promega, Madison WI.), and then treated with exonuclease to "chewed back" from StuI site ~150 bp, and re-cloned into pBR322 plasmid vector.

Additional Insertion Fragments for Generating HVT/ILT/IBDV 1386-48.1.1.1:

Subgenomic Clone 1333-85.B6

The insertion plasmid 1333-85.B6 contains a 7311 base pair EcoRI fragment of the HVT unique short regions [pos. 126880-144190; Afonso et al., 2001, supra; Acc. #AF291866], cloned into the plasmid pSP64 (Promega, Madison, WI.). Inserted into a unique StuI site within the HVT US2 gene [pos. 140540/140541; Afonso et al., 2001, supra; Acc. #AF291866, between amino acid residues 124 and 125] are 2 elements: a 3563 base pair SalI-HindIII fragment from ILTV, NVSL Challenge Strain, Lot #83-2 [pos. 10532-14094; Wild et al., *Virus Genes* 12:104-116 (1996); Acc. #U28832], encoding the full length genes for glycoprotein D (gD) and glycoprotein I (gI), plus partial coding regions from glycoprotein E (amino acids 1-101), and ORF5 (amino acids 734-985) and an expression cassette consisting of the chicken β-Actin promoter, the IBDV classic type F52/70, Faragher strain, virus protein 2 gene (VP2), and the polyadenylation signal from the Feline Herpesvirus (FHV) glycoprotein B gene. The ILTV gD, ILTV gI and IBDV VP2 genes are transcribed in the opposite direction relative to the HVT US2 gene.

Subgenomic Clone pSY640.

Plasmid pSY640 contains an approximately 13,600 base pair region of genomic HVT DNA (pos. 126848 -140540; Afonso et al., 2001, supra; Acc. #AF291866] derived from BamHI fragment A. To generate this plasmid the region of DNA located upstream of the US2 gene, beginning at the StuI site located in the US2 gene and continuing to the end of the BamHI A fragment, was cloned into the plasmid pSP64 (Promega, Madison WI.).

Subgenomic Clone 556-60.6.

Plasmid 556-60.6 contains an approximately 12,500 base pair region of genomic HVT DNA derived from BamHI fragment A (approximate pos. 143300-155744; Afonso et al., 2001, supra; Acc. #AF291866]. To generate this plasmid, the region of DNA located downstream of the US2 gene (beginning at the StuI site located in the US2 gene and continuing to the end of the BamHI A fragment) was cloned into pSP64 (Promega, Madison WI.), and then treated with exonuclease to "chewed back" from StuI site ~150 bp, and re-cloned into pBR322 plasmid vector.

Additional Insertion Fragments for Generating HVT/ILT/IBDV 1386-48.3.1.7:

Subgenomic Clone 1386-04.4 #1

The insertion plasmid 1386-04.4 #1 contains a 7311 base pair EcoRI fragment of the HVT unique short regions [pos. 126880-144190; Afonso et al., 2001, supra; Acc. #AF291866], cloned into the plasmid pSP64 (Promega, Madison, WI.). Inserted into a unique StuI site within the HVT US2 gene [pos. 140540/140541; Afonso et al., 2001, supra; Acc. #AF291866, between amino acid residues 124 and 125] are 2 elements: a 3563 base pair SalI-HindIII fragment from ILTV, NVSL Challenge Strain, Lot #83-2 [pos. 10532-14094; Wild et al., *Virus Genes* 12:104-116 (1996); Acc.#U28832], encoding the full length genes for glycoprotein D (gD) and glycoprotein I (gI), plus partial coding regions from glycoprotein E (amino acids 1-101), and ORF5 (amino acids 734-985) and an expression cassette consisting of the hCMV IE promoter, the IBDV classic type F52/70, Faragher strain, virus protein 2 gene (VP2), and the polyadenylation signal from the Herpes Simplex virus (HSV) thymidine kinase gene. The ILTV gD, ILTV gI, and IBDV VP2 genes are transcribed in the opposite direction relative to the HVT US2 gene.

Subgenomic Clone pSY640.

Plasmid pSY640 contains an approximately 13,600 base pair region of genomic HVT DNA (pos. 126848 -140540; Afonso et al., 2001, supra; Acc. #AF291866] derived from BamHI fragment A. To generate this plasmid the region of DNA located upstream of the US2 gene, beginning at the StuI site located in the US2 gene and continuing to the end of the BamHI A fragment, was cloned into the plasmid pSP64 (Promega, Madison WI.).

Subgenomic Clone 556-60.6.

Plasmid 556-60.6 contains an approximately 12,500 base pair region of genomic HVT DNA derived from BamHI fragment A (approximate pos. 143300-155744; Afonso et al., 2001, supra; Acc. #AF291866]. To generate this plasmid, the region of DNA located downstream of the US2 gene (beginning at the StuI site located in the US2 gene and continuing to the end of the BamHI A fragment) was cloned into pSP64 (Promega, Madison WI.), and then treated with exonuclease to "chewed back" from StuI site ~150 bp, and re-cloned into pBR322 plasmid vector.

Additional Insertion Fragments for Generating HVT/ILT/IBDV 484:

Subgenomic Clone 484-1050-2641-10859

The insertion plasmid 484-1050-2641-10859 contains a 8636 base pair region of genomic HVT unique long region [pos. 109489-118124; Afonso et al., 2001, supra; Acc. #AF291866], cloned into a derivative of plasmid pNEB193 (deleted AatII-PvuII). It is flanked by AscI sites and includes HVT BamHI fragments I, S, plus 1337 base pairs of fragment G and 1177 base pairs of fragment F. Inserted into an XhoI site within the HVT UL54.5 open reading frame [pos. 111240/111241; Afonso et al., 2001, supra; Acc. #AF291866, between amino acid residues 21 and 22] are 2 elements: an expression cassette consisting of the mCMV IE promoter, the IBDV classic type F52/70, Faragher strain, virus protein 2 gene (VP2), and the SV40 polyadenylation signal, followed by a 3563 base pair SalI-HindIII fragment from ILTV, NVSL Challenge Strain, Lot #83-2 [pos. 10532-14094; Wild et al., *Virus Genes* 12:104-116 (1996); Acc. #U28832], encoding the full length genes for glycoprotein D (gD) and glycoprotein I (gI), plus partial coding regions from glycoprotein E (amino acids 1-101), and ORF5 (amino acids 734-985). The IBDV VP2, ILTV gD, and ILTV gI genes are transcribed in the opposite direction relative to the HVT UL54.5 gene.

Subgenomic Clone 672-01.A40

Plasmid 672-01.A40 contains a 14,731 base pair region of genomic HVT DNA derived from the unique long region [pos. 96095-110825; Afonso et al., 2001, supra; Acc.#AF291866], cloned into a derivative of plasmid pNEB193. This region includes HVT BamHI fragments G, J and 1281 base pairs of K2.

Subgenomic clone 672-07.C40

Plasmid 672-07.C40 contains a 12,520 base pair region of genomic HVT DNA derived from the unique long region [pos. 116948-129467; Afonso et al., 2001, supra;

Acc.#AF291866], cloned into a derivative of plasmid pNEB193. This region includes HVT BamHI fragments F, O and 2620 base pairs of A.

Standard CaCl$_2$ Transfection Protocol

Secondary CEF's are seeded on 6 well culture plates and incubated at 38° C. with 5% CO$_2$ for 24 hours and confluent monolayers form. For each well a total amount of 0.5 μg DNA of cosmids and plasmids were mixed in Hepes buffer and 125 mM CaCl$_2$ was added dropwise until precipitation was imminent. This mixture was added to the CEF cell monolayer, and incubated for 2 to 3 hours. Supernatant was removed and an overlay of 15% Glycerol was added, and kept on the cells for 1 minute. Then this was removed, washed with PBS, and fresh culture medium was added and cells were incubated for 5 days. Next, cells were harvested by trypsinization and cells from individual plates were each seeded on fresh monolayers of CEF cells in 10 cm plates and incubated until 50-90% CPE was achieved. Next, the amplified transfected cells were harvested by trypsinization, and dilutions of $10^{-2}$ to $10^{-4}$ were plated on 10 cm plates with CEF monolayers and incubated. The following day, the plates were covered with agar, and a number of individual plaques of HVT/ILTV/IBDV were isolated and amplified on CEFs. Each virus stock was plaque purified a second time by infecting confluent monolayers of CEFs on 10 cm plates with first round purified stocks diluted to $10^{-2}$ to $10^{-4}$ and incubating cells. The following day, the plates were covered with agar, and a number of individual plaques of HVT/ILTV/IBDV were isolated and amplified on CEFs.

Example 3

Recombinant HVT/ILTV/IBDV Virus Stocks are Phenotypically Stable for Expression of the ILT and IBDV Proteins Following Serial Passage in Tissue Culture Three constructs, one comprising HVT/IBDV/ILT 1386-134.1-2, the second, comprising HVT/ILT/IBDV 1386-48.1.1.1, and the third comprising HVT/ILT/IBDV 1386-48.3.1.7 were serial passaged greater than 14 times on secondary CEF cells and evaluated for expression of the inserted ILTV and IBDV genes in an Immunofluorescence Assay. A fourth construct, designated HVT/ILT/IBDV 484.1-1A3A3 was serial passaged greater than 15 times on secondary CEF cells and evaluated for expression of the inserted ILTV and IBDV genes in an Immunofluorescence Assay, [see, Tables 1 and 2 below].

Generation of Tissue Culture Passage Stocks:

For each tissue culture passage, confluent secondary CEF monolayers, plated on a 10 cm dish were inoculated with 50-100 μL of virus stock, then incubated at 38° C., 5% CO$_2$ for 2-5 days until CPE was evident. Next, cells were harvested by trypsinization, passage 1 (P1). The process was repeated to prepare further passage stocks (P2-P15).

Phenotypic Stability Analysis:

Six well plates were planted with secondary CEF monolayers. The cells were inoculated with virus stocks harvested at various passage levels: P0-P15, or diluent alone. Plates were inoculated at multiple dilutions to achieve a countable number of plaques per well, and incubated at 38° C., 5% CO$_2$. After a five day incubation, supernatant was decanted and CEF monolayers were fixed with 100% methanol for 10-15 minutes at 15-30° C. Methanol was decanted and cells allowed to air dry prior to staining with ILTV gD (MAB #6), ILTV gI (polyclonal Rabbit anti-gI), and IBDV VP2 (MCA GDV-R63) primary antibodies. Following a 2 hour blocking step, (5% non-fat dry milk in PBS), 2 mL per well, was added to dishes, and incubated on a rocking platform at 15-30° C., primary antibodies were diluted as appropriate and added at 2 mL per well, then incubated at 15-30° C. for 3 hours on a rocking platform. After antibody incubation, plates were washed three times with PBS. The FITC-labeled secondary antibody solution (Rabbit anti-mouse or Goat anti-rabbit) was prepared at 1:100 and 2 mL was added to each well. Plates were incubated for 1 hour at 15-30° C. on a rocking platform. Following the incubation, the plates were washed three times with PBS, and examined under a fluorescent scope. Plaques stained with the ILT antibodies were observed for positive (+) or negative (−) fluorescence. Fluorescing plaques stained with primary antibody to IBDV VP2 protein were counted. Plates were then examined under a white light microscope and the plaques were re-counted. The percentage of fluorescing plaques at each passage level is provided in Tables 1 and 2 below, as well as a qualitative determination of the IBDV VP2 protein expression and vector stability.

TABLE 1

STABILITY OF EXPRESSION FOLLOWING PASSAGE IN TISSUE CULTURE

| Virus Number | Description | Insertion site | Passage Level | ILT gD | ILT gI | IBDV VP2 |
|---|---|---|---|---|---|---|
| 1386-48.3.1.7 | (h)IE-VP2/ ILTgDgI | US2 | P0 | + | + | 100% |
| | | | P5 | + | + | 100% |
| | | | P9 | + | + | 100% |
| | | | P14 | + | + | 96% |
| 1386-48.1.1.1 | (c)β-act-VP2/ ILTgDgI | US2 | P0 | + | + | 100% |
| | | | P5 | + | + | 100% |
| | | | P10 | + | + | 97% |
| | | | P15 | + | + | 98% |
| 1386-134.1-2 | (m)IE-VP2/ ILTgDgI | US2 | P0 | + | + | 100% |
| | | | P5 | + | + | 100% |
| | | | P10 | + | + | 98% |
| | | | P15 | + | + | 99% |

TABLE 1-continued

STABILITY OF EXPRESSION FOLLOWING PASSAGE IN TISSUE CULTURE

| Virus Number | Description | Insertion site | Passage Level | Expression | | |
|---|---|---|---|---|---|---|
| | | | | ILT gD | ILT gI | IBDV VP2 |
| 484.1-1A3A3 | (m)IE-VP2/ ILTgDgI | UL54.5 | P0 | + | + | 100% |
| | | | P4 | + | + | 100% |
| | | | P10 | + | + | 97% |
| | | | P15 | + | + | 94% |

TABLE 2

INSERTION PLASMID DESCRIPTION/VECTOR PROPERITES

| Name/ Designation | Insert. site | Insert. Plasmid | IBDV Promoter | IBDV Expression | Stability |
|---|---|---|---|---|---|
| HVT/ILT/IBDV 1386-48.1.1.1 | US2 | 1333-85.B6 | chicken β-actin | Strong | Stable |
| HVT/ILT/IBDV 1386-48.3.1.7 | US2 | 1386-04.4#1 | hCMV IE | Strong | Stable |
| HVT/IBDV/ILT 1386-134.1-2 | US2 | 228509-ILT-435Vec6 | mCMV IE | Strong | Stable |
| HVT/IBDV/ILT 484 | UL54.5 | 484-1050-2641-10859 | mCMV IE | Strong | Stable |

Example 4

Recombinant HVT/ILTV/IBDV Virus Stocks are Phenotypically Stable for Expression of the ILT and IBDV Proteins Following Vaccination and Recovery from Birds Three vaccines, one comprising HVT/ILT/IBDV 1386-134.1-2, another comprising HVT/ILT IBDV 1386-48.3.1.7, and a third comprising HVT/ILT/IBDV 484.1-1A3A3 were used to inoculate three groups of fifteen (15) day-of-age chickens by the subcutantious route. A fourth group of birds were vaccinated with diluent alone to serve as a negative control group. Spleen samples were collected seven days post-inoculation, and processed for virus isolation on chicken embryo fibroblast cells. Inoculated cells were passaged two times to allow expansion of any virus present. When cytopathic effect was clearly visible, monolayers were harvested and stock frozen. These stocks were used to inoculate secondary CEFs, and plaques analyzed for expression of the ILTV gD, ILTV gI, and IBDV VP2 proteins by immunofluorescence assay (IFA) assay, with antibodies specific to each protein.

Phenotypic Stability Analysis

Six well plates were planted with secondary CEF monolayers. The cells were inoculated with the harvested virus isolation stocks or diluent alone. The plates were inoculated at multiple dilutions to achieve a countable number of plaques per well, and incubated at 38° C., 5% $CO_2$. After five days incubation, supernatant was decanted and CEF monolayers were fixed with 100% methanol for 10-15 minutes at 15-30° C. Methanol was decanted and cells allowed to air dry prior to staining with ILTV gD (MAB #6), ILTV gI (polyclonal Rabbit anti-gI), and IBDV VP2 (MCA GDV-R63) primary antibodies. Following a 2 hour blocking step, (5% non-fat dry milk in PBS), 2 mL per well, was added to dishes, and incubated on a rocking platform at 15-30° C., primary antibodies were diluted as appropriate, and added at 2 mL per well, then incubated at 15-30° C. for 3 hours on a rocking platform. After antibody incubation, plates were washed three times with PBS. The FITC-labeled secondary antibody solution (Rabbit anti-mouse or Goat anti-rabbit) was prepared at 1:100 and 2 mL was added to each well. Plates were incubated for 1 hour at 15-30° C. on a rocking platform. Following incubation, plates were washed three times with PBS, and examined under a fluorescent scope. Plaques stained with the ILTV antibodies were observed for positive (+) or negative (−) fluorescence. Fluorescing plaques stained with primary antibody to IBDV VP2 were counted. Plates were then examined under a white light microscope and plaques re-counted. The percentage of fluorescing plaques at each passage level is provided in Table 3A below. This study was essentially repeated except the virus was recovered two weeks post-inoculation, see, Table 3B below.

TABLE 3A

STABILITY OF EXPRESSION FOLLOWING PASSAGE IN BIRDS

| Vaccine | Insert Description | Insertion site | Dose (PFU) | Percent Expressing | | |
|---|---|---|---|---|---|---|
| | | | | ILT gI | ILT gD | IBDV VP2 |
| HVT/ILT/IBDV 1386-134.1-2 (p10) | (m)IE-VP2/ ILTgDgI | US2 | 7737 | 100% | 100% | 90% |
| HVT/ILT/IBDV 1386-48.3.1.7 (p10) | (h)IE-VP2/ ILTgDgI | US2 | 7003 | 100% | 100% | 89% |

TABLE 3A-continued

STABILITY OF EXPRESSION FOLLOWING PASSAGE IN BIRDS

| Vaccine | Insert Description | Insertion site | Dose (PFU) | Percent Expressing ILT gI | ILT gD | IBDV VP2 |
|---|---|---|---|---|---|---|
| HVT/IBDV/ILT 484.1-1A3A3 (p10) | (m)IE-VP2/ ILTgDgI | UL54.5 | 7793 | 100% | 100% | 97% |
| Diluent | NA | NA | 0 | NA | NA | NA |

TABLE 3B

VIRUS RECOVERED 2 WEEKS POST-INOCULATION

| Vaccine | Insert Description | Insertion site | Dose (PFU) | Percent Expressing ILT gI | ILT gD | IBDV VP2 |
|---|---|---|---|---|---|---|
| HVT/ILT/IBDV 1386-48.1.1.1 (p10) | (h)IE-VP2/ ILTgDgI | US2 | 4785 | 100% | 92% | 42% |

Example 5

Unsuccessful Constructs

The recombinant vector vaccine viruses, by definition are engineered to carry and express foreign genes. Should transcription and expression of these foreign genes provide a growth disadvantage to the recombinant virus relative to the parental virus, it is possible for these genes to be lost during production of the vaccine. For this reason, vaccine candidates must be tested for both genetic and phenotypic stability.

In addition, the protection criteria used is that which has been established by the USDA and codified in the Title 9 Code of Federal Regulations, part 113 (9CFR 113) «Standard requirements for Animal Products». Live virus vaccines must provide at least 90% protection, in the case of NDV, IBDV and ILTV, and at least 80% in the case of MDV, from clinical signs or lesions associated with the disease to obtain a license.

Genetic stability of the viral constructs was determined by Southern blot analysis after a defined number of passages in tissue culture, the highest anticipated vaccine production level, and compared with DNA from the original isolate. DNA extracted from viral stocks would be digested with restriction enzymes, transferred to a membrane and hybridized with probes designed to detect the presence of the inserted foreign genes. Genetic stability may also be determined by PCR analysis. PCR primers designed to anneal to DNA within or flanking the foreign DNA could be used to amplify fragments of a known size from the viral DNA templates both before and after passage in tissue culture.

Phenotypic stability of the viral constructs was determined by immunological staining of individual viral plaques with antibodies directed against the protein products of these inserted foreign genes. Protection provided by these recombinant vaccines relies on expression of these protein products in order to stimulate the animals immune system. In most cases, if the percent of viruses staining positive for the foreign protein expression dropped below 90%, it was likely detrimental to the viruses ability to be grown in tissue culture, and therefore unsuitable as a vaccine candidate.

As is readily apparent from Tables 4A and 4B below, most rMDVnp constructs do not meet these two criteria, namely stability with relatively strong antigen expression and/or efficacy. Table 4A provides a series of recombinant HVT constructs with multiple heterologous inserts in which one of the heterologous inserts encodes an IBDV antigen. As the results show, all of the constructs in Table 4A failed to meet the stability with relatively strong antigen expression and/or efficacy criteria.

TABLE 4A

DOUBLE RECOMBINANT HVT AND IBDV VIRUS CONSTRUCTS:

| Name/ Designation | Insertion site | Insert | IBDV Promoter | IBDV Expression | Stability |
|---|---|---|---|---|---|
| HVT 003 | UL43 | [IBDV] polyprotein [Ecoli] Bgal | PRV gX | Poor | stable |
| HVT 016 | UL43 | [IBDV] VP2 [Ecoli] Bgal | hCMV IE | Strong | unstable |
| HVT 056 | US2 | [MDV] gA, gB [IBDV] VP2 | hCMV IE | Strong | Unstable |
| HVT 060 | US2 | [MDV] gA, gB [IBDV] VP2, 16 kD ORF | IE-VP2, gX-16dk ORF | Strong | unstable |
| HVT 137 | US2 UL54.5 | [MDV] gA, gB, gC [IBDV] VP2 | [BHV] VP8 (tegument) | Poor | stable |

TABLE 4A-continued

DOUBLE RECOMBINANT HVT AND IBDV VIRUS CONSTRUCTS:

| Name/ Designation | Insertion site | Insert | IBDV Promoter | IBDV Expression | Stability |
|---|---|---|---|---|---|
| HVT 143 | US2 US2 UL54.5 | [MDV] gA, gB, gD [NDV] HN, F [IBDV] VP2 | [BHV] VP8 (tegument) | Poor | Unstable |
| HVT/NDV/IBDV 1312-92 | US2 UL7/UL8 | [IBDV] VP2 [NDV] F | hCMV IE | Strong | Unstable |
| HVT/NDV/IBDV 1312-94 | US2 UL7/UL8 | [IBDV] VP2 [NDV] F | hCMV IE | Strong | Unstable |
| HVT/NDV/IBDV 1312-95 | US2 UL7/UL8 | [IBDV] VP2 [NDV] F | hCMV IE | Strong | Unstable |
| HVT/NDV/IBDV 1329-54 | US2 | [IBDV] VP2 [NDV] F | FHV gB | Strong | Unstable |

Table 4B below, provides a series of eleven recombinant HVT constructs and one lone NAHV construct each of which comprise multiple heterologous inserts in which at least one of the heterologous inserts encodes either an NDV or an ILTV antigen.[1] As the results show, all of the constructs in Table 4B failed to meet the stability with relatively strong antigen expression and/or efficacy criteria.

[1] The data in Table 4B was submitted to the U.S. Patent Office during the prosecution of U.S. Pat. No. 8,932,604 B2 in a Declaration signed by one of the co-Inventors of the present application.

TABLE 4B

| Name | Insertion site | Insert | Stability | NDV Protection | MDV Protection | ILT Protection |
|---|---|---|---|---|---|---|
| HVT 048 | US2 | [MDV] gA, gB [NDV] F | Stable | Good | *Protective | — |
| HVT 049 | US2 | [MDV] gA, gB [NDV] HN | Stable | Poor (<20%) | Not tested | — |
| HVT 050 | US2 | [MDV] gA, gB [NDV] F, HN | Stable | Good | *Protective | — |
| HVT 053 | US2 | [MDV] gA, gB [ILT] gB, gD | Unstable | — | Not tested | None |
| HVT 078 | US2 | [MDV] gA, gB, gD [NDV]HN, F | Unstable | Not tested | Not tested | — |
| HVT 079 | US2 | [MDV] gA, gB, gD [ILT] gB, gD | Unstable | — | Not tested | (71-100%) |
| HVT 106 | US2 | [MDV]gA, gB, gD [NDV]HN, F | Stable | **Unknown | Not tested | — |
| HVT 123 | UL54.5 + US2 | [ILT] gD, gB/UL54.5 [MDV] gA, gD, gB/US2 | Unstable | — | Not tested | Not tested |
| HVT 125 | UL54.5 + US2 | [ILT] gDgI, gB/UL54.5 [MDV] gA, gD, gB/US2 | Unstable | — | Not tested | Not tested |
| HVT 128 | UL54.5 + US2 | [NDV] HN, F/UL54.5 [MDV] gA, gD, gB/US2 | Unstable | Not tested | Not tested | — |
| HVT 139 | UL54.5 + US2 | [ILT] gDgI/UL54.5 [MDV] gA, gD, gB/US2 | Unstable | — | Not tested | Not tested |
| HVY-198 (NAHV) | US2* (MDV) | [NDV] F + [ILT] gD, gI | Unstable | | | |

*Protective, but subsequently failed in field studies
**Only 75% birds seroconverted to NDV F Double Recombinant HVT and NAHV Virus Constructs Example 6

Sequences

The following sequences have been used in the exemplary rHVT constructs. The coding sequences provided below include individual stop codons, which can be readily replaced with alternative stop codons without modifying the properties of the protein antigens that the coding sequences encode.

SEQ ID NO 1: ILTV gD Glycoprotein (1134 bp)
atggaccgccatttattttttgaggaatgcttttttg gactatcgtactgctttcttccttcgctagccaga gcaccgccgccgtcacgtacgactacattttaggc cgtcgcgcgctcgacgcgctaaccataccggcggt -continued tggcccgtataacagatacctcactagggtatcaa gaggctgcgacgttgtcgagctcaacccgatttct aacgtggacgacatgatatcggcggccaaagaaaa agagaagggggccctttcgaggcctccgtcgtct ggttctacgtgattaagggcgacgacggcgaggac aagtactgtccaatctatagaaaagagtacaggga -continued
```
atgtggcgacgtacaactgctatctgaatgcgccg
ttcaatctgcacagatgtgggcagtggactatgtt
cctagcacccttgtatcgcgaaatggcgcgggact
gactatattctcccccactgctgcgctctctggcc
aatacttgctgaccctgaaaatcgggagatttgcg
caaacagctctcgtaactctagaagttaacgatcg
ctgtttaaagatcgggtcgcagcttaactttttac
cgtcgaaatgctggacaacagaacagtatcagact
ggatttcaaggcgaacacctttatccgatcgcaga
caccaatacacgacacgcggacgacgtatatcggg
gatacgaagatattctgcagcgctggaataatttg
ctgaggaaaagaatcctagcgcgccagaccctcg
tccagatagcgtcccgcaagaaattcccgctgtaa
ccaagaaagcggaagggcgcaccccggacgcagaa
agcagcgaaagaaggcccctccagaagactcgga
ggacgacatgcaggcagaggcttctggagaaaatc
ctgccgcctccccgaagacgacgaagtccccgag
gacaccgagcacgatgatccaaactcggatcctga
ctattacaatgacatgcccgccgtgatccgggtgg
aggagactactaaaagttctaatgccgtctccatg
cccatattcgcggccgttcgtagcctgcgcggtcgc
gctcgtggggctactggtttggagcatcgtaaaat
gcgcgcgtagctaa
```
SEQ ID NO 2: ILTV gD Glycoprotein
(377 amino acids)
```
MDRHLFLRNAFWTIVLLSSFASQSTAAVTYDYILG
RRALDALTIPAVGPYNRYLTRVSRGCDVVELNPIS
NVDDMISAAKEKEKGGPFEASVVWFYVIKGDDGED
KYCPIYRKEYRECGDVQLLSECAVQSAQMWAVDYV
PSTLVSRNGAGLTIFSPTAALSGQYLLTLKIGRFA
QTALVTLEVNDRCLKIGSQLNFLPSKCWTTEQYQT
GFQGEHLYPIADTNTRHADDVYRGYEDILQRWNNL
LRKKNPSAPDPRPDSVPQEIPAVTKKAEGRTPDAE
SSEKKAPPEDSEDDMQAEASGENPAALPEDDEVPE
DTEHDDPNSDPDYYNDMPAVIPVEETTKSSNAVSM
PIFAAFVACAVALVGLLVWSIVKCARS
```
SEQ ID NO 3: ILTV gI Glycoprotein
(1089 bp)
```
atggcatcgctacttggaactctggctctccttgc
cgcgacgctcgcaccttcggcgcgatgggaatcg
tgatcactggaaatcacgtctccgccaggattgac
gacgatcacatcgtgatcgtcgcgcctcgccccga
agctacaattcaactgcagctatttttcatgcctg
```
-continued
```
gccagagaccccacaaaccctactcaggaaccgtc
cgcgtcgcgtttcggtctgatataacaaaccagtg
ctaccaggaacttagcgaggagcgctttgaaaatt
gcactcatcgatcgtcttctgttttttgtcggctgt
aaagtgaccgagtacacgttctccgcctcgaacag
actaaccggacctccacacccgtttaagctcacta
tacgaaatcctcgtccgaacgacagcgggatgttc
tacgtaattgttcggctagacgacaccaaagaacc
cattgacgtcttcgcgatccaactatcggtgtatc
aattcgcgaacaccgccgcgactcgcggactctat
tccaaggcttcgtgtcgcaccttcggattacctac
cgtccaacttgaggcctatctcaggaccgaggaaa
gttggcgcaactggcaagcgtacgttgccacggag
gccacgacgaccagcgccgaggcgacaaccccgac
gcccgtcactgcaaccagcgcctccgaacttgaag
cggaacactttacctttccctggctagaaaatggc
gtggatcattacgaaccgacacccgcaaacgaaaa
ttcaaacgttactgtccgtctcgggacaatgagcc
ctacgctaattggggtaaccgtggctgccgtcgtg
agcgcaacgatcggcctcgtcattgtaatttccat
cgtcaccagaaacatgtgcaccccgcaccgaaaat
tagacacggtctcgcaagacgacgaagaacgttcc
caaactagaagggaatcgcgaaaatttggacccat
ggttgcgtgcgaaataaacaaggggctgaccagg
atagtgaacttgtggaactggttgcgattgttaac
ccgtctgcgctaagctcgcccgactcaataaaaat
gtga
```
SEQ ID NO 4: ILTV gI Glycoprotein
(362 amino acids)
```
MASLLGTLALLAATLAPFGAMGIVITGNHVSARID
DDHIVIVAPRPEATIQLQLFFMPGQRPHKPYSGTV
RVAFRSDITNQCYQELSEERFENCTHRSSSVFVGC
KVTEYTFSASNRLTGPPHPFKLTIRNPRPNDSGMF
YVIVRLDDTKEPIDVFAIQLSVYQFANTAATRGLY
SKASCRTFGLPTVQLEAYLRTEESWRNWQAYVATE
ATTTSAEATTPTPVTATSASELEAEHFTFPWLENG
VDHYEPTPANENSNVTVRLGTMSPTLIGVTVAAVV
SATIGLVIVISIVTRNMCTPHRKLDTVSQDDEERS
QTRRESRKFGPMVACEINKGADQDSELVELVAIVN
PSALSSPDSIKM
```

SEQ ID NO 5: IBDV VP2 (1362 bp)
atgacaaacctgcaagatcaaacccaacagattgt tccgttcatacggagccttctgatgccaacaaccg gaccggcgtccattccggacgacaccctggagaag cacactctcaggtcagagacctcgacctacaattt gactgtgggggacacagggtcagggctaattgtct ttttccctggattccctggctcaattgtgggtgct cactacacactgcagagcaatgggaactacaagtt cgatcagatgctcctgactgcccagaacctaccgg ccagctacaactactgcagactagtgagtcggagt ctcacagtgaggtcaagcacactccctggtggcgt ttatgcactaaacggcaccataaacgccgtgacct tccaaggaagcctgagtgaactgacagatgttagc tacaatgggttgatgtctgcaacagccaacatcaa cgacaaaattgggaatgtcctggtaggggaagggg tcactgtcctcagcctacccacatcatatgatctt gggtatgtgaggcttggtgaccccattcccgctat agggcttgacccaaaaatggtagctacatgcgaca gcagtgacaggcccagagtctacaccataactgca gccgatgattaccaattctcatcacagtaccaacc aggtggggtaacaatcacactgttctcagccaaca ttgatgctatcacaagcctcagcattgggggagag ctcgtgtttcaaacaagcgtccaaggccttgtact gggcgccaccatctaccttataggctttgatggga ctgcggtaatcaccagagctgtggccgcagataat gggctgacggccggcaccgacaatcttatgccatt caatcttgtcattccaaccaatgagataacccagc caatcacatccatcaaactggagatagtgacctcc aaaagtggtggtcaggcaggggatcagatgtcatg gtcggcaagtgggagcctagcagtgacgatccatg gtggcaactatccaggggccctccgtcccgtcaca ctagtagcctacgaaagagtggcaacaggatccgt cgttacggtcgctggggtgagtaacttcgagctga ttccaaatcctgaactagcaaagaacctggttaca gaatacggccgatttgacccaggagccatgaacta cacaaaattgatactgagtgagagggaccgtcttg gcatcaagaccgtctggccaacaagggagtacact gattttcgtgagtacttcatggaggtggccgacct caactctcccctgaagattgcaggagcatttggct tcaaagacataatccgggctataaggaggtaa SEQ ID NO 6: IBDV VP2
(453 amino acids)
MTNLQDQTQQIVPFIRSLLMPTTGPASIPDDTLEK

HTLRSETSTYNLTVGDTGSGLIVFFPGFPGSIVGA

HYTLQSNGNYKFDQMLLTAQNLPASYNYCRLVSRS

LTVRSSTLPGGVYALNGTINAVTFQGSLSELTDVS

YNGLMSATANINDKIGNVLVGEGVTVLSLPTSYDL

GYVRLGDPIPAIGLDPKMVATCDSSDRPRVYTITA

ADDYQFSSQYQPGGVTITLFSANIDAITSLSIGGE

LVFQTSVQGLVLGATIYLIGFDGTAVITRAVAADN

GLTAGTDNLMPFNLVIPTNEITQPITSIKLEIVTS

KSGGQAGDQMSWSASGSLAVTIHGGNYPGALRPVT

LVAYERVATGSVVTVAGVSNFELIPNPELAKNLVT

EYGRFDPGAMNYTKLILSERDRLGIKTVWPTREYT

DFREYFMEVADLNSPLKIAGAFGFKDIIRAIRR

SEQ ID NO 7: ILTV gD
promoter (527 bp)
aaacagctgtactacagagtaaccgatggaagaac atcggtccagctaatgtgcctgtcgtgcacgagcc attctccggaaccttactgtcttttcgacacgtct cttatagcgagggaaaaagatatcgcgccagagtt atactttacctctgatccgcaaacggcatactgca caataactctgccgtccggcgttgttccgagattc gaatggagccttaataatgtttcactgccggaata tttgacggccacgaccgttgtttcgcataccgctg gccaaagtacagtgtggaagagcagcgcgagagca ggcgaggcgtggatttctggccggggaggcaatat atacgaatgcaccgtcctcatctcagacggcactc gcgttactacgcgaaaggagaggtgcttaacaaac acatggattgcggtggaaaacggtgctgctcaggc gcagctgtattcactcttttctggacttgtgtcag gattatgcgggagcatatctgctttgtacgcaacg ct SEQ ID NO 8: ILTV gI promoter (264 bp)
tgactattacaatgacatgcccgccgtgatcccgg tggaggagactactaaaagttctaatgccgtctcc atgcccatattcgcggcgttcgtagcctgcgcggt cgcgctcgtggggctactggtttggagcatcgtaa aatgcgcgcgtagctaatcgagcctagaataggtg gtttcttcctacatgccacgcctcacgctcataat -continued ataaatcacatggaatagcataccaatgcctattc attgggacgttcgaaaagc SEQ ID NO 9: ILTV insert (3563 bp)
tcgacggcagagtcgcagacgcccctattggacgt caaaattgtagaggtgaagttttcaaacgatggcg aagtaacggcgacttgcgtttccaccgtcaaatct ccctatagggtagaaactaattggaaagtagacct cgtagatgtaatggatgaaatttctgggaacagtc ccgccggggtttttaacagtaatgagaaatggcag aaacagctgtactacagagtaaccgatggaagaac atcggtccagctaatgtgcctgtcgtgcacgagcc attctccggaaccttactgtcttttcgacacgtct cttatagcgagggaaaaagatatcgcgccagagtt atactttacctctgatccgcaaacggcatactgca caataactctgccgtccggcgttgttccgagattc gaatggagccttaataatgtttcactgccggaata tttgacggccacgaccgttgtttcgcataccgctg gccaaagtacagtgtggaagagcagcgcgagagca ggcgaggcgtggatttctggccggggaggcaatat atacgaatgcaccgtcctcatctcagacggcactc gcgttactacgcgaaaggagaggtgcttaacaaac acatggattgcggtggaaaacggtgctgctcaggc gcagctgtattcactcttttctggacttgtgtcag gattatgcgggagcatatctgctttgtacgcaacg ctatggaccgccatttattttgaggaatgctttt tggactatcgtactgctttcttccttcgctagcca gagcaccgccgccgtcacgtacgactacattttag gccgtcgcgcgctcgacgcgctaaccataccggcg gttggcccgtataacagatacctcactagggtatc aagaggctgcgacgttgtcgagctcaacccgattt ctaacgtggacgacatgatatcggcggccaaagaa aaagagaagggggccctttcgaggcctccgtcgt ctggttctacgtgattaagggcgacgacggcgagg acaagtactgtccaatctatagaaaagagtacagg gaatgtggcgacgtacaactgctatctgaatgcgc cgttcaatctgcacagatgtgggcagtggactatg ttcctagcacccttgtatcgcgaaatggcgcggga ctgactatattctcccccactgctgcgctctctgg ccaatacttgctgaccctgaaaatcgggagatttg cgcaaacagctctcgtaactctagaagttaacgat cgctgtttaaagatcgggtcgcagcttaactttt -continued accgtcgaaatgctggacaacagaacagtatcaga ctggatttcaaggcgaacacctttatccgatcgca gacaccaatacacgacacgcggacgacgtatatcg gggatacgaagatattctgcagcgctggaataatt tgctgaggaaaaagaatcctagcgcgccagaccct cgtccagatagcgtcccgcaagaaattcccgctgt aaccaagaaagcggaagggcgcaccccggacgcag aaagcagcgaaaagaaggcccctccagaagactcg gaggacgacatgcaggcagaggcttctggagaaaa tcctgccgccctccccgaagacgacgaagtccccg aggacaccgagcacgatgatccaaactcggatcct gactattacaatgacatgcccgccgtgatcccggt ggaggagactactaaaagttctaatgccgtctcca tgcccatattcgcggcgttcgtagcctgcgcggtc gcgctcgtggggctactggtttggagcatcgtaaa atgcgcgcgtagctaatcgagcctagaataggtgg tttcttcctacatgccacgcctcacgctcataata taaatcacatggaatagcataccaatgcctattca ttgggacgttcgaaaagcatggcatcgctacttgg aactctggctctccttgccgcgacgctcgcaccct tcggcgcgatgggaatcgtgatcactggaaatcac gtctccgccaggattgacgacgatcacatcgtgat cgtcgcgcctcgccccgaagctacaattcaactgc agctatttttcatgcctggccagagaccccacaaa ccctactcaggaaccgtccgcgtcgcgtttcggtc tgatataacaaaccagtgctaccaggaacttagcg aggagcgctttgaaaattgcactcatcgatcgtct tctgtttttgtcggctgtaaagtgaccgagtacac gttctccgcctcgaacagactaaccggacctccac acccgtttaagctcactatacgaaatcctcgtccg aacgacagcgggatgttctacgtaattgttcggct agacgacaccaaagaacccattgacgtcttcgcga tccaactatcggtgtatcaattcgcgaacaccgcc gcgactcgcggactctattccaaggcttcgtgtcg caccttcggattacctaccgtccaacttgaggcct atctcaggaccgaggaaagttggcgcaactggcaa gcgtacgttgccacggaggccacgacgaccagcgc cgaggcgacaaccccgacgcccgtcactgcaacca gcgcctccgaacttgaagcggaacactttaccttt ccctggctagaaaatggcgtggatcattacgaacc gacacccgcaaacgaaaattcaaacgttactgtcc gtctcgggacaatgagccctacgctaattggggta accgtggctgccgtcgtgagcgcaacgatcggcct cgtcattgtaatttccatcgtcaccagaaacatgt gcaccccgcaccgaaaattagacacggtctcgcaa gacgacgaagaacgttcccaaactagaagggaatc gcgaaaatttggacccatggttgcgtgcgaaataa acaaggggctgaccaggatagtgaacttgtggaa ctggttgcgattgttaaccgtctgcgctaagctc gcccgactcaataaaaatgtgattaagtctgaatg tggctctccaatcatttcgattctctaatctccca atcctctcaaaaggggcagtatcggacacggactg ggaggggcgtacacgatagttatatggtacagcag aggcctctgaacacttaggaggagaattcagccgg ggagagcccctgttgagtaggcttgggagcatatt gcaggatgaacatgttagtgatagttctcgcctct tgtcttgcgcgcctaacttttgcgacgcgacacgt cctctttttggaaggcactcaggctgtcctcgggg aagatgatcccagaaacgttccggaagggactgta atcaaatggacaaaagtcctgcggaacgcgtgcaa gatgaaggcggccgatgtctgctcttcgcctaact attgctttcatgatttaatttacgacggaggaaag aaagactgcccgcccgcgggacccctgtctgcaaa cctggtaattttactaaagcgcggcgaa SEQ ID NO 10: mCMV IE promoter (1391 bp)
aactccgcccgttttatgactagaaccaatagttt ttaatgccaaatgcactgaaatcccctaatttgca aagccaaacgccccctatgtgagtaatacggggac ttttacccaatttcccacgcggaaagcccctaa tacactcatatggcatatgaatcagcacggtcatg cactctaatggcggcccatagggactttccacata ggggcgttcaccatttccagcataggggtggtg actcaatggcctttacccaagtacattgggtcaat gggaggtaagccaatgggttttcccattactggc aagcacactgagtcaaatgggactttccactgggt tttgcccaagtacattgggtcaatgggaggtgagc caatgggaaaaacccattgctgccaagtacactga ctcaataggacttccaatggttttccattgt tggcaagcatataaggtcaatgtgggtgagtcaat agggactttccattgtattctgcccagtacataag gtcaataggggtgaatcaacaggaaagtcccatt ggagccaagtacactgcgtcaataggactttcca ttgggttttgcccagtacataaggtcaataggga tgagtcaatgggaaaaacccattggagccaagtac actgactcaatagggactttccattgggttttgcc cagtacataaggtcaataggggtgagtcaacagg aaagttccattggagccaagtacattgagtcaata gggactttccaatgggttttgcccagtacataagg tcaatgggaggtaagccaatgggttttttcccatta ctggcacgtatactgagtcattagggactttccaa tgggttttgcccagtacataaggtcaataggggtg aatcaacaggaaagtcccattggagccaagtacac tgagtcaatagggactttccattgggttttgccca gtacaaaaggtcaataggggtgagtcaatggggtt tttcccattattggcacgtacataaggtcaatagg ggtgagtcattgggtttttccagccaatttaatta aaacgccatgtactttcccaccattgacgtcaatg ggctattgaaactaatgcaacgtgacctttaaacg gtactttcccatagctgattaatgggaaagtaccg ttctcgagccaatacacgtcaatgggaagtgaaag ggcagccaaaacgtaacaccgccccggttttcccc tggaaattccatattggcacgcattctattggctg agctgcgttctacgtgggtataagaggcgcgacca gcgtcggtaccgtcgcagtcttcggtctgaccacc gtagaacgcagagctcctcgctgcag SEQ ID NO 11:
chicken β-actin promoter (692 bp)
(Note: "nnn" denotes an ambiguous
sequence in highly GC-rich region.
Could be 3-5 "g's")
cgcgccggatcagatctccatggtcgaggtgagcc ccacgttctgcttcactctccccatctcccccccc tccccaccccaatttgtatttatttattttttta attattttgtgcagcgatgggggcggggggggggg nnncgcgcgccaggcggggcggggcggggcgaggg gcggggcggggcgaggcggagaggtgcggcggcag ccaatcagagcggcgcgctccgaaagtttccttt atggcgaggcggcggcggcggcggccctataaaaa gcgaagcgcgcggcgggcgggagtcgctgcgcgct gccttcgccccgtgccccgctccgccgccgcctcg cgccgcccgccccggctctgactgaccgcgttact cccacaggtgagcgggcgggacggcccttctcctc cgggctgtaattagcggcaggaaggaaatgggcgg ggagggccttcgtgcgtcgccgcgccgccgtcccc ttctccctctccagcctcggggctgtccgcgggg gacggctgccttcgggggggacggggcagggcggg gttcggcttctggcgtgtgaccggcggctctagag cctctgctaaccatgttcatgccttcttctttttc ctacagctcctgggcaacgtgctggttattgtgct gtctcatcattttggcaaagaattgca SEQ ID NO 12: hCMV IE promoter, from strain AD169 (301 bp)
ggcagtacatctacgtattagtcatcgctattacc atggtgatgcggttttggcagtacatcaatgggcg tggatagcggtttgactcacggggatttccaagtc tccaccccattgacgtcaatgggagtttgttttgg caccaaaatcaacgggactttccaaaatgtcgtaa caactccgccccattgacgcaaatgggcggtaggc gtgtacggtgggaggtctatataagcagagctcgt ttagtgaaccgtcagatcgcctggagacgccatcc acgctgttttgacctccatag SEQ ID NO 13: FHV US-9 polyadenylation signal (55 bp)
caataaacatagcatacgttatgacatggtctacc gcgtcttatatggggacgac SEQ ID NO 14: HSV TK polyadenylation signal (370 bp)
gatccataattgattgacgggagatgg gggaggctaactgaaacacggaaggagacaatacc ggaaggaacccgcgctatgacggcaataaaaagac agaataaaacgcacgggtgttgggtcgtttgttca taaacgcggggttcggtcccagggctggcactctg tcgataccccaccgagaccccattggggccaatac gcccgcgtttcttccttttccccaccccacccccc aagttcgggtgaaggcccagggctcgcagccaacg tcggggcggcaggccctgccatagccactggcccc gtgggttagggacggggtcccccatggggaatggt ttatggttcgtgggggttattattttga SEQ ID NO 15: 228509-ILT-435Vec6 (mCMV IEpro-VP2-SV40pA/ILT/HVT) (14113 bp) (IBDV + ILT gene cassettes in HVT EcoRI#7 fragment. Virus no. HVT/IBDV/ILT 1386-134)
gaattccagactaaatgccccggcccaatttgtca agtgtgcagtcacggaggcgtcgaccgtgtccccg gcattaaacaggaaagcgttaaagtttttgaatgt taggtcacaggtacaaacataaatgtttgtacaaa caggtaacaggtacaaacataaatgccccggcata aatgtcccttacggcggatcgaaacgacattaggc atactcgggtaccattttgcattccgatcagcacg gatgaaattaggcaggaatgcggtttatattatgc ggcattggacaaacgatatggcattgattggcagt ttatgaatgtcttcatgttgggcgtaaacggattc ctattggttcagaagacaacgacgatatatttaga gagaaaaagctacccagcataggataaacacacat tgagcattgagagacataggtatcggtatggatgg gaaaactacacacgtgaacaccaaacgacttatat actcgagcggtgatactactgagcaagaatgcact gcatctgagccactgaatgaagactgtgatgaaaa tgtgaccatcgatggaattggagaagaatatgcgc agttcttcatgtccccgcaatgggtcccaaatcta catcgcttgagcgaggataccaaaaaggtataccg atgtatggtttccaacagactcaattattttccct attatgaggcgttcaggcggtctttgtttgatatg tatatgctaggtcggttggggcgtcgacttaagcg atctgactgggagactattatgcatctgtcaccaa cgcaaagtcggcgtctacatagaactttaagattt gtggagcgtagaattatcccatctaacagttatat acgcacatcgggccacgttccgccttcgagggcac ttccgacagatacgaatttaaagatggatgaataa ttaaattggaaagagtaactacattaatcgagcgt catgacggcgtcccgtgaaaatgggaattttctac tcgaaacaccgtgacatttgacagacctggaattg ttattctgatatatagtgggtgtgtctggccggca acatacataatgtgcatgcgaaaccactttttcag tgtacgctgacattgtgcaacacggaggggtagca tctacatacaatatatgttgattaatgattggaga aaaaactatgcagctcgccgatcatatggctaact cgccttcgtctatatggcggaccccgcgggaaaaa tcgacgtaccatctgatttacaacaccagtaatga acatgtcgcatccctgcccagatctgtgcgcccat tggcgcggatcgttgtgaatgccgccgaaacactt caggtcggtatgagagccgggaggccgccatcagc aggagtttggcgagaggtgtttgatagaatgatga cagccttccgtgaccacgagcctactgcgacattt aatgctgcaaatcccattagaaaaatggtcgagac agttctacagaataatgaagagcccccgcggacgc atgctgaaatgggtaatcgccttatgaacattatg tactggtgttgcttgggacacgcaggacaatgctc gatatggcagttgtacgagacgaatcaggccattt -continued

```
taagtttattagatgaagtggttatcggcacaaca
atcccttttgcaccctcgagcaatactggaagcc
attatgcaccgcaatcgccaacaaggggacctcat
cgcttgttgaggatgccaaagtggccgagtacctg
gttagcatgcgcaaattgatataacataggcacgc
tctgatgttacagaccacaataccgcatacattta
ttgtaaggttgttaataaaggtttattctatgtaa
gactacaatactttcgacattgcttgtatacatat
taaatactttctcaagttcctattacataaaatgg
gatctatcattacattcgttaagagtctggataat
tttactgtttgccagcttcgatcttggaacgtact
gtggatagtgccttacttggaatcgtgaaaatttg
aaacgtccattatttggatatcttccggttgtccc
atatcccgccctggtaccgctcggataccttgccc
gtatggattcgtattgacagtcgcgcaatcgggga
ccaacaacgcgtgggtccacactcattcggaaatt
ttccgatgattctgaatatttattgccgctcgtta
cgagtcgttggacatatctgtaatacatttcttct
tctgaaggatcgctgcacatttgatctatacattg
gccaggatgttcaagtctcagatgttgcattctgg
cacagcacaactttatggcatttccgatgtaatcg
tccggcagccctgggggagttctatattcgcatat
tgggatggtaaggacaatagcagatctcgcaacct
ccagggaggctataataacgttttttaaaggatgga
tttctcataaaaatctgtcgcaaattacactgaga
atatcctttactagcgccgattgagagcatcgtcg
tccaattttctaaatggaaagaaaacaaggcgggc
aagagtgttccaaacattttcattttcggcgaatc
tctcaaatcccatggcgtgcaattgattgcaaaat
tggcacttccgttcacgtttgtatctccaaactct
aagcacttttaattgaaaaactacgttctagtgt
ggaaagaaacctataggcagaccatagaactattt
gacaccacatatctttttgtatgtcaaactgacca
tgatcgtatgttgctgaatgcactagggcaattcg
ctcgcgcgactccatacattgaataattccacacg
tcagctcatcggttagcaaggtccagtagttgaag
tcatttattttccccgcggctggccaaatctacc
tctgggaatatccaagttgtcgaatatgatcgcac
cggctctggtcatggtgaaggaactgtagcataaa
gacgcaggtatcatagggtaatatttttttattc
actcacatactaaaagtaacgcatattagcaccat
gtatgggctatcaattgacatttgcgtagcactac
atcacgattatgtacaacataatgggacaacatat
ggcaagtagatgcaatttcctcacactagttgggt
ttatctactattgaattttcccctatctgtgatac
acttgggagcctctacaagcatattgccatcatgt
acgtttttatctactgtcttaacgcccatgggaac
ggaggcgtcgtcgtcatgtattggacggcaacata
ggcagcaacacaaattgcgtttaggtggggtgcat
gtggactcgataccaagcccctgcagctggggaac
gtctggtgagagccgataatttgatatacgcacg
ccatattactgtcgttgaagtacgccttatcttct
atgttttcaaatttaggttcccaagtggacgtgag
aagtgtttgtatctcacatggaatggcccaaggca
ttccagcccaggtgcctggtactttaatggcaaac
aaacgttttggtagaggtattgattctattgcagt
tctgcagatatctgcagccccgagtatccacaggc
tatacgatacgttatcggaggcaagctgcggccgc
tctagaactagtggatcccccgggctgcagcccaa
tgtggaattcgcccttgcacattgttactcctgca
tcttaaaaatatatcctgtagtaattttcacagca
atgtcataacatcatctcgctaaagaatgacctgg
gattggagaagtaatgaatatttgcaaccaatgca
ttgaataaactaacattaaacgaattcactagtgg
atccccaactccgcccgttttatgactagaacca
atagttttaatgccaaatgcactgaaatcccccta
atttgcaaagccaaacgcccctatgtgagtaata
cggggacttttacccaatttcccacgcggaaagc
cccctaatacactcatatggcatatgaatcagcac
ggtcatgcactctaatggcggcccataggactttt
ccacataggggcgttcaccatttcccagcatagg
ggtggtgactcaatggcctttacccaagtacattg
ggtcaatgggaggtaagccaatgggttttcccat
tactggcaagcacactgagtcaaatgggactttcc
actgggttttgcccaagtacattgggtcaatggga
ggtgagccaatgggaaaaaccccattgctgccaagt
acactgactcaatagggactttccaatgggttttt
ccattgttggcaagcatataaggtcaatgtgggtg
agtcaatagggactttccattgtattctgcccagt
acataaggtcaatagggggtgaatcaacaggaaag
tcccattggagccaagtacactgcgtcaatagggga
```

-continued

```
ctttccattgggttttgcccagtacataaggtcaa taggggatgagtcaatgggaaaaacccattggagc caagtacactgactcaatagggactttccattggg ttttgcccagtacataaggtcaataggggtgagt caacaggaaagttccattggagccaagtacattga gtcaatagggacttccaatgggttttgcccagta cataaggtcaatgggaggtaagccaatgggttttt cccattactggcacgtatactgagtcattagggac tttccaatgggttttgcccagtacataaggtcaat aggggtgaatcaacaggaaagtcccattggagcca agtacactgagtcaatagggactttccattgggtt ttgcccagtacaaaaggtcaataggggtgagtca atgggttttccattattggcacgtacataaggt caataggggtgagtcattgggttttttccagccaat ttaattaaaacgccatgtactttcccaccattgac gtcaatgggctattgaaactaatgcaacgtgacct ttaaacggtactttcccatagctgattaatgggaa agtaccgttctcgagccaatacacgtcaatgggaa gtgaaagggcagccaaaacgtaacaccgcccggt tttcccctggaaattccatattggcacgcattcta ttggctgagctgcgttctacgtgggtataagaggc gcgaccagcgtcggtaccgtcgcagtcttcggtct gaccaccgtagaacgcagagctcctcgctgcaggc ggccgctctagaactcgtcgatcgcagcgatgaca aacctgcaagatcaaacccaacagattgttccgtt catacggagccttctgatgccaacaaccggaccgg cgtccattccggacgacaccctggagaagcacact ctcaggtcagagacctcgacctacaatttgactgt ggggacacagggtcagggctaattgtctttttcc ctggattccctggctcaattgtgggtgctcactac acactgcagagcaatgggaactacaagttcgatca gatgctcctgactgcccagaacctaccggccagct acaactactgcagactagtgagtcggagtctcaca gtgaggtcaagcacactccctggtggcgtttatgc actaaacggcaccataaacgccgtgaccttccaag gaagcctgagtgaactgacagatgttagctacaat gggttgatgtctgcaacagccaacatcaacgacaa aattgggaatgtcctggtaggggaaggggtcactg tcctcagcctacccacatcatatgatcttgggtat gtgaggcttggtgaccccattcccgctatagggct tgacccaaaaatggtagctacatgcgacagcagtg
```

-continued

```
acaggcccagagtctacaccataactgcagccgat gattaccaattctcatcacagtaccaaccaggtgg ggtaacaatcacactgttctcagccaacattgatg ctatcacaagcctcagcattgggggagagctcgtg tttcaaacaagcgtccaaggccttgtactgggcgc caccatctaccttataggctttgatgggactgcgg taatcaccagagctgtggccgcagataatgggctg acggccggcaccgacaatcttatgccattcaatct tgtcattccaaccaatgagataacccagccaatca catccatcaaactggagatagtgacctccaaaagt ggtggtcaggcaggggatcagatgtcatggtcggc aagtgggagcctagcagtgacgatccatggtggca actatccaggggccctccgtcccgtcacactagta gcctacgaaagagtggcaacaggatccgtcgttac ggtcgctggggtgagtaacttcgagctgattccaa atcctgaactagcaaagaacctggttacagaatac ggccgatttgacccaggagccatgaactacacaaa attgatactgagtgagagggaccgtcttggcatca agaccgtctggccaacaagggagtacactgattt cgtgagtacttcatggaggtggccgacctcaactc tcccctgaagattgcaggagcatttggcttcaaag acataatccgggctataaggaggtaagcttcagac atgataagatacattgatgagtttggacaaaccac aactagaatgcagtgaaaaaaatgctttatttgtg aaatttgtgatgctattgctttatttgtaaccatt ataagctgcaataaacaagttaacaacaacaattg cattcattttatgtttcaggttcagggggaggtgt gggaggttttttcggatcctctagagtcgacggca gagtcgcagacgccctatttggacgtcaaaattgt agaggtgaagttttcaaacgatggcgaagtaacgg cgacttgcgttccaccgtcaaatctccctatagg gtagaaactaattggaaagtagacctcgtagatgt aatggatgaaatttctgggaacagtcccgccgggg tttttaacagtaatgagaaatggcagaaacagctg tactacagagtaaccgatggaagaacatcggtcca gctaatgtgcctgtcgtgcacgagccattctccgg aaccttactgtcttttcgacacgtctcttatagcg agggaaaaagatatcgcgccagagttatactttac ctctgatccgcaaacggcatactgcacaataactc tgccgtccggcgttgttccgagattcgaatggagc
```

-continued
```
cttaataatgtttcactgccggaatatttgacggc
cacgaccgttgtttcgcataccgctggccaaagta
cagtgtggaagagcagcgcgagagcaggcgaggcg
tggatttctggccggggaggcaatatatacgaatg
caccgtcctcatctcagacggcactcgcgttacta
cgcgaaaggagaggtgcttaacaaacacatggatt
gcggtggaaaacggtgctgctcaggcgcagctgta
ttcactcttttctggacttgtgtcaggattatgcg
ggagcatatctgctttgtacgcaacgctatggacc
gccatttatttttgaggaatgcttttttggactatc
gtactgctttcttccttcgctagccagagcaccgc
cgccgtcacgtacgactacattttaggccgtcgcg
cgctcgacgcgctaaccataccggcggttggcccg
tataacagatacctcactagggtatcaagaggctg
cgacgttgtcgagctcaacccgatttctaacgtgg
acgacatgatatcggcggccaaagaaaaagagaag
gggggcccttttcgaggcctccgtcgtctggttcta
cgtgattaagggcgacgacggcgaggacaagtact
gtccaatctatagaaaagagtacagggaatgtggc
gacgtacaactgctatctgaatgcgccgttcaatc
tgcacagatgtgggcagtggactatgttcctagca
cccttgtatcgcgaaatggcgcgggactgactata
ttctcccccactgctgcgctctctggccaatactt
gctgaccctgaaaatcgggagatttgcgcaaacag
ctctcgtaactctagaagttaacgatcgctgttta
aagatcgggtcgcagcttaacttttttaccgtcgaa
atgctggacaacagaacagtatcagactggatttc
aaggcgaacacctttatccgatcgcagacaccaat
acacgacacgcggacgacgtatatcggggatacga
agatattctgcagcgctggaataatttgctgagga
aaaagaatcctagcgcgccagaccctcgtccagat
agcgtcccgcaagaaattcccgctgtaaccaagaa
agcggaaggggcgcaccccggacgcagaaagcagcg
aaaagaaggcccctccagaagactcggaggacgac
atgcaggcagaggcttctggagaaaatcctgccgc
cctccccgaagacgacgaagtccccgaggacaccg
agcacgatgatccaaactcggatcctgactattac
aatgacatgcccgccgtgatcccggtggaggagac
tactaaaagttctaatgccgtctccatgcccatat
tcgcggcgttcgtagcctgcgcggtcgcgctcgtg
gggctactggtttggagcatcgtaaaatgcgcgcg
```

-continued
```
tagctaatcgagcctagaataggtggtttcttcct
acatgccacgcctcacgctcataatataaatcaca
tggaatagcataccaatgcctattcattgggacgt
tcgaaaagcatggcatcgctacttggaactctggc
tctccttgccgcgacgctcgcacccttcggcgcga
tgggaatcgtgatcactggaaatcacgtctccgcc
aggattgacgacgatcacatcgtgatcgtcgcgcc
tcgccccgaagctacaattcaactgcagctatttt
tcatgcctggccagagaccccacaaaccctactca
ggaaccgtccgcgtcgcgtttcggtctgatataac
aaaccagtgctaccaggaacttagcgaggagcgct
ttgaaaattgcactcatcgatcgtcttctgttttt
gtcggctgtaaagtgaccgagtacacgttctccgc
ctcgaacagactaaccggacctccacacccgttta
agctcactatacgaaatcctcgtccgaacgacagc
gggatgttctacgtaattgttcggctagacgacac
caaagaacccattgacgtcttcgcgatccaactat
cggtgtatcaattcgcgaacaccgccgcgactcgc
ggactctattccaaggcttcgtgtcgcaccttcgg
attacctaccgtccaacttgaggcctatctcagga
ccgaggaaagttggcgcaactggcaagcgtacgtt
gccacggaggccacgacgaccagcgccgaggcgac
aaccccgacgcccgtcactgcaaccagcgcctccg
aacttgaagcggaacactttacctttccctggcta
gaaaatggcgtggatcattacgaaccgacacccgc
aaacgaaaattcaaacgttactgtccgtctcggga
caatgagcccctacgctaattggggtaaccgtggct
gccgtcgtgagcgcaacgatcggcctcgtcattgt
aatttccatcgtcaccagaaacatgtgcaccccgc
accgaaaattagacacggtctcgcaagacgacgaa
gaacgttcccaaactagaagggaatcgcgaaaatt
tggacccatggttgcgtgcgaaataaacaaggggg
ctgaccaggatagtgaacttgtggaactggttgcg
attgttaacccgtctgcgctaagctcgcccgactc
aataaaaatgtgattaagtctgaatgtggctctcc
aatcatttcgattctctaatctcccaatcctctca
aaaggggcagtatcggacacggactgggaggggcg
tacacgatagttatatggtacagcagaggcctctg
aacacttaggaggagaattcagccggggagagccc
ctgttgagtaggcttgggagcatattgcaggatga
```

-continued
```
acatgttagtgatagttctcgcctcttgtcttgcg
cgcctaacttttgcgacgcgacacgtcctcttttt
ggaaggcactcaggctgtcctcggggaagatgatc
ccagaaacgttccggaagggactgtaatcaaatgg
acaaaagtcctgcggaacgcgtgcaagatgaaggc
ggccgatgtctgctcttcgcctaactattgctttc
atgatttaatttacgacggaggaaagaaagactgc
ccgcccgcgggacccctgtctgcaaacctggtaat
tttactaaagcgcggcgaagcttagcttgcctccg
attctagcattacatagccggtcagtagatcctgc
cattcggtagcgcaaccggctacatcttcaaacag
tctcacgataaatgcatctctcgttcctgccaatc
cggaaccgggcataccactcccgcctgccgattta
attctcacaattgggcgatgccggcggggcaaaac
gaatgtggatttggcaaaccgacacaggtctgctg
tacggactaatatgggcacacccacatcattcttc
agatgctccatgcattgttctatgagaaagatcca
tagggtggaggcagcgtcacgagatcgcccaggca
atcgatcgcattcgtctagtaaagtgacgagagtt
atcatgcacacacccatgcccacgccttccgaata
actggagctgtggaagatcggaaacgtcttttga
ctgccggtctcgtactactttcgcacaggtgtata
cccgacgcgtactatatattttatatcatccaac
gtccgaaattacatacgtggcggcgatggaagtag
atgttgagtcttcgaaagtaagtgcctcgaatatg
ggtattgtctgtgaaaatatcgaaagcggtacgac
ggttgcagaaccgtcgatgtcgccagatactagta
acaatagcttcgataacgaagacttccgtgggcct
gaatacgatgtggagataaataccagaaaatctgc
taatcttgatcgtatggaatcttcgtgccgtgaac
aacgagcggcgtgcgaacttcgaaagtgttcgtgt
cctacgtctgccgtgcgcatgcaatacagtattct
ttcatctctcgctccgggttcagagggtcatgtat
atatatgtactagatacggggacgcggaccaaaaa
aaatgcatagtgaaggcagtcgttggaggaaagaa
tcccgggagggaagtggatattttaaaaaccatct
cacataaatcaattataaaattaatccatgcctat
aaatggaaaatgttgtgtgtatggcaatgcgtgt
atatcgttatgatcttttcacatatattgacggag
tcggccctatgcccttcaacagatgatctatatt
caacgtggactactagaggcgctagcatacataca
```

-continued
```
tgaaaggggcatcattcaccgagacgtaaagacgg
agaatatattcttggataatcacgaaaatgcagtt
ttgggtgacttcggtgctgcatgccaactaggaga
ttgtatagatacgccccaatgttacggttggagcg
gaactgtggaaacaaattcgccggaattatctgca
cttgatccgtattgcacaaaaacagatatttggag
tgccggattggttctatatgagatggcaattaaaa
atgtaccattgtttagtaagcaggtgaaaagttcg
ggatctcagctgagatccataatacggtgcatgca
agtgcatgaactggagtttccccgcaacgattcta
ccaacctctgtaaacattcaaacaatatgcggtt
cgtgtacgaccgccttataccattcctcgagttat
aagaaatggggggatgccaatggatgttgaatatg
tcatttctaaaatgcttacgtttgaccaggagttc
agaccttctgctaaggaaatattgaatatgcccct
atttactaaggcgccgattaacctgcttaatatca
cacccctctgacagtgtctaacggtatacaggcggg
agcgggtcgtggcgtcatcatcaccacttgagaat
ttatattttgaattgttgattgataaattaacctg
attcattgagaactgaaacgccatattggtttctt
ggatatgtctacaacaattagttaaattgctatgt
tctactgcgagtaacatttgataagttgtaagaga
cgggcgactcatgtcgaagttgacgaatataaagt
acataacgtgtttagaatacccagaatccgaatag
tccgcggggcgtcttctcgcgtgagtaccaaata
ctgagttgaacttgaaaatgctaaatctgtgacac
tcttttgtgtgatgattattgtcaccacttcgaaga
tggcttcgacattcatgatgttctggtgtttgttt
ggaatcgtaatagcgcttgtttcgtccaagtctga
caacaaagaaaatctgaagaattatatcacggata
agtcaaccaatattagaatacccacgccattattt
gtatcaacggaaaactcttatcccacaaaacatgt
aatctacgatgaaaactgtggcttcgctgtactca
atcctataagtgaccccaaatatgtccttttgagc
cagcttctaatgggaaggcgcaaatgatgcgac
ggtcgcgtggtttgttctcggtaaaatgtgtgcca
gattaatatatttgcgcgaattttataactgctcg
acaaatgagccttttggcacatgttctatgagctc
tcctggatggtgggacaggcgctacgtctcaacca
gtttcatttctcgcgacgaattacagctggttttt
``` gcagcgccgtcccgagaattagatggtttatatac gcgcgtagtagttgtcaacggggactttactacgg ccgatataatgtttaatgttaaagtggcatgtgcc ttttcaaagactggaatagaagatgatacattatg caaaccctttcatttctttgccaatgcaacattgc acaatttaaccatgattagatcggtaactcttcga gcgcacgaaagccatttaaaggaatgggtggcacg gagaggtggtaacgtccctgcagtgctacttgagt ctaccatgtatcatgcatccaatctgcctagaaat ttcagggatttctacataaagtctccagatgatta taagtataatcacctagatgggccatctgtaatgc tcatcactgacagacctagtgaagatttggatggg aggctcgttcaccaaagtgacattttttactactac aagtcctataaaacaggtccggtatgaagagcatc agtcacatacaaagcagtatcctgtaaacaaaata caagctataatttttttgatagggttaggctcgtt cattggaagcatattcgtagttttggtagtatgga ttatacgcagatattgcaatggagcgcggagtggg ggaacgccccccagtcctcgccggtatgtgtatac caggctatgatcacgtgtgaaacttgggcggacct gtatcatatgtacaccgtccctattcgtttatagc cagtacgtgttatctgcacatagaggaacatgtgt catactgggatcgcatgcatggtatgtgtgactct aatattattctgtatcataataaaaacacagtgca tggtatatagaggatcgctggtaagcactacggta gaccaatcggctcagattgcattctttggcatcga taccgttgttaatttatatggcaaagtcttgttca tgggagatcagtatttggaggaaatatactctgga acgatggaaatactcaaatggaatcaagctaaccg ctgctattctattgcgcatgcaacatattacgccg actgtcctataatcagttctacggtattcagagga tgccgggacgccgttgtttatactaggccccacag cagaattc SEQ ID NO 16: 1333-85.B6 (ILT/Chicken β-actin pro-VP2-FHV US9pA /HVT) (13064 bp)
(ILT + IBDV gene cassettes in HVT EcoRI#7 fragment.)
Virus no. HVT/ILT/IBDV 1386-48.1.1.1 gaattccagactaaatgccccggcccaatttgtca agtgtgcagtcacggaggcgtcgaccgtgtccccg gcattaaacaggaaagcgttaaagtttttgaatgt taggtcacaggtacaaacataaatgtttgtacaaa caggtaacaggtacaaacataaatgccccggcata aatgtcccttacggcggatcgaaacgacattaggc atactcgggtaccattttgcattccgatcagcacg gatgaaattaggcaggaatgcggtttatattatgc ggcattggacaaacgatatggcattgattggcagt ttatgaatgtcttcatgttgggcgtaaacggattc ctattggttcagaagacaacgacgatatatttaga gagaaaaagctacccagcataggataaacacacat tgagcattgagagacataggtatcggtatggatgg gaaaactacacacgtgaacaccaaacgacttatat actcgagcggtgatactactgagcaagaatgcact gcatctgagccactgaatgaagactgtgatgaaaa tgtgaccatcgatggaattggagaagaatatgcgc agttcttcatgtccccgcaatgggtcccaaatcta catcgcttgagcgaggataccaaaaaggtataccg atgtatggtttccaacagactcaattattttccct attatgaggcgttcaggcggtctttgtttgatatg tatatgctaggtcggttggggcgtcgacttaagcg atctgactgggagactattatgcatctgtcaccaa cgcaaagtcggcgtctacatagaactttaagattt gtggagcgtagaattatcccatctaacagttatat acgcacatcgggccacgttccgccttcgagggcac ttccgacagatacgaatttaaagatggatgaataa ttaaattggaaagagtaactacattaatcgagcgt catgacggcgtcccgtgaaaatgggaattttctac tcgaaacaccgtgacatttgacagacctggaattg ttattctgatatatagtgggtgtgtctggccggca acatacataatgtgcatgcgaaaccactttttcag tgtacgctgacattgtgcaacacggaggggtagca tctacatacaatatatgttgattaatgattggaga aaaaactatgcagctcgccgatcatatggctaact cgccttcgtctatatggcggaccccgcgggaaaaa tcgacgtaccatctgatttacaacaccagtaatga acatgtcgcatccctgcccagatctgtgcgcccat tggcgcggatcgttgtgaatgccgccgaaacactt caggtcggtatgagagccgggaggccgccatcagc aggagtttggcgagaggtgtttgatagaatgatga cagccttccgtgaccacgagcctactgcgacattt aatgctgcaaatcccattagaaaaatggtcgagac agttctacagaataatgaagagcccccgcggacgc atgctgaaatgggtaatcgccttatgaacattatg

```
tactggtgttgcttgggacacgcaggacaatgctc
gatatggcagttgtacgagacgaatcaggccattt
taagtttattagatgaagtggttatcggcacaaca
aatccttttgcaccctcgagcaatactggaagcc
attatgcaccgcaatcgccaacaaggggacctcat
cgcttgttgaggatgccaaagtggccgagtacctg
gttagcatgcgcaaattgatataacataggcacgc
tctgatgttacagaccacaataccgcatacattta
ttgtaaggttgttaataaaggtttattctatgtaa
gactacaatactttcgacattgcttgtatacatat
taaatactttctcaagttcctattacataaaatgg
gatctatcattacattcgttaagagtctggataat
tttactgtttgccagcttcgatcttggaacgtact
gtggatagtgccttacttggaatcgtgaaaatttg
aaacgtccattatttggatatcttccggttgtccc
atatcccgccctggtaccgctcggataccttgccc
gtatggattcgtattgacagtcgcgcaatcgggga
ccaacaacgcgtgggtccacactcattcggaaatt
ttccgatgattctgaatatttattgccgctcgtta
cgagtcgttggacatatctgtaatacatttcttct
tctgaaggatcgctgcacatttgatctatacattg
gccaggatgttcaagtctcagatgttgcattctgg
cacagcacaactttatggcatttccgatgtaatcg
tccggcagccctgggggagttctatattcgcatat
tgggatggtaaggacaatagcagatctcgcaacct
ccagggaggctataataacgttttaaaggatgga
tttctcataaaaatctgtcgcaaattacactgaga
atatcctttactagcgccgattgagagcatcgtcg
tccaattttctaaatgaaagaaaacaaggcgggc
aagagtgttccaaacattttcattttcggcgaatc
tctcaaatcccatggcgtgcaattgattgcaaaat
tggcacttccgttcacgtttgtatctccaaactct
aagacacttttaattgaaaaactacgttctagtgt
ggaaagaaacctataggcagaccatagaactattt
gacaccacatatctttttgtatgtcaaactgacca
tgatcgtatgttgctgaatgcactagggcaattcg
ctcgcgcgactccatacattgaataattccacacg
tcagctcatcggttagcaaggtccagtagttgaag
tcatttattttttccccgcggctggccaaatctacc
tctgggaatatccaagttgtcgaatatgatcgcac
cggctctggtcatggtgaaggaactgtagcataaa gacgcaggtatcatagggtaatatttttttattc
actcacatactaaaagtaacgcatattagcaccat
gtatgggctatcaattgacatttgcgtagcactac
atcacgattatgtacaacataatgggacaacatat
ggcaagtagatgcaatttcctcacactagttgggt
ttatctactattgaattttcccctatctgtgatac
acttgggagcctctacaagcatattgccatcatgt
acgttttatctactgtcttaacgcccatgggaac
ggaggcgtcgtcgtcatgtattggacggcaacata
ggcagcaacacaaattgcgtttaggtggggtgcat
gtggactcgataccaagcccctgcagctggggaac
gtctggtggagagccgataatttgatatacgcacg
ccatattactgtcgttgaagtacgccttatcttct
atgttttcaaatttaggttcccaagtggacgtgag
aagtgtttgtatctcacatggaatggcccaaggca
ttccagcccaggtgcctggtactttaatggcaaac
aaacgttttggtagaggtattgattctattgcagt
tctgcagatatctgcagccccgagtatccacaggc
tatacgatacgttatcggaggcaagcttaattaag
taccgagctcgaattggcgcgcccgacggcagagt
cgcagacgcccctattggacgtcaaaattgtagag
gtgaagttttcaaacgatggcgaagtaacggcgac
ttgcgtttccaccgtcaaatctccctatagggtag
aaactaattggaaagtagacctcgtagatgtaatg
gatgaaatttctgggaacagtcccgccggggtttt
taacagtaatgagaaatggcagaaacagctgtact
acagagtaaccgatggaagaacatcggtccagcta
atgtgcctgtcgtgcacgagccattctccggaacc
ttactgtctttcgacacgtctcttatagcgaggg
aaaaagatatcgcgccagagttatactttacctct
gatccgcaaacggcatactgcacaataactctgcc
gtccggcgttgttccgagattcgaatggagcctta
ataatgtttcactgccggaatatttgacggccacg
accgttgtttcgcataccgctggccaaagtacagt
gtggaagagcagcgcgagagcaggcgaggcgtgga
tttctggccggggaggcaatatatacgaatgcacc
gtcctcatctcagacggcactcgcgttactacgcg
aaaggagaggtgcttaacaaacacatggattgcgg
tggaaaacggtgctgctcaggcgcagctgtattca
ctcttttctggacttgtgtcaggattatgcgggag
```

-continued

```
catatctgctttgtacgcaacgctatggaccgcca
tttattttgaggaatgcttttggactatcgtac
tgctttcttccttcgctagccagagcaccgccgcc
gtcacgtacgactacattttaggccgtcgcgcgct
cgacgcgctaaccataccggcggttggcccgtata
acagatacctcactagggtatcaagaggctgcgac
gttgtcgagctcaacccgatttctaacgtggacga
catgatatcggcggccaaagaaaaagagaaggggg
gccctttcgaggcctccgtcgtctggttctacgtg
attaagggcgacgacggcgaggacaagtactgtcc
aatctatagaaaagagtacagggaatgtggcgacg
tacaactgctatctgaatgcgccgttcaatctgca
cagatgtgggcagtggactatgttcctagcaccct
tgtatcgcgaaatggcgcgggactgactatattct
cccccactgctgcgctctctggccaatacttgctg
accctgaaaatcgggagatttgcgcaaacagctct
cgtaactctagaagttaacgatcgctgtttaaaga
tcgggtcgcagcttaacttttaccgtcgaaatgc
tggacaacagaacagtatcagactggatttcaagg
cgaacacctttatccgatcgcagacaccaatacac
gacacgcggacgacgtatatcggggatacgaagat
attctgcagcgctggaataatttgctgaggaaaaa
gaatcctagcgcgccagaccctcgtccagatagcg
tcccgcaagaaattcccgctgtaaccaagaaagcg
gaagggcgcaccccggacgcagaaagcagcgaaaa
gaaggcccctccagaagactcggaggacgacatgc
aggcagaggcttctggagaaaatcctgccgccctc
cccgaagacgacgaagtccccgaggacaccgagca
cgatgatccaaactcggatcctgactattacaatg
acatgcccgccgtgatcccggtggaggagactact
aaaagttctaatgccgtctccatgcccatattcgc
ggcgttcgtagcctgcgcggtcgcgctcgtgggc
tactggtttggagcatcgtaaaatgcgcgcgtagc
taatcgagcctagaataggtggtttcttcctacat
gccacgcctcacgctcataatataaatcacatgga
atagcataccaatgcctattcattgggacgttcga
aaagcatggcatcgctacttggaactctggctctc
cttgccgcgacgctcgcacccttcggcgcgatggg
aatcgtgatcactggaaatcacgtctccgccagga
ttgacgacgatcacatcgtgatcgtcgcgcctcgc
cccgaagctacaattcaactgcagctattttcat
gcctggccagagaccccacaaaccctactcaggaa
ccgtccgcgtcgcgtttcggtctgatataacaaac
cagtgctaccaggaacttagcgaggagcgctttga
aaattgcactcatcgatcgtcttctgtttttgtcg
gctgtaaagtgaccgagtacacgttctccgcctcg
aacagactaaccgacctccacacccgtttaagct
cactatacgaaatcctcgtccgaacgacagcggga
tgttctacgtaattgttcggctagacgacaccaaa
gaacccattgacgtcttcgcgatccaactatcggt
gtatcaattcgcgaacaccgccgcgactcgcggac
tctattccaaggcttcgtgtcgcaccttcggatta
cctaccgtccaacttgaggcctatctcaggaccga
ggaaagttggcgcaactggcaagcgtacgttgcca
cggaggccacgacgaccagcgccgaggcgacaacc
ccgacgcccgtcactgcaaccagcgcctccgaact
tgaagcggaacactttacctttccctggctagaaa
atggcgtggatcattacgaaccgacacccgcaaac
gaaaattcaaacgttactgtccgtctcgggacaat
gagcccttacgctaattggggtaaccgtggctgccg
tcgtgagcgcaacgatcggcctcgtcattgtaatt
tccatcgtcaccagaaacatgtgcaccccgcaccg
aaaattagacacggtctcgcaagacgacgaagaac
gttcccaaactagaagggaatcgcgaaaatttgga
cccatggttgcgtgcgaaataaacaaggggggctga
ccaggatagtgaacttgtggaactggttgcgattg
ttaacccgtctgcgctaagctcgcccgactcaata
aaaatgtgattaagtctgaatgtggctctccaatc
atttcgattctctaatctcccaatcctctcaaaag
gggcagtatcggacacggactgggaggggcgtaca
cgatagttatatggtacagcagaggcctctgaaca
cttaggaggagaattcagccggggagagcccctgt
tgagtaggcttgggagcatattgcaggatgaacat
gttagtgatagttctcgcctcttgtcttgcgcgcc
taacttttgcgacgcgacacgtcctcttttggaa
ggcactcaggctgtcctcggggaagatgatcccag
aaacgttccggaagggactgtaatcaaatggacaa
aagtcctgcggaacgcgtgcaagatgaaggcggcc
gatgtctgctcttcgcctaactattgctttcatga
tttaatttacgacggaggaaagaaagactgcccgc
ccgcgggacccctgtctgcaaacctggtaatttta
```

-continued ctaaagcgcggcgggcgcgccggatcagatctcca
tggtcgaggtgagccccacgttctgcttcactctc
cccatctcccccccctccccaccccaattttgta
tttatttattttttaattattttgtgcagcgatgg
gggcggggggggggnnncgcgcgccaggcggggc
ggggcggggcgaggggcggggcggggcgaggcgga
gaggtgcggcggcagccaatcagagcggcgcgctc
cgaaagtttcctttatgcgaggcggcggcggcg
gcggccctataaaaagcgaagcgcgcggcgggcgg
gagtcgctgcgcgctgccttcgccccgtgccccgc
tccgccgccgcctcgcgccgcccgccccggctctg
actgaccgcgttactcccacaggtgagcgggcggg
acggcccttctcctccgggctgtaattagcggcag
gaaggaaatgggcggggagggccttcgtgcgtcgc
cgcgccgccgtcccttctccctctccagcctcgg
ggctgtccgcgggggacggctgccttcggggggg
acggggcagggcggggttcggcttctggcgtgtga
ccggcggctctagagcctctgctaaccatgttcat
gccttcttcttttcctacagctcctgggcaacgt
gctggttattgtgctgtctcatcattttggcaaag
aattgcagatctggatctatgacaaacctgcaaga
tcaaacccaacagattgttccgttcatacggagcc
ttctgatgccaacaaccggaccggcgtccattccg
gacgacaccctggagaagcacactctcaggtcaga
gacctcgacctacaatttgactgtgggggacacag
ggtcagggctaattgtctttttccctggattccct
ggctcaattgtgggtgctcactacacactgcagag
caatgggaactacaagttcgatcagatgctcctga
ctgcccagaacctaccggccagctacaactactgc
agactagtgagtcggagtctcacagtgaggtcaag
cacactccctggtggcgtttatgcactaaacggca
ccataaacgccgtgaccttccaaggaagcctgagt
gaactgacagatgttagctacaatgggttgatgtc
tgcaacagccaacatcaacgacaaagttgggaatg
tcctggtagggaaggggtcactgtcctcagccta
cccacatcatatgatcttgggtatgtgaggcttgg
tgacccccattcccgctatagggcttgacccaaaaa
tggtagctacatgcgacagcagtgacaggccaga
gtctacaccataactgcagccgatgattaccaatt
ctcatcacagtaccaaccaggtggggtaacaatca
cactgttctcagccaacattgatgctatcacaagc -continued ctcagcattgggggagagctcgtgtttcaaacaag
cgtccaaggccttgtactgggcgccaccatctacc
ttataggctttgatgggactgcggtaatcaccaga
gctgtggccgcagataatgggctgacggccggcac
cgacaatcttatgccattcaatcttgtcattccaa
ccaatgagataacccagccgatcacatccatcaaa
ctggagatagtgacctccaaaagtggtggtcaggc
aggggatcagatgtcatggtcggcaagtgggagcc
tagcagtgacgatccatggtggcaactatccaggg
gccctccgtcccgtcacactagtagcctacgaaag
agtggcaacaggatccgtcgttacggtcgctgggg
tgagtaacttcgagctgatcccaaatcctgaacta
gcaaagaacctggttacagaatacggccgatttga
cccaggagccatgaactacacaaaattgatactga
gtgagagggaccgtcttggcatcaagaccgtctgg
ccaacaagggagtacactgattttcgtgagtactt
catggaggtggccgacctcaactctcccctgaaga
ttgcaggagcatttggcttcaaagacataatccgg
gctataaggaggtaagatccgatctctcgattaat
taacaataaacatagcatacgttatgacatggtct
accgcgtcttatatggggacgacaagcttgcctcc
gattctagcattacatagccggtcagtagatcctg
ccattcggtagcgcaaccggctacatcttcaaaca
gtctcacgataaatgcatctctcgttcctgccaat
ccggaaccgggcataccactcccgcctgccgattt
aattctcacaattgggcgatgccggcggggcaaaa
cgaatgtggatttggcaaaccgacacaggtctgct
gtacggactaatatgggcacacccacatcattctt
cagatgctccatgcattgttctatgagaaagatcc
atagggtggaggcagcgtcacgagatcgcccaggc
aatcgatcgcattcgtctagtaaagtgacgagagt
tatcatgcacacacccatgcccacgccttccgaat
aactggagctgtggaagatcggaaacgtcttttg
actgccggtctcgtactactttcgcacaggtgtat
acccggacgcgtactatatattttatatcatccaa
cgtccgaaattacatacgtggcggcgatggaagta
gatgttgagtcttcgaaagtaagtgcctcgaatat
gggtattgtctgtgaaaatatcgaaagcggtacga
cggttcagaaccgtcgatgtcgccagatactagt
aacaatagcttcgataacgaagacttccgtgggcc -continued

```
tgaatacgatgtggagataaataccagaaaatctg
ctaatcttgatcgtatggaatcttcgtgccgtgaa
caacgagcggcgtgcgaacttcgaaagtgttcgtg
tcctacgtctgccgtgcgcatgcaatacagtattc
tttcatctctcgctccgggttcagagggtcatgta
tatatatgtactagatacggggacgcggaccaaaa
aaaatgcatagtgaaggcagtcgttggaggaaaga
atcccggaggaagtggatattttaaaaaccatc
tcacataaatcaattataaaattaatccatgccta
taaatgaaaaatgttgtgtgtatggcaatgcgtg
tatatcgttatgatcttttcacatatattgacgga
gtcggccctatgcccttcaacagatgatctatat
tcaacgtggactactagaggcgctagcatacatac
atgaaaggggcatcattcaccgagacgtaaagacg
gagaatatattcttggataatcacgaaaatgcagt
tttgggtgacttcggtgctgcatgccaactaggag
attgtatagatacgcccaatgttacggttggagc
ggaactgtggaaacaaattcgccggaattatctgc
acttgatccgtattgcacaaaaacagatatttgga
gtgccggattggttctatatgagatggcaattaaa
aatgtaccattgtttagtaagcaggtgaaaagttc
gggatctcagctgagatccataatacggtgcatgc
aagtgcatgaactggagtttccccgcaacgattct
accaacctctgtaaacatttcaaacaatatgcggt
tcgtgtacgaccgccttataccattcctcgagtta
taagaaatgggggatgccaatggatgttaatat
gtcatttctaaaatgcttacgtttgaccaggagtt
cagaccttctgctaaggaaatattgaatatgcccc
tatttactaaggcgccgattaacctgcttaatatc
acaccctctgacagtgtctaacggtatacaggcgg
gagcgggtcgtggcgtcatcatccaccacttgagaa
tttatattttgaattgttgattgataaattaacct
gattcattgagaactgaaacgccatattggtttct
tggatatgtctacaacaattagttaaattgctatg
ttctactgcgagtaacatttgataagttgtaagag
acgggcgactcatgtcgaagttgacgaatataaag
tacataacgtgtttagaatacccagaatccgaata
gtccgcggggcgtcttctcgcgtgagtaccaaat
actgagttgaacttgaaaatgctaaatctgtgaca
ctctttgtgtgatgattattgtcaccacttcgaag
atggcttcgacattcatgatgttctggtgtttgtt
```

-continued

```
tggaatcgtaatagcgcttgtttcgtccaagtctg
acaacaaagaaaatctgaagaattatatcacggat
aagtcaaccaatattagaatacccacgccattatt
tgtatcaacggaaaactcttatcccacaaaacatg
taatctacgatgaaaactgtggcttcgctgtactc
aatcctataagtgaccccaaatatgtccttttgag
ccagcttctaatgggaaggcgcaaatatgatgcga
cggtcgcgtggtttgttctcggtaaaatgtgtgcc
agattaatatatttgcgcgaattttataactgctc
gacaaatgagccttttggcacatgttctatgagct
ctcctggatggtgggacaggcgctacgtctcaacc
agtttcatttctcgcgacgaattacagctggtttt
tgcagcgccgtcccgagaattagatggtttatata
cgcgcgtagtagttgtcaacggggactttactacg
gccgatataatgtttaatgttaaagtggcatgtgc
cttttcaaagactggaatagaagatgatacattat
gcaaaccctttcatttctttgccaatgcaacattg
cacaatttaaccatgattagatcggtaactcttcg
agcgcacgaaagccatttaaaggaatgggtggcac
ggagaggtggtaacgtccctgcagtgctacttgag
tctaccatgtatcatgcatccaatctgcctagaaa
tttcagggatttctacataaagtctccagatgatt
ataagtataatcacctagatgggccatctgtaatg
ctcatcactgacagacctagtgaagatttggatgg
gaggctcgttcaccaaagtgacatttttactacta
caagtcctataaaacaggtccggtatgaagagcat
cagtcacatacaaagcagtatcctgtaaacaaaat
acaagctataattttttttgatagggttaggctcgt
tcattggaagcatattcgtagttttggtagtatgg
attatacgcagatattgcaatggagcgcggagtgg
gggaacgcccccagtcctcgccggtatgtgtata
ccaggctatgatcacgtgtgaaacttgggcggacc
tgtatcatatgtacaccgtccctattcgtttatag
ccagtacgtgttatctgcacatagaggaacatgtg
tcatactgggatcgcatgcatggtatgtgtgactc
taatattattctgtatcataataaaaacacagtgc
atggtatatagaggatcgctggtaagcactacggt
agaccaatcggctcagattgcattctttggcatcg
ataccgttgttaatttatatggcaaagtcttgttc
atgggagatcagtatttggaggaaatatactctgg
```

-continued
aacgatggaaatactcaaatggaatcaagctaacc gctgctattctattgcgcatgcaacatattacgcc gactgtcctataatcagttctacggtattcagagg atgccgggacgccgttgtttatactaggccccaca gcagaattc SEQ ID NO 17: 1386-04.4#1 (ILT/hCMV
IEpro-VP2-HSV TKpA/HVT) (13017 bp)
(ILT + IBDV gene cassettes in
HVT EcoRI#7 fragment. Virus no.
HVT/ILT/IBDV 1386-48.3.1.7)
gaattccagactaaatgccccggcccaatttgtca agtgtgcagtcacggaggcgtcgaccgtgtccccg gcattaaacaggaaagcgttaaagttttttgaatgt taggtcacaggtacaaacataaatgtttgtacaaa caggtaacaggtacaaacataaatgccccggcata aatgtcccttacggcggatcgaaacgacattaggc atactcgggtaccattttgcattccgatcagcacg gatgaaattaggcaggaatgcggtttatattatgc ggcattggacaaacgatatggcattgattggcagt ttatgaatgtcttcatgttgggcgtaaacggattc ctattggttcagaagacaacgacgatatatttaga gagaaaaagctacccagcataggataaacacacat tgagcattgagagacataggtatcggtatggatgg gaaaactacacacgtgaacaccaaacgacttatat actcgagcggtgatactactgagcaagaatgcact gcatctgagccactgaatgaagactgtgatgaaaa tgtgaccatcgatggaattggagaagaatatgcgc agttcttcatgtccccgcaatgggtcccaaatcta catcgcttgagcgaggataccaaaaaggtataccg atgtatggtttccaacagactcaattattttccct attatgaggcgttcaggcggtctttgtttgatatg tatatgctaggtcggttggggcgtcgacttaagcg atctgactgggagactattatgcatctgtcaccaa cgcaaagtcggcgtctacatagaactttaagattt gtggagcgtagaattatcccatctaacagttatat acgcacatcgggccacgttccgccttcgagggcac ttccgacagatacgaatttaaagatggatgaataa ttaaattggaaagagtaactacattaatcgagcgt catgacggcgtcccgtgaaaatgggaattttctac tcgaaacaccgtgacatttgacagacctggaattg ttattctgatatatagtgggtgtgtctggccggca acatacataatgtgcatgcgaaaccacttttttcag tgtacgctgacattgtgcaacacggaggggtagca -continued
tctacatacaatatatgttgattaatgattggaga aaaaactatgcagctcgccgatcatatggctaact cgccttcgtctatatggcggaccccgcgggaaaaa tcgacgtaccatctgatttacaacaccagtaatga acatgtcgcatccctgcccagatctgtgcgcccat tggcgcggatcgttgtgaatgccgccgaaacactt caggtcggtatgagagccggaggccgccatcagc aggagtttggcgagaggtgtttgatagaatgatga cagccttccgtgaccacgagcctactgcgacattt aatgctgcaaatcccattagaaaaatggtcgagac agttctacagaataatgaagagcccccgcggacgc atgctgaaatgggtaatcgccttatgaacattatg tactggtgttgcttgggacacgcaggacaatgctc gatatggcagttgtacgagacgaatcaggccattt taagtttattagatgaagtggttatcggcacaaca aatccctttttgcaccctcgagcaatactggaagcc attatgcaccgcaatcgccaacaaggggacctcat cgcttgttgaggatgccaaagtggccgagtacctg gttagcatgcgcaaattgatataacataggcacgc tctgatgttacagaccacaataccgcatacattta ttgtaaggttgttaataaaggtttattctatgtaa gactacaatactttcgacattgcttgtatacatat taaatactttctcaagttcctattacataaaatgg gatctatcattacattcgttaagagtctggataat tttactgtttgccagcttcgatcttggaacgtact gtggatagtgccttacttggaatcgtgaaaatttg aaacgtccattatttggatatcttccggttgtccc atatcccgccctggtaccgctcggataccttgccc gtatggattcgtattgacagtcgcgcaatcgggga ccaacaacgcgtgggtccacactcattcggaaatt ttccgatgattctgaatatttattgccgctcgtta cgagtcgttggacatatctgtaatacatttcttct tctgaaggatcgctgcacatttgatctatacattg gccaggatgttcaagtctcagatgttgcattctgg cacagcacaactttatggcatttccgatgtaatcg tccggcagccctggggagttctatattcgcatat tgggatggtaaggacaatagcagatctcgcaacct ccagggaggctataataacgttttttaaaggatgga tttctcataaaaatctgtcgcaaattacactgaga atatcctttactagcgccgattgagagcatcgtcg tccaatttttctaaatggaaagaaaacaaggcgggc -continued aagagtgttccaaacattttcattttcggcgaatc tctcaaatcccatggcgtgcaattgattgcaaaat tggcacttccgttcacgtttgtatctccaaactct aagacacttttaattgaaaaactacgttctagtgt ggaaagaaacctataggcagaccatagaactattt gacaccacatatcttttgtatgtcaaactgacca tgatcgtatgttgctgaatgcactagggcaattcg ctcgcgcgactccatacattgaataattccacacg tcagctcatcggttagcaaggtccagtagttgaag tcatttattttccccgcggctggccaaatctacc tctgggaatatccaagttgtcgaatatgatcgcac cggctctggtcatggtgaaggaactgtagcataaa gacgcaggtatcataggggtaatattttttattc actcacatactaaaagtaacgcatattagcaccat gtatgggctatcaattgacatttgcgtagcactac atcacgattatgtacaacataatgggacaacatat ggcaagtagatgcaatttcctcacactagttgggt ttatctactattgaattttcccctatctgtgatac acttgggagcctctacaagcatattgccatcatgt acgttttatctactgtcttaacgcccatgggaac ggaggcgtcgtcgtcatgtattggacggcaacata ggcagcaacacaaattgcgtttaggtggggtgcat gtggactcgataccaagcccctgcagctggggaac gtctggtggagagccgataatttgatatacgcacg ccatattactgtcgttgaagtacgccttatcttct atgttttcaaatttaggttcccaagtggacgtgag aagtgtttgtatctcacatggaatggcccaaggca ttccagcccaggtgcctggtactttaatggcaaac aaacgttttggtagaggtattgattctattgcagt tctgcagatatctgcagccccgagtatccacaggc tatacgatacgttatcggaggcaagcttgttaatt aagtcgacggcagagtcgcagacgcccctattgga cgtcaaaattgtagaggtgaagttttcaaacgatg gcgaagtaacggcgacttgcgtttccaccgtcaaa tctccctatagggtagaaactaattggaaagtaga cctcgtagatgtaatggatgaaatttctgggaaca gtcccgccggggttttttaacagtaatgagaaatgg cagaaacagctgtactacagagtaaccgatggaag aacatcggtccagctaatgtgcctgtcgtgcacga gccattctccggaaccttactgtcttttcgacacg -continued tctcttatagcgagggaaaaagatatcgcgccaga gttatactttacctctgatccgcaaacggcatact gcacaataactctgccgtccggcgttgttccgaga ttcgaatggagccttaataatgtttcactgccgga atatttgacggccacgaccgttgtttcgcataccg ctggccaaagtacagtgtggaagagcagcgcgaga gcaggcgaggcgtggatttctggccggggaggcaa tatatacgaatgcaccgtcctcatctcagacggca ctcgcgttactacgcgaaaggagaggtgcttaaca aacacatggattgcggtggaaaacggtgctgctca ggcgcagctgtattcactcttttctggacttgtgt caggattatgcgggagcatatctgctttgtacgca acgctatggaccgccatttatttttgaggaatgct ttttggactatcgtactgctttcttccttcgctag ccagagcaccgccgccgtcacgtacgactacattt taggccgtcgcgcgctcgacgcgctaaccataccg gcggttggcccgtataacagatacctcactagggt atcaagaggctgcgacgttgtcgagctcaacccga tttctaacgtggacgacatgatatcggcggccaaa gaaaagagaagggggccctttcgaggcctccgt cgtctggttctacgtgattaagggcgacgacggcg aggacaagtactgtccaatctatagaaaagagtac agggaatgtggcgacgtacaactgctatctgaatg cgccgttcaatctgcacagatgtgggcagtggact atgttcctagcaccccttgtatcgcgaaatggcgcg ggactgactatattctcccccactgctgcgctctc tggccaatacttgctgaccctgaaaatcgggagat ttgcgcaaacagctctcgtaactctagaagttaac gatcgctgtttaaagatcgggtcgcagcttaactt tttaccgtcgaaatgctggacaacagaacagtatc agactggatttcaaggcgaacacctttatccgatc gcagacaccaatacacgacacgcggacgacgtata tcggggatacgaagatattctgcagcgctggaata atttgctgaggaaaaagaatcctagcgcgccagac cctcgtccagatagcgtcccgcaagaaattcccgc tgtaaccaagaaagcggaagggcgcacccgggacg cagaaagcagcgaaaagaaggcccctccagaagac tcggaggacgcatgcaggcagaggcttctggaga aaatcctgccgccctccccgaagacgacgaagtcc ccgaggacaccgagcacgatgatccaaactcggat cctgactattacaatgacatgcccgccgtgatccc -continued ggtggaggagactactaaaagttctaatgccgtct ccatgcccatattcgcggcgttcgtagcctgcgcg gtcgcgctcgtggggctactggtttggagcatcgt aaaatgcgcgcgtagctaatcgagcctagaatagg tggtttcttcctacatgccacgcctcacgctcata atataaatcacatggaatagcataccaatgcctat tcattgggacgttcgaaaagcatggcatcgctact tggaactctggctctccttgccgcgacgctcgcac ccttcggcgcgatgggaatcgtgatcactggaaat cacgtctccgccaggattgacgacgatacatcgt gatcgtcgcgcctcgccccgaagctacaattcaac tgcagctattttcatgcctggccagagaccccac aaaccctactcaggaaccgtccgcgtcgcgtttcg gtctgatataacaaccagtgctaccaggaactta gcgaggagcgctttgaaaattgcactcatcgatcg tcttctgttttgtcggctgtaaagtgaccgagta cacgttctccgcctcgaacagactaaccggacctc cacaccgtttaagctcactatacgaaatcctcgt ccgaacgacagcgggatgttctacgtaattgttcg gctagacgacaccaaagaacccattgacgtcttcg cgatccaactatcggtgtatcaattcgcgaacacc gccgcgactcgcggactctattccaaggcttcgtg tcgcaccttcggattacctaccgtccaacttgagg cctatctcaggaccgaggaaagttggcgcaactgg caagcgtacgttgccacggaggccacgacgaccag cgccgaggcgacaaccccgacgcccgtcactgcaa ccagcgcctccgaacttgaagcggaacactttacc tttccctggctagaaaatggcgtggatcattacga accgacacccgcaaacgaaaattcaaacgttactg tccgtctcgggacaatgagccctacgctaattggg gtaaccgtggctgccgtcgtgagcgcaacgatcgg cctcgtcattgtaatttccatcgtcaccagaaaca tgtgcacccgcaccgaaaattagacacggtctcg caagacgacgaagaacgttcccaaactagaaggga atcgcgaaaatttggacccatggttgcgtgcgaaa taaacaaggggctgaccaggatagtgaacttgtg gaactggttgcgattgttaacccgtctgcgctaag ctcgcccgactcaataaaaatgtgattaagtctga atgtggctctccaatcatttcgattctctaatctc ccaatcctctcaaaaggggcagtatcggacacgga -continued ctgggagggcgtacacgatagttatatggtacag cagaggcctctgaacacttaggaggagaattcagc cggggagagcccctgttgagtaggcttgggagcat attgcaggatgaacatgttagtgatagttctcgcc tcttgtcttgcgcgcctaacttttgcgacgcgaca cgtcctcttttggaaggcactcaggctgtcctcg gggaagatgatcccagaaacgttccggaagggact gtaatcaaatggacaaaagtcctgcggaacgcgtg caagatgaaggcggccgatgtctgctcttcgccta actattgctttcatgatttaatttacgacggagga aagaaagactgcccgcccgcgggacccctgtctgc aaacctggtaattttactaaagcgcggcgaaagct taggtcaattccctggcattatgcccagtacatga ccttatgggactttcctacttggcagtacatctac gtattagtcatcgctattaccatggtgatgcggtt ttggcagtacatcaatgggcgtggatagcggtttg actcacggggatttccaagtctccacccattgac gtcaatgggagtttgttttggcaccaaaatcaacg ggactttccaaaatgtcgtaacaactccgcccat tgacgcaaatgggcggtaggcgtgtacggtgggag gtctatataagcagagctcgtttagtgaaccgtca gatcgcctggagacgccatccacgctgttttgacc tccatagaagacaccgggcgcgccggatctatgac aaacctgcaagatcaaacccaacagattgttccgt tcatacggagccttctgatgccaacaaccggaccg gcgtccattccggacgacaccctggagaagcacac tctcaggtcagagacctcgacctacaatttgactg tgggggacacagggtcagggctaattgtctttttc cctggattccctggctcaattgtgggtgctcacta cacactgcagagcaatgggaactacaagttcgatc agatgctcctgactgcccagaacctaccggccagc tacaactactgcagactagtgagtcggagtctcac agtgaggtcaagcacactccctggtggcgtttatg cactaaacggcaccataaacgccgtgaccttccaa ggaagcctgagtgaactgacagatgttagctacaa tgggttgatgtctgcaacagccaacatcaacgaca aagttgggaatgtcctggtaggggaaggggtcact gtcctcagcctacccacatcatatgatcttgggta tgtgaggcttggtgaccccattcccgctatagggc ttgacccaaaaatggtagctacatgcgacagcagt gacaggcccagagtctacaccataactgcagccga tgattaccaattctcatcacagtaccaaccaggtg
gggtaacaatcacactgttctcagccaacattgat
gctatcacaagcctcagcattgggggagagctcgt
gtttcaaacaagcgtccaaggccttgtactgggcg
ccaccatctaccttataggctttgatgggactgcg
gtaatcaccagagctgtggccgcagataatgggct
gacggccggcaccgacaatcttatgccattcaatc
ttgtcattccaaccaatgagataacccagccgatc
acatccatcaaactggagatagtgacctccaaaag
tggtggtcaggcaggggatcagatgtcatggtcgg
caagtgggagcctagcagtgacgatccatggtggc
aactatccaggggccctccgtcccgtcacactagt
agcctacgaaagagtggcaacaggatccgtcgtta
cggtcgctgggtgagtaacttcgagctgatccca
aatcctgaactagcaaagaacctggttacagaata
cggccgatttgacccaggagccatgaactacacaa
aattgatactgagtgagagggaccgtcttggcatc
aagaccgtctgccaacaagggagtacactgattt
tcgtgagtacttcatggaggtggccgacctcaact
ctcccctgaagattgcaggagcatttggcttcaaa
gacataatccgggctataaggaggtaagatccata
attgattgacgggagatgggggaggctaactgaaa
cacgaaggagacaataccggaaggaacccgcgct
atgacggcaataaaaagacagaataaaaacgcacgg
gtgttgggtcgtttgttcataaacgcggggttcgg
tcccagggctggcactctgtcgataccccaccgag
acccattgggccaatacgcccgcgtttcttcct
tttcccaccccaccccccaagttcgggtgaaggc
ccagggctcgcagccaacgtcggggcggcaggccc
tgccatagccactggccccgtgggttagggacggg
gtcccccatggggaatggtttatggttcgtggggg
ttattattttgaagcttgcctccgattctagcatt
acatagccggtcagtagatcctgccattcggtagc
gcaaccggctacatcttcaaacagtctcacaataa
atgcatctctcgttcctgccaatccggaaccgggc
ataccactcccgcctgccgatttaattctcacaat
tgggcgatgccggcggggcaaaacgaatgtggatt
tggcaaaccgacacaggtctgctgtacggactaat
atgggcacacccacatcattcttcagatgctccat
gcattgttctatgagaaagatccataggg tggagg cagcgtcacgagatcgcccaggcaatcgatcgcat
tcgtctagtaaagtgacgagagttatcatgcacac
acccatgcccacgccttccgaataactggagctgt
ggaagatcggaaacgtcttttttgactgccggtctc
gtactactttcgcacaggtgtatacccggacgcgt
actatatattttatatcatccaacgtccgaaatta
catacgtggcggcgatggaagtagatgttgagtct
tcgaaagtaagtgcctcgaatatgggtattgtctg
tgaaaatatcgaaagcggtacgacggttgcagaac
cgtcgatgtcgccagatactagtaacaatagcttc
gataacgaagacttccgtgggcctgaatacgatgt
ggagataaataccagaaaatctgctaatcttgatc
gtatggaatcttcgtgccgtgaacaacgagcggcg
tgcgaacttcgaaagtgttcgtgtcctacgtctgc
cgtgcgcatgcaatacagtattctttcatctctcg
ctccgggttcagagggtcatgtatatatatgtact
agatacggggacgcggaccaaaaaaaatgcatagt
gaaggcagtcgttggaggaaagaatcccgggaggg
aagtggatattttaaaaaccatctcacataaatca
attataaaattaatccatgcctataaatggaaaaa
tgttgtgtgtatggcaatgcgtgtatatcgttatg
atcttttcacatatattgacggagtcggccctatg
ccccttcaacagatgatctatattcaacgtggact
actagaggcgctagcatacatacatgaaaggggca
tcattcaccgagacgtaaagacggagaatatattc
ttggataatcacgaaaatgcagttttgggtgactt
cggtgctgcatgccaactaggagattgtatagata
cgccccaatgttacggttggagcggaactgtggaa
acaaattcgccggaattatctgcacttgatccgta
ttgcacaaaaacagatatttggagtgccggattgg
ttctatatgagatggcaattaaaaatgtaccattg
tttagtaagcaggtgaaaagttcgggatctcagct
gagatccataatacggtgcatgcaagtgcatgaac
tggagtttccccgcaacgattctaccaacctctgt
aaacatttcaaacaatatgcggttcgtgtacgacc
gccttataccattcctcgagttataagaaatgggg
ggatgccaatggatgttgaatatgtcatttctaaa
atgcttacgtttgaccaggagttcagaccttctgc
taaggaaatattgaatatgcccctatttactaagg
cgccgattaacctgcttaatatcacaccctctgac
agtgtctaacggtatacaggcgggagcgggtcgtg -continued gcgtcatcatcaccacttgagaatttatattttga attgttgattgataaattaacctgattcattgaga actgaaacgccatattggtttcttggatatgtcta caacaattagttaaattgctatgttctactgcgag taacatttgataagttgtaagagacgggcgactca tgtcgaagttgacgaatataaagtacataacgtgt ttagaatacccagaatccgaatagtccgcggggc gtcttctcgcgtgagtaccaaatactgagttgaac ttgaaaatgctaaatctgtgacactctttgtgtga tgattattgtcaccacttcgaagatggcttcgaca ttcatgatgttctggtgtttgtttggaatcgtaat agcgcttgtttcgtccaagtctgacaacaaagaaa atctgaagaattatatcacggataagtcaaccaat attagaatacccacgccattatttgtatcaacgga aaactcttatcccacaaaacatgtaatctacgatg aaaactgtggcttcgctgtactcaatcctataagt gaccccaaatatgtccttttgagccagcttctaat gggaaggcgcaaatatgatgcgacggtcgcgtggt ttgttctcggtaaaatgtgtgccagattaatatat ttgcgcgaattttataactgctcgacaaatgagcc ttttggcacatgttctatgagctctcctggatggt gggacaggcgctacgtctcaaccagtttcatttct cgcgacgaattacagctggttttttgcagcgccgtc ccgagaattagatggtttatatacgcgcgtagtag ttgtcaacggggactttactacggccgatataatg tttaatgttaaagtggcatgtgccttttcaaagac tggaatagaagatgatacattatgcaaacccttttc atttctttgccaatgcaacattgcacaatttaacc atgattagatcggtaactcttcgagcgcacgaaag ccatttaaaggaatgggtggcacggagaggtggta acgtccctgcagtgctacttgagtctaccatgtat catgcatccaatctgcctagaaatttcagggattt ctacataaagtctccagatgattataagtataatc acctagatgggccatctgtaatgctcatcactgac agacctagtgaagatttggatggggaggctcgttca ccaaagtgacattttttactactacaagtcctataa aacaggtccggtatgaagagcatcagtcacataca aagcagtatcctgtaaacaaaatcaagctataat tttttttgatagggttaggctcgttcattggaagca tattcgtagttttggtagtatggattatacgcaga -continued tattgcaatggagcgcggagtgggggaacgccccc cagtcctcgccggtatgtgtataccaggctatgat cacgtgtgaaacttgggcggacctgtatcatatgt acaccgtcccctattcgtttatagccagtacgtgtt atctgcacatagaggaacatgtgtcatactgggat cgcatgcatggtatgtgtgactctaatattattct gtatcataataaaaacacagtgcatggtatataga ggatcgctggtaagcactacggtagaccaatcggc tcagattgcattctttggcatcgataccgttgtta atttatatggcaaagtcttgttcatgggagatcag tatttggaggaaatatactctggaacgatggaaat actcaaatggaatcaagctaaccgctgctattcta ttgcgcatgcaacatattacgccgactgtcctata atcagttctacggtattcagaggatgccgggacgc cgttgtttatactaggccccacagcagaattc SEQ ID NO 18: 484-1050-2641-10859
(mCMV IEpro-VP2-SV40pA/ILT/HVT)
(15252 bp)
(IBDV + ILT gene cassettes
in HVT AscI fragment.) Virus no.
HVT/IBDV/ILT 484

-continued

```
tgatcacatatgtaatttgtatatcacatgtacac
ttatgccgatgtatgtgcacgggcgatatttctat
tgtaattcatttttttgttagtaaactaccacagg
ctgtccggaaatctaagttaatgaataaagtagat
ggttaatactcattgcttagaattggactactttt
aattctctttaatgttcgtattaaataaaaacatc
tttaataaacttcagcctcttcgcttattgtagaa
attgagtattcaaaatcatgttcaaagccgtcttc
ggagagtgtactcgccacggtggttggaacatcac
tatgtctacacgtcaaatttaagcacgtcaggtct
gtcgaggacaagaaatggttaactagtgtttcaat
tattcttataaacgttaagcattgtaagcccccg
gccgtccgcagcaacaatttactagtatgccgtgg
gctccgggactatcacggatgtccaattcgcacat
gcatataattttctagggtctctcatttcgagaa
atcttcggggatccatcagcaatgcgggctgtagt
cccgattcccgtttcaaatgaaggtgctccaacac
ggtcttcaaagcaaccggcataccagcaaacacag
actgcaactccccgctgcaatgattggttataaac
agtaatctgtcttctggaagtatatttcgcccgac
aatccacggcgcccccaaagttaaaaaccatccat
gtgtatttgcgtcttctctgttaaaagaatattga
ctggcattttcccgttgaccgccagatatccaaag
tacagcacgatgttgcacggacgactttgcagtca
ccagccttccttccacccccccaccaacaaaatg
tttatcgtaggacccatatccgtaataaggatggg
tctggcagcaacccataggcgcctcggcgtggta
gttctcgaggccttaagcttaaggatcccccaact
ccgcccgttttatgactagaaccaatagtttttaa
tgccaaatgcactgaaatcccctaatttgcaaagc
caaacgcccctatgtgagtaatacggggactttt
tacccaatttcccacgcggaaagcccctaataca
ctcatatggcatatgaatcagcacggtcatgcact
ctaatggcggcccatagggactttccacataggg
gcgttcaccattcccagcatagggtggtgactc
aatggcctttacccaagtacattgggtcaatggga
ggtaagccaatgggttttcccattactggcaagc
acactgagtcaaatgggactttccactgggttttg
cccaagtacattgggtcaatgggaggtgagccaat
gggaaaaacccattgctgccaagtacactgactca
```

-continued

```
atagggactttccaatgggttttccattgttggc
aagcatataaggtcaatgtgggtgagtcaataggg
actttccattgtattctgcccagtacataaggtca
atagggggtgaatcaacaggaaagtcccattggag
ccaagtacactgcgtcaatagggactttccattgg
gttttgcccagtacataaggtcaataggggatgag
tcaatgggaaaaacccattggagccaagtacactg
actcaatagggactttccattgggttttgcccagt
acataaggtcaataggggtgagtcaacaggaaag
ttccattggagccaagtacattgagtcaataggga
ctttccaatgggttttgcccagtacataaggtcaa
tgggaggtaagccaatgggttttcccattactgg
cacgtatactgagtcattagggactttccaatggg
ttttgcccagtacataaggtcaatagggtgaatc
aacaggaaagtcccattggagccaagtacactgag
tcaatagggactttccattgggttttgcccagtac
aaaaggtcaataggggtgagtcaatgggttttc
ccattattggcacgtacataaggtcaataggggtg
agtcattgggttttccagccaatttaattaaaac
gccatgtactttcccaccattgacgtcaatgggct
attgaaactaatgcaacgtgaccttaaacggtac
tttcccatagctgattaatgggaaagtaccgttct
cgagccaatacacgtcaatgggaagtgaaagggca
gccaaaacgtaacaccgccccggttttcccctgga
aattccatattggcacgcattctattggctgagct
gcgttctacgtgggtataagaggcgcgaccagcgt
cggtaccgtcgcagtcttcggtctgaccaccgtag
aacgcagagctcctcgctgcaggcggccgctctag
aactcgtcgatcgcagcgatgacaaacctgcaaga
tcaaacccaacagattgttccgttcatacggagcc
ttctgatgccaacaaccggaccggcgtccattccg
gacgacaccctggagaagcacactctcaggtcaga
gacctcgacctacaatttgactgtggggacacag
ggtcagggctaattgtcttttcctggattccct
ggctcaattgtgggtgctcactacacactgcagag
caatgggaactacaagttcgatcagatgctcctga
ctgcccagaacctaccggccagctacaactactgc
agactagtgagtcggagtctcacagtgaggtcaag
cacactccctggtggcgtttatgcactaaacggca
ccataaacgccgtgaccttccaaggaagcctgagt
gaactgacagatgttagctacaatgggttgatgtc
```

-continued

```
tgcaacagccaacatcaacgacaaaattgggaatg
tcctggtaggggaaggggtcactgtcctcagccta
cccacatcatatgatcttgggtatgtgaggcttgg
tgacccccattcccgctatagggcttgacccaaaaa
tggtagctacatgcgacagcagtgacaggcccaga
gtctacaccataactgcagccgatgattaccaatt
ctcatcacagtaccaaccaggtggggtaacaatca
cactgttctcagccaacattgatgctatcacaagc
ctcagcattgggggagagctcgtgtttcaaacaag
cgtccaaggccttgtactgggcgccaccatctacc
ttataggctttgatgggactgcggtaatcaccaga
gctgtggccgcagataatgggctgacggccggcac
cgacaatcttatgccattcaatcttgtcattccaa
ccaatgagataacccagccaatcacatccatcaaa
ctggagatagtgacctccaaaagtggtggtcaggc
aggggatcagatgtcatggtcggcaagtgggagcc
tagcagtgacgatccatggtggcaactatccaggg
gccctccgtcccgtcacactagtagcctacgaaag
agtggcaacaggatccgtcgttacggtcgctgggg
tgagtaacttcgagctgattccaaatcctgaacta
gcaaagaacctggttacagaatacggccgatttga
cccaggagccatgaactacacaaaattgatactga
gtgagagggaccgtcttggcatcaagaccgtctgg
ccaacaagggagtacactgattttcgtgagtactt
catgagagtggccgacctcaactctcccctgaaga
ttgcaggagcatttggcttcaaagacataatccgg
gctataaggaggtagatccagacatgataagatac
attgatgagtttggacaaaccacaactagaatgca
gtgaaaaaatgctttatttgtgaaatttgtgatg
ctattgctttatttgtaaccattataagctgcaat
aaacaagttaacaacaacaattgcattcattttat
gtttcaggttcaggggagggtgtgggaggtttttt
cggatcctctagagtcgacggcagagtcgcagacg
cccctattggacgtcaaaattgtagaggtgaagtt
ttcaaacgatggcgaagtaacggcgacttgcgttt
ccaccgtcaaatctccctatagggtagaaactaat
tggaaagtagacctcgtagatgtaatggatgaaat
ttctgggaacagtcccgccggggttttttaacagta
atgagaaatggcagaaacagctgtactacagagta
accgatggaagaacatcggtccagctaatgtgcct
```

-continued

```
gtcgtgcacgagccattctccggaaccttactgtc
ttttcgacacgtctcttatagcgagggaaaaagat
atcgcgccagagttatactttacctctgatccgca
aacggcatactgcacaataactctgccgtccggcg
ttgttccgagattcgaatggagccttaataatgtt
tcactgccggaatatttgacggccacgaccgttgt
ttcgcataccgctggccaaagtacagtgtggaaga
gcagcgcgagagcaggcgaggcgtggatttctggc
cggggaggcaatatatacgaatgcaccgtcctcat
ctcagacgcactcgcgttactacgcgaaaggaga
ggtgcttaacaaacacatggattgcggtggaaaac
ggtgctgctcaggcgcagctgtattcactcttttc
tggacttgtgtcaggattatgcgggagcatatctg
ctttgtacgcaacgctatggaccgccatttatttt
tgaggaatgcttttttggactatcgtactgctttct
tccttcgctagccagagcaccgccgccgtcacgta
cgactacattttaggccgtcgcgcgctcgacgcgc
taaccataccggcggttggcccgtataacagatac
ctcactagggtatcaagaggctgcgacgttgtcga
gctcaacccgatttctaacgtggacgacatgatat
cggcggccaaagaaaaagagaaggggggcccttc
gaggcctccgtcgtctggttctacgtgattaaggg
cgacgacggcgaggacaagtactgtccaatctata
gaaaagagtacagggaatgtggcgacgtacaactg
ctatctgaatgcgccgttcaatctgcacagatgtg
ggcagtggactatgttcctagcacccttgtatcgc
gaaatggcgcgggactgactatattctcccccact
gctgcgctctctggccaatacttgctgaccctgaa
aatcgggagatttgcgcaaacagctctcgtaactc
tagaagttaacgatcgctgtttaaagatcgggtcg
cagcttaacttttaccgtcgaaatgctggacaac
agaacagtatcagactggatttcaaggcgaacacc
tttatccgatcgcagacaccaatacacgacacgcg
gacgacgtatatcggggatacgaagatattctgca
gcgctggaataatttgctgaggaaaaagaatccta
gcgcgccagaccctcgtccagatagcgtcccgcaa
gaaattcccgctgtaaccaagaaagcggaagggcg
cacccccggacgcagaaagcagcgaaaagaaggccc
ctccagaagactcggaggacgacatgcaggcagag
gcttctggagaaaatcctgccgccctccccgaaga
cgacgaagtccccgaggacaccgagcacgatgatc
```

-continued
```
caaactcggatcctgactattacaatgacatgccc
gccgtgatcccggtggaggagactactaaaagttc
taatgccgtctccatgcccatattcgcggcgttcg
tagcctgcgcggtcgcgctcgtggggctactggtt
tggagcatcgtaaaatgcgcgcgtagctaatcgag
cctagaataggtggtttcttcctacatgccacgcc
tcacgctcataatataaatcacatggaatagcata
ccaatgccattcattgggacgttcgaaaagcatg
gcatcgctacttggaactctggctctccttgccgc
gacgctcgcacccttcggcgcgatgggaatcgtga
tcactggaaatcacgtctccgccaggattgacgac
gatcacatcgtgatcgtcgcgcctcgccccgaagc
tacaattcaactgcagctatttttcatgcctggcc
agagacccacaaaccctactcaggaaccgtccgc
gtcgcgtttcggtctgatataacaaaccagtgcta
ccaggaacttagcgaggagcgctttgaaaattgca
ctcatcgatcgtcttctgtttttgtcggctgtaaa
gtgaccgagtacacgttctccgcctcgaacagact
aaccggacctccacacccgtttaagctcactatac
gaaatcctcgtccgaacgacagcgggatgttctac
gtaattgttcggctagacgacaccaaagaacccat
tgacgtcttcgcgatccaactatcggtgtatcaat
tcgcgaacaccgccgcgactcgcggactctattcc
aaggcttcgtgtcgcaccttcggattacctaccgt
ccaacttgaggcctatctcaggaccgaggaaagtt
ggcgcaactggcaagcgtacgttgccacggaggcc
acgacgaccagcgccgaggcgacaaccccgacgcc
cgtcactgcaaccagcgcctccgaacttgaagcgg
aacactttacctttccctggctagaaaatggcgtg
gatcattacgaaccgacacccgcaaacgaaaattc
aaacgttactgtccgtctcgggacaatgagccta
cgctaattggggtaaccgtggctgccgtcgtgagc
gcaacgatcggcctcgtcattgtaatttccatcgt
caccagaaacatgtgcaccccgcaccgaaaattag
acacggtctcgcaagacgacgaagaacgttcccaa
actagaagggaatcgcgaaaatttggacccatggt
tgcgtgcgaaataaacaaggggctgaccaggata
gtgaacttgtggaactggttgcgattgttaacccg
tctgcgctaagctcgcccgactcaataaaaatgtg
attaagtctgaatgtggctctccaatcatttcgat
tctctaatctcccaatcctctcaaaaggggcagta
tcggacacggactgggaggggcgtacacgatagtt
atatggtacagcagaggcctctgaacacttaggag
gagaattcagccggggagagcccctgttgagtagg
cttgggagcatattgcaggatgaacatgttagtga
tagttctcgcctcttgtcttgcgcgcctaacttt
gcgacgcgacacgtcctcttttttggaaggcactca
ggctgtcctcggggaagatgatcccagaaacgttc
cggaagggactgtaatcaaatggacaaaagtcctg
cggaacgcgtgcaagatgaaggcggccgatgtctg
ctcttcgcctaactattgctttcatgatttaattt
acgacggaggaaagaaagactgcccgcccgcggga
cccctgtctgcaaacctggtaattttactaaagcg
cggcgaaagcttcccgggttaattaaggccctcga
ggatacatccaaagaggttgagtattctctctaca
cttcttgttaaatggaaagtgcatttgcttgttct
tacaatcggcccgagtctcgttcacagcgcctcgt
tcacacttaaaccacaaatagtctacaggctatat
gggagccagactgaaactcacatgactaatatt
cggggtgttagtcacgtgtagcccattgtgtgca
tataacgatgttgacgcgtccttattcgcggtgt
acttgatactatggcagcgagcatgggatattcat
cctcgtcatcgttaacatctctacgggttcagaat
gtttggcatgtcgtcgatcctttgcccatcgttgc
aaattacaagtccgatcgccatgaccgcgataagc
ctgtaccatgtggcattagggtgacatctcgatca
tacattataagaccaacgtgcgagtcttccaaaga
cctgcacgccttcttcttcggattgtcaacgggtt
cttcagaatctatgcccatatctggcgttgagacc
attgtgcgtttaatgaacaataaagcggcatgcca
tggaaaggagggctgcagatctccatttttctcacg
ccactatcctggacgctgtagacgataattatacc
atgaatatagaggggggtatgtttccactgccactg
tgatgataagttttctccagattgttggatatctg
cattttctgctgccgaacaaacttcatcgctatgc
aaagagatgcgtgtgtacacgcgccggtggagtat
acgggaaactaaatgttcatagaggtctttgggct
atatgttattaaataaaataattgaccagtgaaca
atttgtttaatgttagtttattcaatgcattggtt
gcaaatattcattacttctccaatcccaggtcatt
ctttagcgagatgatgttatgacattgctgtgaaa
```

-continued

```
attactacaggatatattttttaagatgcaggagta
acaatgtgcatagtaggcgtagttatcgcagacgt
gcaacgcttcgcatttgagttaccgaagtgcccaa
cagtgctgcggttatggtttatgcgcacagaatcc
atgcatgtcctaattgaaccatccgattttttcttt
taatcgcgatcgatgtttgggcaactgcgttatttt
cagatctaaaaaatttaccctttatgaccatcaca
tctctctggctcataccccgcttggataagatatc
atgtagattccgccctaagaaatgcaaactaacat
tattgtcggttccatatacacttccatcttgtcct
tcgaaaataacaaactcgcgcaatagaccgtccgt
acatgcatggccgatgtgtgtcaacatcattggtc
tgctagatcccgatgggacgaatcgtacagtcgtc
gctccagcattggcaaaaatccccagatacccctcc
atgcggcaaatctaaattgcgaccccgaagagact
gcaccaaagtcttatcgacgcacgctgatttttttt
gaacagcgggagcccattatcttcagtggagcgta
gacgggcgaggctaattatgtgacatagcaacact
gcatgtatgtttttataaatcaataagagtacata
atttattacgtatcatttccgtttgtaatatactg
tatacatcatccacactattagtcagcactagcgc
gcgggcgcacgttacaatagcagcgtgcccgttat
ctatattgtccgatatttacacataacatttcatc
gacatgattaaatacctaagtactgcacacagatg
tttaatgtatatcgtcatataaattatatcgctag
gacagacccaaacgacctttatcccaaacagtcag
atcctcttctcaagtgtcgatttctgttatggaat
atgcataccctggcccagaaattgcacgcacgagc
gtagtgaatgcgtcattggttttacatttaaaggc
taaatgcacaaattctttagacgacagcacatcgt
taaatagcatctctagcgttcttatgaatgctaag
cattggagtcctcctggtcggccacaataacagct
gagtatcataccctgagctccggggttgtcgcaca
tagcggattcgtataaacataggattttccgcgaa
tccatcagttgcaaaaatctgttaggctccatcaa
caacgctggatttacttcagatccacgcgtaaagt
aatggtgctcgaataccgttttttagagttgtcggc
atttcaaggaacaaagaattcatttcttcattgca
acgacgcgccagaaatcccaagacctcttttgggta
gtatgttcttgcctataaaacacggcgttccaagt
```

-continued

```
gccaggaaccacgcatgtgttactgttggggcgta
ttcagaaataaagcggggtttatgcggcttttgaa
gctcggatatccaaagtatcgcttgctgatgaacg
agcgatgtagctgttacaaaacctcctttccatcc
tccagtcaacataatatttatcggcctacctatgt
ccgtaataagtattggtcgggcaattattccgtat
gaggtcttgcaggaataagctcttagggacagcca
gcttggatatggtgcgaaacagaccttctcggctt
cagaatgtcgctccgcagtctcttcgtgtcggtgc
atcttagatccaccatcaatgtgtgcagcattgac
tcccgcccgtcgaatattccttttgttacgatgca
gtaatgagcacgatcatgggcggggcgatgacgtt
ctatttgcatgtctgcgaacaatttgcgtcagtca
tacagctatggagtgggccatttctggccgtcaac
ttaaaaacgcgaaccgcagacatatgtatttgcat
gcaaagacgtatcttcgtatttctgggcatcttca
aatgctctggccaatatggcaatgaatttggattc
gtttgacgccgatggtatgcagtgcaaatgtgcca
atagcccacatccgaaaaagttatttgtcatacaa
gcaggtgttaagtagcaatcacataaaggcaccag
acgcctcatggcatcataatgaatagctccttctc
cccactggaaccactgacaaaatctgcgagtatat
tccgcaaaccacattttatttctcatagaaactac
cctaaatccttttaacgggaagaagaatcctagat
agtgcttgaagtcatgactgttactgctgcaataa
cactgtatattatttataaattccgtttgtctagg
tatctgatgtaggcattccgatccctttactattg
cgtcttcacgaccaaatgggaatgcgccaaaatcc
ccacacctcatcacccctggaggcagattgtgtatt
attaatatccgccgattgaagcacaaaacggtacg
gtactgttcctaattctggtatagattctatggtc
aaaagtctgcatatccccgacattgccatgagatc
acacagtccaagtagcatgtttattgagtcactca
gactgtcaacgtccctcgccgcaccaccaatcgaa
aataaagtatctacgcaagttatagctccgcattt
tctatcgctagcagcaatcgcgacgcaaaacataa
aggccatgttgggatttgaactctctgggggcgctt
gttatcttctgcaccgtcgcagtcgcagttttccg
aaatttatgtctaatatattttccggccgtgctcc
aatcggccgaaaagaatctgcgtattaccagactc
attgacgggccgataaagaccataaaacaaaattc
```

```
ctgtgcactccctcctccagttttgccatcgtcca
agtcccgtaacttttttgcgtttcgaggagcaag
cgttcgttatccctacccacacttgttttccaccg
tttcttattataagcggttgtatcgccaacgcgt
caccgcaggttgtcacatacagtgatggcatactt
gaacgtgcaacaacgcgctcgctttgcaaatctaa
gtcattgaccatcaaatcgcgttgagaggatagcc
aggcatcttttttcctagtatggtgacggtgcagc
caccccaactcagttcttgtaaaaaaagctattgg
cgggaatttatgttctgaggtgcattctatattta
tgagtccatcaaatgccattaaccagattcgtatt
ttttcgctcgacccggcatcactatggatacaata
cctttctatggcccatttcagctctcgaaccaacc
acacggacaattgactaacataagtatgatcttta
tcacagtcgcacccatctgagttatatttatggca
tccgagcgctcttactgtacggtcggatacaccca
tggttttcctttatatagtcgggttatagtctgt
cgggtttggcggtagcacggagtagtttgattttt
aagaatcgaaaaccggcttggagagaccactgtcg
aatatttgtccgtatactctacacgtgagtgttgt
ccattcctaggtatattcatctgttcggataccatt
caattgctgttcaggcataaccttaaagcatatgt
tatgttgtacatcaaaacttggtgagttatgttcg
attgccgcgcataaagaatcgtacatgagcgtttc
tgctaacatactatctatattctcacacgccctg
catatactgttcctattccaaattcacgttttgcc
ccatcggctatctgctcccaaaaagttgtaatata
ggtgccgctgggtgcgaaattttcatcagttgtat
tcctgataaactgaatcacttacataatttttgc
cacatatctgcgtgcagccatagtatcgaacccgt
gggctcggagacgacagtgcgtacaatgggtattt
tacctttccccaacaaaataatggtatacaagtta
ggtccgtacctagaccttaatgtttccaattcttc
tgaatcactgcactctcgtaggggagtaacggtaa
taatttcgtctctgagcccgtttgcgttgaaaa
ctaatcacattagataatgtgcaatcggtttcttt
tatccggatacatctaagtattatgacatcggtgg
tcattgtttccatcaacgaccatcttttacgatcg
cccatactactcatggacgttgtcggtgttgaaaa
atcaccagaattgcaacggatctctgggtaccatg
ctgctgatggaattggcggttttaattgttgtttc
agtctattattgctatctttggcggggttgaataa
tgtggggggagagtgattgcaggaatccgaatggg
tcaataaaacgaccgtgctccgttctgccggcgcc
gatccgattgaagctatatacttcgcttctctccc
cacttttccaatttgatccggaaataaaacggccc
cggacaacagtatcgtacgatccggatccggatcc
tgcttgcctacagaagaatcaacatctcgcccaa
tattctggtcaaaactggctcgctcatggcaacgc
ggacgtttcccccggtggccagtcttaatggttaa
tgttcttttcggcaatcttatacatcagcgggttg
cgtgaatactggtcacagttcagtcatttactaca
caccagcaatacgacgacggacagtaccgtcccga
cgaacgcgacgcccaaaattgctatcgcgaccgcg
tccgaggcgatgtcgtacgggcggtgcggggttgg
atcctcggcaaagagatcctcgtaattcggcggtg
ggagcggagggtaaagacgcgggtggggatctccc
tccggaccgcgcgccgggcgcggttcgaaaatgct
ttccgcctcgctcagtgtcaacgccaagtattcgg
gcgggctgggggccggaatatctcccgcgacttct
tctatcggcgcggaattggagtcgcggtcgtggcg
cgcttctagcgtcgtcaacggaagtccattttcgg
ggtctcccggtgggcgttcagcgtccatcgtcgta
tatgctctaacacacgtctcgctatattaaaaaaa
agaagagtatcggtcagtgtcgagtgtcgccgaca
atgtcgcgagttctcggcgatttaattttttggaac
tgctccctatgaatcccgtaactgtagcgcccgcg
cagaaagccgccatcagaccaactacgtgtctgtt
cgatgtttcccgccgatcgctttaccgattaagg
ttccggcgagaaatgacatgctcgatccaagaaca
aagttttcgcggtaaacaacaacatagttaccgt
gcgagatggagaaaccacatctcccgaattagtag
aggaaagcccgcgctgtcggtttggggacatatcg
atctttttgtgtttttcctaggacccttttgcca
gatcgtacaaagtcgcgtcttatgagcggacgttc
ttactgcagctcggtaggagtggggcagggttaga
tttcgtcggcgtttcggccccgtatgcgccgcgc
caccctcttcgccgagctctttatgcgcggtgggg
```

```
                                   -continued
gtgagcgcttccggagttgcgatctccgatctcga gccgcagcccggcggtgtctctttcagtggagcgt tagcgccatcatgtggttcgtggcggtggaaaggc tattatgtgttaggggagagaccacgtgatcggca tgcaaatgagcaaggcgaacgcgtcagcgttcgca ctgcgaaccaataatatatatattatactattggc tttaggtgcgaacgtccggctagtccaatagcggg gtcgcgtttcgtaccacgtgttatagaccgcccta aactcgcactcgggggtccggccgcgcccagacag ggcggagacgtgccacaggggctttaaaacaccgc ttcgggcaccgttcatctcggcgcgcc
```

```
                                  -continued
SEQ ID NO 19: SV40 polyadenylation
signal (199 bp)
agcttcagacatgataagatacattgatgagtttg gacaaaccacaactagaatgcagtgaaaaaaatgc tttatttgtgaaatttgtgatgctattgctttatt tgtaaccattataagctgcaataaacaagttaaca acaacaattgcattcattttatgtttcaggttcag ggggaggtgtgggaggttttttcg
```

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

It is further to be understood that all base sizes or amino acid sizes, and all molecular weight or molecular mass values, given for nucleic acids or polypeptides are approximate, and are provided for description.

We claim:

1. A recombinant herpesvirus of turkeys (rHVT) comprising a nucleic acid that comprises a nucleotide sequence that encodes an Infectious Laryngotracheitis Virus glycoprotein D (ILTV gD), a nucleotide sequence that encodes an Infectious Laryngotracheitis Virus glycoprotein I (ILTV gI), and a nucleotide sequence that encodes an Infectious Bursal Disease Virus viral protein 2 (IBDV VP2); wherein the nucleic acid sequence is located in a nonessential site in the rHVT genome; and wherein the nonessential insertion site is selected from the group consisting of the US2 site and the UL54.5 site; wherein the nucleic acid is configured to be transcribed in the opposite direction relative to respectively, a US2 gene or a UL54.5 gene of rHTV.

2. The rHVT of claim 1, wherein the nucleotide sequence encoding the ILTV gD protein is operatively under the control of a first promoter, the nucleotide sequence encoding the ILTV gI protein is operatively under the control of a second promoter, and the nucleotide sequence encoding the IBDV VP2 protein is operatively under the control of a third promoter.

3. The rHVT of claim 2, wherein the first promoter is the endogenous ILTV gD promoter, the second promoter is the endogenous ILTV gI promoter, and the third promoter is the murine cytomegalovirus immediate early 1 gene (mCMV-IE1) promoter.

4. The rHVT of claim 3, wherein the ILTV gD comprises an amino acid sequence that has greater than 90% identity with SEQ ID NO: 2, the ILTV gI comprises an amino acid sequence that has greater than 90% identity with SEQ ID NO: 4, and the IBDV VP2 comprises an amino acid sequence that has greater than 90% identity with SEQ ID NO: 6.

5. The rHVT of claim 4, wherein the nonessential insertion site is the US2 site.

6. The rHVT of claim 3, wherein the nonessential insertion site is the US2 site.

7. An immunogenic composition comprising the rHVT of claim 6.

8. An immunogenic composition comprising the rHVT of claim 5.

9. An immunogenic composition comprising the rHVT of claim 4.

10. An immunogenic composition comprising the rHVT of claim 3.

11. An immunogenic composition comprising the rHVT of claim 2.

12. An immunogenic composition comprising the rHVT of claim 1.

13. A vaccine comprising the immunogenic composition of claim 12.

14. A vaccine comprising the immunogenic composition of claim 9.

15. A vaccine comprising the immunogenic composition of claim 8.

16. A vaccine comprising the immunogenic composition of claim 7.

17. A method for aiding in the protection of a chicken against ILTV and IBDV comprising administering the vaccine of claim 16.

18. A method for aiding in the protection of a chicken against ILTV and IBDV comprising administering the vaccine of claim 15.

19. A method for aiding in the protection of a chicken against ILTV and IBDV comprising administering the vaccine of claim 14.

20. A method for aiding in the protection of a chicken against ILTV and IBDV comprising administering the vaccine of claim 13.

* * * * *